(12) United States Patent
Lu et al.

(10) Patent No.: US 12,017,871 B2
(45) Date of Patent: Jun. 25, 2024

(54) ROBOTIC DEVICE AND METHODS FOR FABRICATION, USE AND CONTROL OF SAME

(71) Applicant: Planar Motor Inc., Richmond (CA)

(72) Inventors: Xiaodong Lu, Richmond (CA);
Graham Williamson, Richmond (CA);
Kevin Xiao, Richmond (CA);
Alexander Slocum, Richmond (CA);
Peter Tang, Richmond (CA); Bruce Long, Richmond (CA)

(73) Assignee: PLANAR MOTOR INC., Vancouver (CA)

( * ) Notice: Subject to any disclaimer, the term of this patent is extended or adjusted under 35 U.S.C. 154(b) by 450 days.

(21) Appl. No.: 17/599,878

(22) PCT Filed: Mar. 30, 2020

(86) PCT No.: PCT/CA2020/050413
§ 371 (c)(1),
(2) Date: Sep. 29, 2021

(87) PCT Pub. No.: WO2020/243814
PCT Pub. Date: Dec. 10, 2020

(65) Prior Publication Data
US 2022/0212883 A1 Jul. 7, 2022

Related U.S. Application Data

(60) Provisional application No. 62/948,334, filed on Dec. 16, 2019, provisional application No. 62/825,813, (Continued)

(51) Int. Cl.
*H01L 21/677* (2006.01)
*B65B 5/10* (2006.01)
(Continued)

(52) U.S. Cl.
CPC ............ *B65G 47/912* (2013.01); *B65B 5/105* (2013.01); *B65B 35/18* (2013.01); *B65B 35/38* (2013.01);
(Continued)

(58) Field of Classification Search
CPC ........ B60T 17/22; B60T 7/12; B60T 2201/10; B60T 2270/406
See application file for complete search history.

(56) References Cited

U.S. PATENT DOCUMENTS

| 3,308,928 A | 3/1967 | Mosterd |
| 5,126,648 A | 6/1992 | Jacobs |

(Continued)

FOREIGN PATENT DOCUMENTS

| CN | 100495150 C | 6/2009 |
| DE | 1482616 A1 | 1/1969 |

(Continued)

OTHER PUBLICATIONS

W.J. Kim and D.L. Trumper, High-precision magnetic levitation stage for photolithography. Precision Eng. 22 2 (1998), pp. 66-77.

(Continued)

*Primary Examiner* — Muhammad S Islam
(74) *Attorney, Agent, or Firm* — D'Ambrosio & Menon, PLLC; Usha Menon

(57) ABSTRACT

Robotic assembly systems and methods of assembling products using planar robots. Planar movers cooperate magnetically with stators to pick products provided on an infeed and place them in a pattern on an outfeed system, wherein the movers having a clamp having at least two opposing clamping surfaces whose relative positions are continuously adjustable by a force from an object external to the mover and the stator. Sensors and controllers cooperate to precisely move the movers on the stator, particularly as a group, for (Continued)

the movers to pick respective products at respective picking locations. Some systems permit packaging of multiple products.

41 Claims, 40 Drawing Sheets

Related U.S. Application Data filed on Mar. 29, 2019, provisional application No. 62/825,808, filed on Mar. 29, 2019, provisional application No. 62/825,811, filed on Mar. 29, 2019.

(51) Int. Cl.
*B65B 35/18* (2006.01)
*B65B 35/38* (2006.01)
*B65B 35/44* (2006.01)
*B65B 57/16* (2006.01)
*B65G 47/91* (2006.01)
*B65G 54/02* (2006.01)

(52) U.S. Cl.
CPC .............. *B65B 35/44* (2013.01); *B65B 57/16* (2013.01); *B65G 47/918* (2013.01); *B65G 54/02* (2013.01); *B65G 2201/0202* (2013.01); *B65G 2201/0258* (2013.01)

(56) References Cited

U.S. PATENT DOCUMENTS

| 6,003,230 | A | 12/1999 | Trumper et al. |
| 6,097,114 | A | 8/2000 | Hazelton |
| 6,208,045 | B1 | 3/2001 | Hazelton et al. |
| 6,441,514 | B1 | 8/2002 | Markle |
| 6,847,134 | B2 | 1/2005 | Frissen et al. |
| 6,987,335 | B2 | 1/2006 | Korenaga |
| 7,394,526 | B2 | 7/2008 | Shibazaki |
| 7,436,135 | B2 | 10/2008 | Miyakawa |
| 7,948,122 | B2 | 5/2011 | Compter et al. |
| 8,206,144 | B2 | 6/2012 | Ng et al. |
| 2008/0020382 | A1 | 8/2008 | Compter et al. |
| 2016/0035596 | A1* | 2/2016 | Kamiya ............ H01L 21/67736 414/225.01 |
| 2017/0066592 | A1* | 3/2017 | Bastian, II ................. B25J 5/02 |
| 2017/0158441 | A1* | 6/2017 | Namuduri ............ H02K 41/025 |

FOREIGN PATENT DOCUMENTS

| DE | 102010028769 | A1 | 11/2011 |
| JP | 3758656 | B2 | 3/2006 |
| WO | 2013059934 | A1 | 5/2013 |
| WO | 2015017933 | A1 | 2/2015 |
| WO | 2015162182 | A1 | 10/2015 |
| WO | 2015188281 | A1 | 10/2015 |
| WO | 2015179962 | A1 | 12/2015 |
| WO | 2015184553 | A1 | 12/2015 |
| WO | 2018176137 | A1 | 10/2018 |

OTHER PUBLICATIONS

D.L. Trumper, et al, "Magnet arrays for synchronous machines", IEEE Industry Applications Society Annual Meeting, vol. 1, pp. 9-18, 1993.
J.W. Jansen, C.M.M. van Lierop, E.A. Lomonova, A.J.A. Vandenput, "Magnetically Levitated Planar Actuator with Moving Magnets", IEEE Tran. Ind. App., vol. 44, No. 4, 2008.

\* cited by examiner

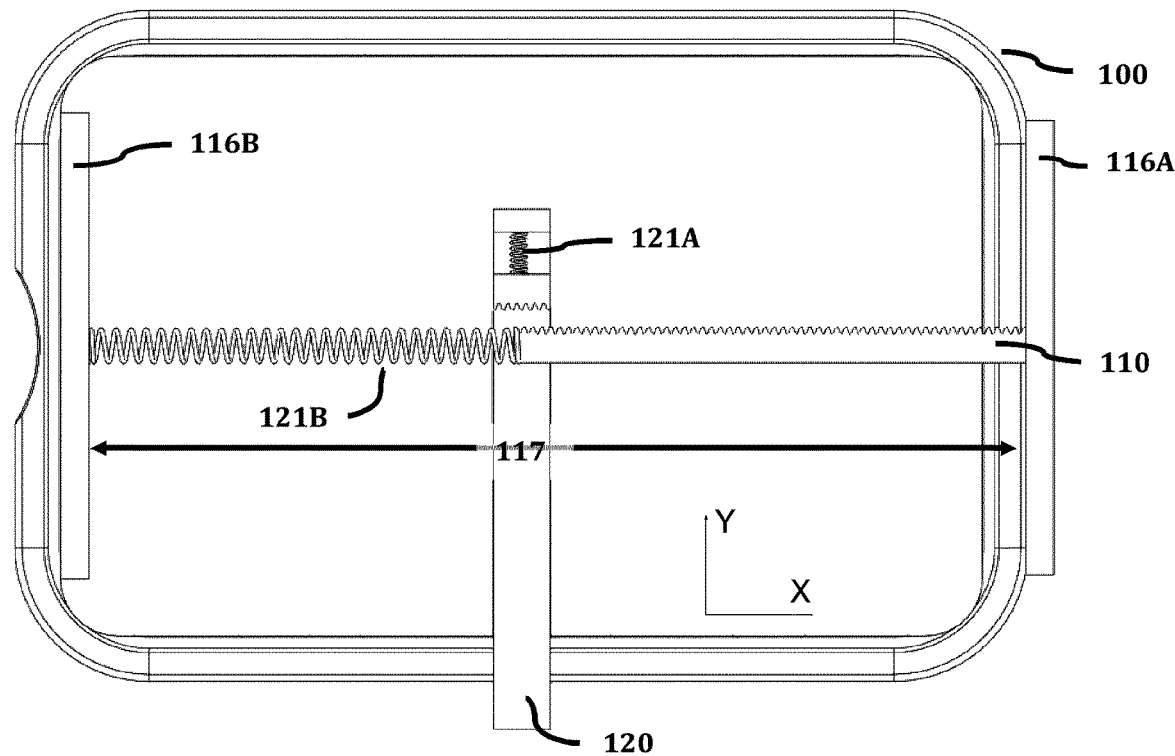
Figure 57₁
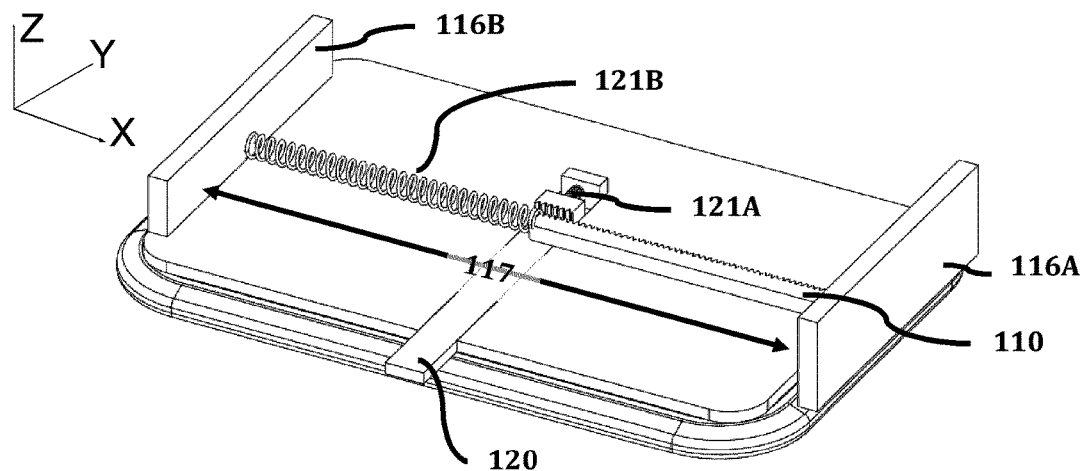
Figure 58

ROBOTIC DEVICE AND METHODS FOR FABRICATION, USE AND CONTROL OF SAME

TECHNICAL FIELD

The invention relates to assembly, packaging or robotic devices. Particular embodiments provide systems and methods for moving movable robots relative to stators to transfer products from a conveyor.

BACKGROUND

Motion stages (XY tables and rotary tables) are widely used in various manufacturing, inspection and assembling processes. A common solution currently in use achieves XY motion by stacking two linear stages (i.e. a X-stage and a Y-stage) together via connecting bearings. A more desirable solution involves having a single moving stage capable of XY motion, eliminating additional bearings. It might also be desirable for such a moving stage to be able to provide at least some Z motion. Attempts have been made to design such displacement devices using the interaction between current-carrying coils and permanent magnets. Examples of efforts in this regard include the following: U.S. Pat. Nos. 6,003,230; 6,097,114; 6,208,045; 6,441,514; 6,847,134; 6,987,335; 7,436,135; 7,948,122; US patent publication No. 2008/0203828; W. J. Kim and D. L. Trumper, High-precision magnetic levitation stage for photolithography. *Precision Eng.* 22 2 (1998), pp. 66-77; D. L. Trumper, et al, "Magnet arrays for synchronous machines", IEEE Industry Applications Society Annual Meeting, vol. 1, pp. 9-18, 1993; and J. W. Jansen, C. M. M. van Lierop, E. A. Lomonova, A. J. A. Vandenput, "Magnetically Levitated Planar Actuator with Moving Magnets", IEEE Tran. Ind. App.,Vol 44, No 4, 2008.

More recent techniques for implementing displacement devices having a moveable stage and a stator are described in: PCT application No. PCT/CA2012/050751 (published under WO/2013/059934) entitled DISPLACEMENT DEVICES AND METHODS FOR FABRICATION, USE AND CONTROL OF SAME; and PCT application No. PCT/CA2014/050739 (published under WO/2015/017933) entitled DISPLACEMENT DEVICES AND METHODS AND APPARATUS FOR DETECTING AND ESTIMATING MOTION ASSOCIATED WITH SAME; and PCT application No. PCT/CA2015/050549 (published under WO/2015/188281) entitled DISPLACEMENT DEVICES, MOVEABLE STAGES FOR DISPLACEMENT DEVICES AND METHODS FOR FABRICATION, USE AND CONTROL OF SAME; and PCT application No. PCT/CA2015/050523 (published under WO/2015/184553) entitled METHODS AND SYSTEMS FOR CONTROLLABLY MOVING MULTIPLE MOVEABLE STAGES IN A DISPLACEMENT DEVICE; and PCT application No. PCT/CA2015/050157 (published under WO/2015/179962) entitled DISPLACEMENT DEVICES AND METHODS FOR FABRICATION, USE AND CONTROL OF SAME.

Existing packaging solutions rely on robotic arms, commonly SCARA or delta robots to pick items from a conveyor and place them within packaging. This solution requires a large amount of space to avoid delta robots from colliding with each other and this operating space cannot be shared with humans due to significant safety concerns. In general, each robot covers a large area of the infeed and picking up and placing each object requires large movement limiting the overall productivity. To address the limit in productivity of each robotic arm typically additional robotic arms are added to the system until the desired productivity can be met. Additional robotic arms further increase cost and the space required for the packaging system and in general this additional floor space requirement adds significant cost to the owner. A robotic arm solution also requires very specific tooling for each product or arrangement, complicating any changeover.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

In accordance with a first aspect of the invention there is provided a robotic handling system comprising: at least one magnetically actuated mover each comprising one or more magnetic components; wherein the at least one mover comprising a first mover; a stator defining a work surface and comprising a plurality of actuation coils arranged to interact with the mover's magnetic components; andone or more sensors to detect a position of the at least one movers on the stator; and a controller controllably moving the at least one mover over the work surface in two non-parallel translational dimensions parallel to the working surface, by driving the stator's actuation coils by one or more driving circuits. The first mover comprises a clamp having at least two opposing clamping surfaces relatively movable and separated by an adjustable clamping distance therebetween. The clamp further comprises an engagement mechanism to receive an external force from an object external to the first mover and the stator; the received external force causing the clamping distance to be continuously adjustable by the relative position between the first mover and the external object.

The engagement mechanism may be an unpowered mechanism and the external force is a mechanical or magnetic force.

The engagement mechanism may comprise a latch to maintain the clamp in the open or closed position after the external force is removed.

The engagement mechanism may vary a clamping force or clamp gap based on a magnitude of the external force or distance between the external object and the engagement mechanism.

The engagement mechanism may further comprise a biasing member for urging the clamp towards the open or closed position when the external force is not applied, preferably wherein the clamp is biased towards the closed position by the biasing member.

The two or more opposing clamping surfaces may apply a clamping force to the product in the closed position, preferably further comprising a bearing surface allowing at least one of the clamping surfaces to move relative to another clamping surface for adjusting the clamping force. The at least one mover may further comprise a second mover, and the external object is the second mover.

The clamp may further comprise a resilient deformable element for maintaining a clamping force on the product when in the closed position.

The controller may be programmed to controllably move at least one of the first and second movers to adjust the clamping distance to an open position for releasing the product and to a closed position for holding the product.

In accordance with a second aspect of the invention there is provided a method of securing a product in a robotic handling system comprising: loading the product onto a magnetically actuated mover, the mover located on and movable in two in-plane degrees of freedom over a working surface of a stator; activating magnetic coils of the stator to bring the mover and an object external to the mover and the stator into proximity, whereby an engagement mechanism of the mover receives from the external object an external force causing a clamping distance of two clamping surfaces of the mover to be continuously adjustable by the relative position between the first mover and the external object; and adjusting the clamping distance to a closed or open position to secure or release the product using the engagement mechanism.

The magnetic coils of the stator may separate the mover from the external object to allow a biasing member of the clamp to restore the clamp to an open or closed position.

The method may further comprise moving the mover to a second location on the stator's working surface, opening the clamp, and unloading the product from the mover.

In accordance with a third aspect of the invention there is provided an assembly system comprising: an infeed transfer subsystem for carrying products thereon; a sensor subsystem adapted to determine product locations of said products on the infeed transfer subsystem; a group of magnetically actuated movers, each having a securing mechanism adapted to securely engage the product; a stator having a working surface and an electromagnetic driving means to move each mover independently on the working surface; an outgoing transfer subsystem adapted for receiving the products from the group of movers; and a control system for controlling the electromagnetic driving means to move individual members of the group of movers from the determined product locations to a disposing location of the outgoing transfer subsystem.

The sensor subsystem may be arranged to detect multiple products on the infeed simultaneously and predict each product's location for when the securing mechanism is actuated.

The sensor subsystem may comprise a camera and image processor.

The stator may be proximate an outlet end of the infeed transfer system.

The working surface may provide a two degree-of-freedom planar surface between the infeed and outfeed transfer subsystems.

The securing means may comprise a picking tool, preferably an activatable suction cup, and preferably means of lowering and raising the securing means to the product.

The controller is arranged to actuate each mover in the group and move them as a group between respective individual product locations and the disposing locations.

The transverse spacing between products is less than twice the width of each mover.

The system may further comprise a second group of movers and a second outfeed transfer subsystem spaced-apart from the first outfeed transfer subsystem, wherein the second group of movers shares a region of the working surface proximate the infeed transfer subsystem with the first group of movers.

The outgoing transfer system may comprise a second group of movers and further comprising a second outgoing transfer system arranged to receive products from the second group of movers. A third outgoing transfer system may be arranged to receive products from the second outgoing transfer system.

The second or third outgoing transfer system may comprise a vertical actuator connected to another product securing mechanism and arranged to move products from a first height to a variable height in a package.

The second or third outgoing transfer system may comprise a packaging securing mechanism.

The products may be disposed at the disposing locations in a predetermined pattern for packaging.

The securing mechanism may comprise one or more retaining bays on each mover, each bay shaped to receive product at an opening and constrain the product in at least two dimensions.

The infeed transfer subsystem may comprise a singulator.

The working surface may comprise a queuing region for movers proximate an outlet of the infeed transfer subsystem, the region sized to contain at least two movers.

The outlet of the infeed transfer system may be positioned above the working surface, separated by a gap large enough to pass the movers therethrough.

The system may comprise a second infeed transfer subsystem for loading bays of the movers with the products, concurrent with the first infeed transfer subsystem.

The system may comprise a two-axis gantry for transferring product from the movers to the outfeed transfer subsystem.

The system may comprise a second infeed transfer subsystem for transporting packaging to the working surface.

According to a fourth aspect there is provided a method of assembly comprising: transferring products on an infeed transfer system in a first direction; determining locations of a plurality of the product on the infeed transfer system; individually actuating electromagnetic driving elements of a stator to move a group of movers on a working surface of the stator to the determined locations; securing the products using a securing mechanism of the movers at the loading location; and moving the movers to dispose the products at an outfeed transfer subsystem.

The method may move the movers as a group to dispose the product at an outfeed transfer subsystem.

The method may select a number of products on the infeed transfer subsystem equal to the number of movers in the group for picking per batch.

The method may predict picking locations of each product of the selected products and control individual movers to respective picking locations to pick the products.

The method may speed match each mover to their respective products on the infeed transfer system.

The group of movers may follow substantially the same path between picking and disposing locations.

The securing mechanism may comprise one or more retaining bays on each mover, each bay shaped to receive product at an opening and constrain the product in at least two dimensions.

The method may queue two or more empty movers proximate an outlet of the infeed transfer subsystem before moving them to secure products.

The method may load the movers with the products from a second infeed transfer subsystem concurrent with loading the first infeed transfer subsystem.

The method may control movers to move independently from outlets of infeed transfer subsystems to the disposing location, while avoiding collisions.

The method may transfer the product, using a two-axis gantry, from the movers to the outfeed transfer subsystem.

The movers may dispose the products in a predetermined pattern on the outfeed transfer subsystem.

In accordance with a fifth aspect of the invention there is provided a robotic handling system comprising: a plurality of magnetically actuated movers, each comprising magnetic components, wherein the plurality of movers comprise a first group comprising one or more first movers each having a first tooling and a second group comprising one or more second movers having a second tooling, different from the first tooling; a stator defining a working surface and comprising a plurality of actuation coils arranged to interact with the mover's magnetic components to controllably move the mover over the working surface when driven by one or more stator driving circuits; one or more sensors to detect a position of the mover on the stator; and a controller connected to the driving circuits. The controller is programmed to: circulate the first movers within a first region of the working surface to transfer one or more first products from a first receiving location for receiving the first products to a first unloading location for unloading at least one of the first products; and circulate the second movers within a second region of the working surface, different from the first region, to receive at a second receiving location one or more of the first products that are unloaded from first movers and transfer first products to a second unloading location for unloading one or more of the first products.

In accordance with a fifth aspect of the invention there is provided a method of transferring products comprising: controlling actuation coils of a stator to displace a plurality of magnetically actuated movers over a working surface of the stator in order to circulate a first group of movers within a first region of the working surface between a first receiving location for receiving the first products and a first unloading location for unloading the first products and circulate a second group of movers within a second region of the working surface between a second receiving location and a second unloading location for unloading the first products. The method first comprises transferring the first products from the first movers at the first unloading location to the second movers at the second receiving location.

In accordance with a sixth aspect of the invention there is provided a system comprising: a conveyor having a first working surface for conveying a plurality of products comprising a first product in a first direction; one or more magnetically actuated movers, each comprising one or more magnetic components; a stator having a second working surface and comprising a plurality of actuation coils arranged to interact with each mover's magnetic components to controllably move each mover over the second working surface in at least in two in-plane non-parallel directions parallel to the working surface when driving the stator coils with commanded currents by one or more driving circuits; and a controller connected to the driving circuits and programmed to control a first of the one or more movers to move with a motion component in a second direction, orthogonal to the first direction, and parallel with the first working surface, to align that first mover with a first of the plurality of products in the second direction and transfer that first product between the conveyor and that first mover.

In accordance with a seventh aspect of the invention there is provided a method of transferring a product between a conveyor and a mover comprising: operating the conveyor having a first working surface for conveying the product in a first direction; controlling actuation coils of a stator providing a second working surface to move a magnetically actuated mover in at least two in-plane degrees of freedom in on a second working surface of the stator with motion component in a second direction orthogonal to the first direction and parallel to the first working surface; positioning the stator and conveyor with their first and second working surfaces inclined with respect to each other to define a product transfer region at the intersection of the first and second directions; moving the mover to a first location to position an end effector extending from the mover to align with the products on either the conveyor or mover to the product in the first and second directions and pick the product up from transfer region; and then transferring the product to the other of the conveyor toor the mover.

Further aspects of the invention are set out in the claims and clauses,

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 57 is a plan view of a mover carried product gripping embodiment FIG. 58 is a perspective view of a mover carried product gripping embodiment

DESCRIPTION

Throughout the following description specific details are set forth in order to provide a more thorough understanding to persons skilled in the art. However, elements well known in the prior art may not have been shown or described in detail to avoid unnecessarily obscuring the disclosure. Accordingly, the description and drawings are to be regarded in an illustrative, rather than a restrictive, sense.

Figure 1A:
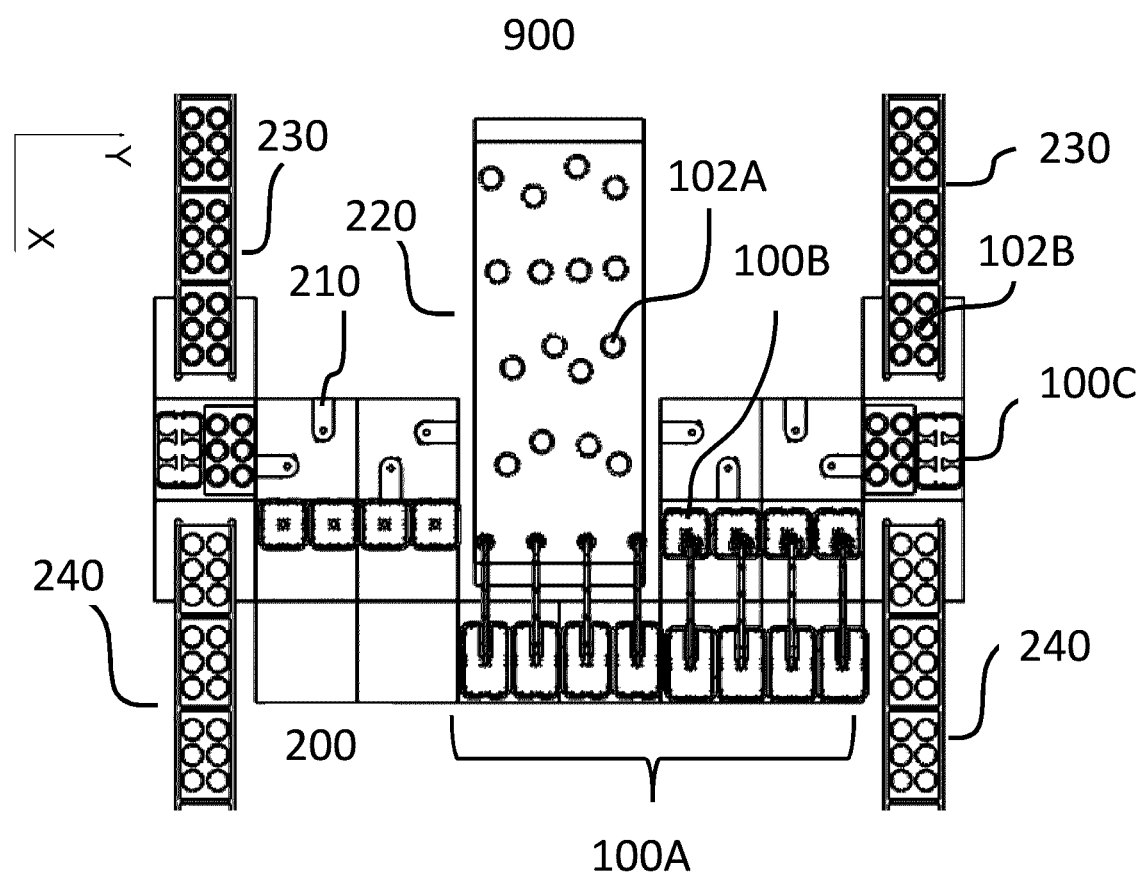
FIG. 1A is a plan view of an assembly system in accordance with one embodiment.
Figure 3:
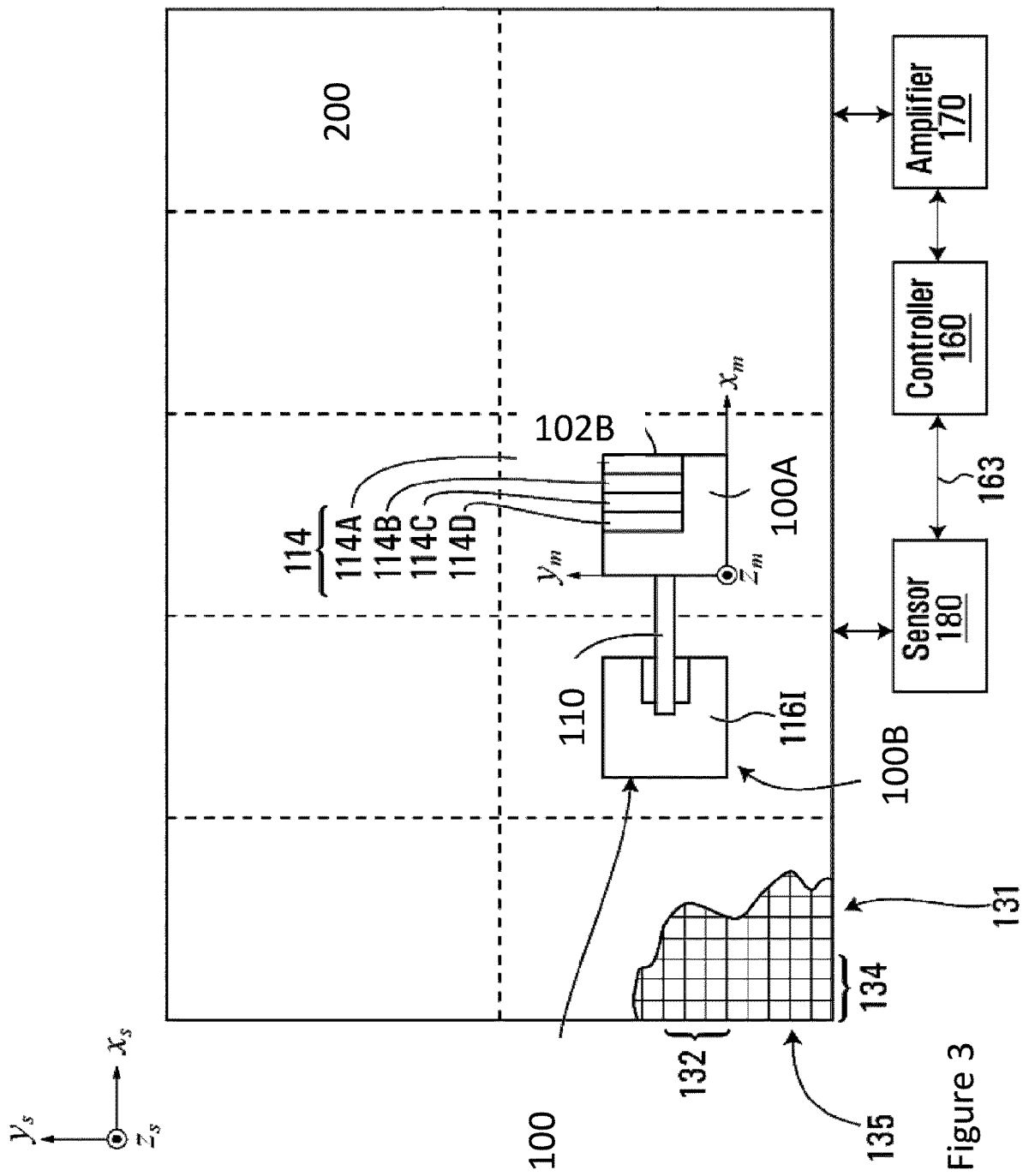
FIG. 3 is a plan view of a mover on a stator, showing their magnetizing elements.

According to some aspects of the invention and as depicted in FIG. 1A, robotic systems are provided which comprise one or more stators and one or more movers, for carrying products about an assembly system. Products 102A/B may refer to parts, workpieces, packages, food stuffs, subassemblies, and components in an assembly process, whether finished or unfinished. The movers and stators may be those described in WO2018176137A1 entitled "Robotic devices and methods for fabrication, use and control of same" and shown in FIG. 3. Movers 100 comprise magnetization elements 114, which magnetically couples with the activatable electromagnetic driving elements 135 of the stator 200. The magnetic coupling moves the mover over the stator's working surface in a precise manner through magnetic repulsion and attraction. The stator subsystem further comprises sensors 180 for sensing the location of the mover, a controller 180 and an amplifier 170 to controllably activate the magnetic elements 135.

The movers move over a working surface provided by the stator and may have a product securing mechanism 110 to hold one or more products. In some embodiments, all movers in a system are substantially similar or nearly identical. However, a system may comprise movers comprising magnet arrays of very differential size and configuration. In some embodiments, a stator comprises a plurality of coils distributed in one or more planar layers.

The stator provides a working surface (flat or curved or cylindrical or spherical) to movers and each mover is able to move along the working surface either in a contact manner (via contact media such as sliding and/or rolling bearings, contact mode or sitting mode) or without any contact by maintaining a controllable gap between a mover and a stator in the working surface normal direction with 6-DOF controllably motion (active levitation mode) or without any contact by maintaining a gap between a mover and a stator in the working surface normal direction by passive levitation means (passive levitation mode). Throughout this document, moveable motion stages, moveable stages, motion stages, and movers are interchangeably used. Each mover may comprise one or more magnet assemblies. Each magnet assembly may comprise one or more magnet arrays rigidly connected together. Each magnet array may comprise one or more magnetization elements. Each magnetization element has a magnetization direction. Generally, magnets on a mover interact with stator coils via a working gap that is much smaller than the mover lateral dimension, i.e. in a direction parallel with the stator working surface.

As used herein planar surface, planar movement and planar robot indicate motion that mostly takes place in 2 dimensions, typically on a flat work surface or at least generally flat with respect to the size of the mover, so that the magnetic coupling is provided as the mover moves on the work surface. Thus, while a curved work surface is possible, too tight a radius with respect to the mover size will mean that some products of the mover will not be in close enough proximity for the magnetic coupling to provide actuation.

One or more amplifiers 170 may be connected to drive a current in the plurality of magnetic elements 135 in the one or more stators. One or more controllers may be connected to deliver control signals to the one or more amplifiers. The control signals may be used to control current driven by the one or more amplifiers into at least some of the plurality of coils. The currents controllably driven into the at least some of the plurality of coils create magnetic fields which cause corresponding magnetic forces on the one or more magnet array assemblies of a mover, thereby moving the mover relative to the stator (e.g. within the working region) controllably in at least 2 in-plane degrees-of-freedom (DOF) motions, including but not being limited to 3 in-plane DOF controllable motions and 6 DOF controllable motions. The magnetic forces associated with the interaction between the magnetic fields created by the currents in the at least some of the coils and the magnetic fields associated with the magnet arrays may attract the moveable stage toward the stator at all times when the controller is controlling the currents driven by the one or more amplifiers. In some embodiments, the magnetic forces associated with the interaction between the magnetic fields created by the currents in the at least some of the coils and the magnetic fields associated with the magnet arrays may force the mover stage away from the stator to balance gravitational forces with an air gap at all times when the controller is controlling the currents driven by the one or more amplifiers. In some embodiments, the gap between movers and the stator is maintained by air bearings or compressed-fluid bearings.

In some embodiments, movers 100 may work in levitation mode, i.e. be levitated near the stator top surface without contact with the stator either in a passive way or in an active way, and move along the stator surface extending in X and Y directions, where X and Y are two non-parallel directions inside the stator working surface. The separation gap between a stator top surface and a mover bottom surface is much smaller than the mover dimension in X and Y. Although movers in many embodiments are capable of 6 DOF controllable motion, this is not necessary in all situations. In certain applications where the levitation feature (movers completely separates itself away from the stator without any contact to the stator) may not be needed and heavy load carrying capability is more important, it should be understood throughout this description by those skilled in the art that movers can sit on the stator stop surface with proper mechanical bearing (including but not being limited to planar sliding bearings, ball transfer units) and are capable of three in-plane DOF controllable motion (translation in X and Y and rotation around Z), where X and Y are two non-parallel directions in the stator top surface plane and Z is the stator top surface normal direction. When a mover relies on sliding and/or rolling bearing to sit on the stator top surface and the mover is capable of 3 in-plane DOF controllable motion (translation in X and Y and rotation around Z), it is working in the 3-DOF controlled sitting mode. In some embodiment, a mover is capable of 3-DOF controllable motions (translations in X and Y and rotation around Z) working in levitation mode without contact to the stator; in this mode, the translation in Z, rotation around X and rotation around Y (and thus associated DOF) are open-loop controlled without feedback, using suitable passive levitation technology known in prior arts. When a mover is capable of 3-DOF controllable motion without contact to stator, it is working in the 3-DOF controlled levitation mode.

Generally, a stator's working region is a two-dimensional (2D) area provided by the stator working surface, and movers can be controllably moved with at least two in-plane DOF motion inside the stator working region, with suitable feedback control algorithms and suitable position feedback sensors.

For purposes of describing the movers disclosed herein, it can be useful to define a pair of coordinate systems—a stator coordinate system which is fixed to the stator (see FIG. 3); and a mover coordinate system which is fixed to the moveable stage and moves with the mover relative to the stator and the stator coordinate system. This description may use conventional Cartesian coordinates (x, y, z) to describe these coordinate systems, although, it will be appreciated that other coordinate systems could be used. For convenience and brevity, in this description and the associated drawings, the directions (e.g. x, y, z directions) in the stator coordinate system and the directions in the mover coordinate system may be shown and described as being coincident with one another—i.e. the stator-x (or Xs), stator-y (or Ys) and stator-z (or Zs) directions may be shown as coincident with mover-x (or Xm), mover-y (Ym) and mover-z (or Zm) directions, respectively. Accordingly, this description and the associated drawings may refer to directions (e.g. x, y, and/or z) to refer to directions in both or either of the stator and stage coordinate systems. However, it will be appreciated from the context of the description herein that in some embodiments and/or circumstances, a mover (e.g. mover 10) may move relative to a stator (e.g. stator 30) such that these stator and mover directions are no longer coincident with one another. In such cases, this disclosure may adopt the convention of using the terms stator-x, stator-y and stator-z to refer to directions and/or coordinates in the stator coordinate system and the terms mover-x, mover-y and mover-z to refer to directions and/or coordinates in the mover coordinate system. In this description and the associated drawings, the symbols Xm, Ym and Zm may be used to refer respectively to the mover-x, mover-y and mover-z directions, the symbols Xs, Ys and Zs may be used to refer respectively to the stator-x, stator-y and stator-z directions and the symbols X, Y and Z may be used to refer respectively to either or both of the mover-x, mover-y and mover-z and/or stator-x, stator-y and stator-z directions. In some embodiments, during normal operation, the mover-z and stator-z directions are approximately in the same direction (e.g. within ±30° in some embodiments; within ±10° in some embodiments; and within ±2° in some embodiments). Although in this description, the working area is essentially flat and planar, it will be understood to those skilled in the art that this is not necessary and the top surface of the stator (the surface facing movers) can be a curved surface including but not being limited to cylindrical surface and spherical surface with suitable modification of control algorithm and stator coil layout disclosed herein and in the prior art.

The stator-x and stator-y directions may be orthogonal. Similarly, the mover-x and mover-y directions may be generally orthogonal.

When it is described that two or more objects overlap in or along the z-direction, this usage should be understood to mean that a z-direction-oriented line could be drawn to intersect the two or more objects.

A working region of a stator means the planar region where the stator can controllably move a mover by commanding current flowing into the stator coils in one or more degrees of freedom. Working region of a mechanical carrier means the locations where the mechanical carrier can support or guide a mover in one or more degrees of freedom. The overlapping region between a stator working region and a carrier working region means locations where the stator can controllably move a mover in one or more DOF and a carrier can support a mover (or a mover can be supported by the carrier) in one or more DOF. In such region, the mover may be controlled by the stator without the support by the carrier, or the mover may be supported by the carrier without the control by the stator, or the mover is controllably moved in some degrees of freedom and supported by the carrier in some degree of freedom. For example, a mover in the overlapping region may be levitated by stator with 6DOF motion control without contact to the stator or the mechanical support, and at another time at the same location the mover may land onto the mechanical carrier by turning off current in the stator coils inside the overlapping regions; alternatively, the mover may be supported and guided by a mechanical carrier (X oriented linear guide rail) in five DOF (Y, Z, Rx, Ry, Rz) and the stator may controllably move the mover in one DOF (X direction linear motion).

Controlling the motion of and/or controlling the position of moveable stages in or with multiple degrees of freedom may be understood to mean applying feedback position control in the multiple degrees of freedom but does not expressly require that there be motion of mover in any such degree of freedom.

A configurable 2D path may be understood as a line (straight or curved) inside stator working region with software configurable (modifiable) shape and length. Software configurable means modifiable by a software or a program or a set of parameters. In another word, a configurable 2D path is configured by software or is generated by software in real-time instead of being defined by mechanical hardware guiding means such as guide rails.

In this description, a floating bearing assembly means that the whole bearing assembly can move relative to the stator during robotic system operation. For example, a floating flexural bearing means the whole flexural is mounted on a moving frame; a floating linear guide bearing means that both the guide rail and the slider on the guide rail are not fixed with the stator frame and can move relative to the stator during the robotic system operation.

In this description, a floating linkage assembly means that the whole linkage assembly can move relative to the stator during robotic system operation.

In this description, a controllable force on a magnet array assembly means that by driving properly commutated current through a set of properly selected coils in a stator 30 a force can be generated with amplitude following a desired value in a direction through a plane. A plurality of independently controllable forces means that each of the plurality forces can be generated to follow a command signal independent of the rest of forces, and any two forces of the plurality of forces are not collinear in space.

In this description, two in-plane DOF motions means independent translation motions in two non-parallel directions X and Y, and both directions are orthogonal to the Z direction which is the normal direction of the stator top plane.

In this description, three in-plane DOF motions means independent translational motions in two non-parallel directions X and Y, plus rotational motion around Z, where Z is the normal direction of the stator top plane, and both X and Y are orthogonal to the Z direction.

In this description, 6 DOF motions means independent translation/rotational motions in X, Y, Z, Rx, Ry, Rz, where X and Y are non-parallel, X, Y, Z are not coplanar, Rx, Ry and Rz represents rotation direction around X, Y, and Z, respectively.

In this description, although one moveable robot is shown in many figures, it should be understood that multiple similar or different moveable robots can work together and share a common stator.

In this description, a mover (or a magnet assembly) being capable of n-DOF (where n is an integer number) controllable motion means that by driving suitable currents into suitable coils in the stator to interact with the mover (or the magnet assembly) and thereby generating force on the mover (or the magnet assembly), the n-DOF motion of the mover (or the magnet assembly) can be controlled by controllers in a closed loop, with the aid of suitable position feedbacks.

In this description, hinge joints, revolute joints, cylindrical joints are interchangeably used. A mover is said to be inside a region (working region or overlapping region). When it is described that one or more movers are inside a working region, this usage should be understood to mean that the mover magnet array footprint (projection onto the stator working plane extending in X and Y direction) is inside a working region.

In this description the mover's location is generally understood to be referring to the location of the mover's center In this description a transfer device is understood to be a conveyor system or one or more degree of freedom actuator which transfers product to and/or from a mover.

Figure 1B:
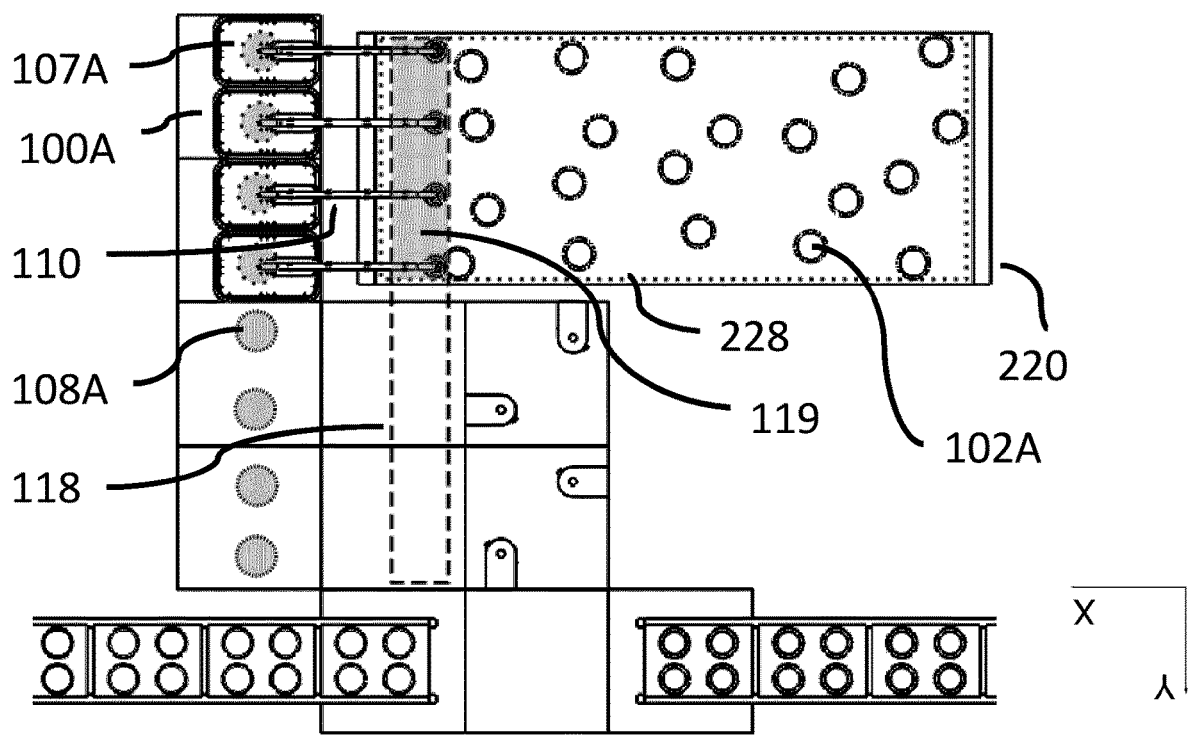
FIG. 1B is a plan view of a first mover's receiving and unloading locations
Figure 1C:
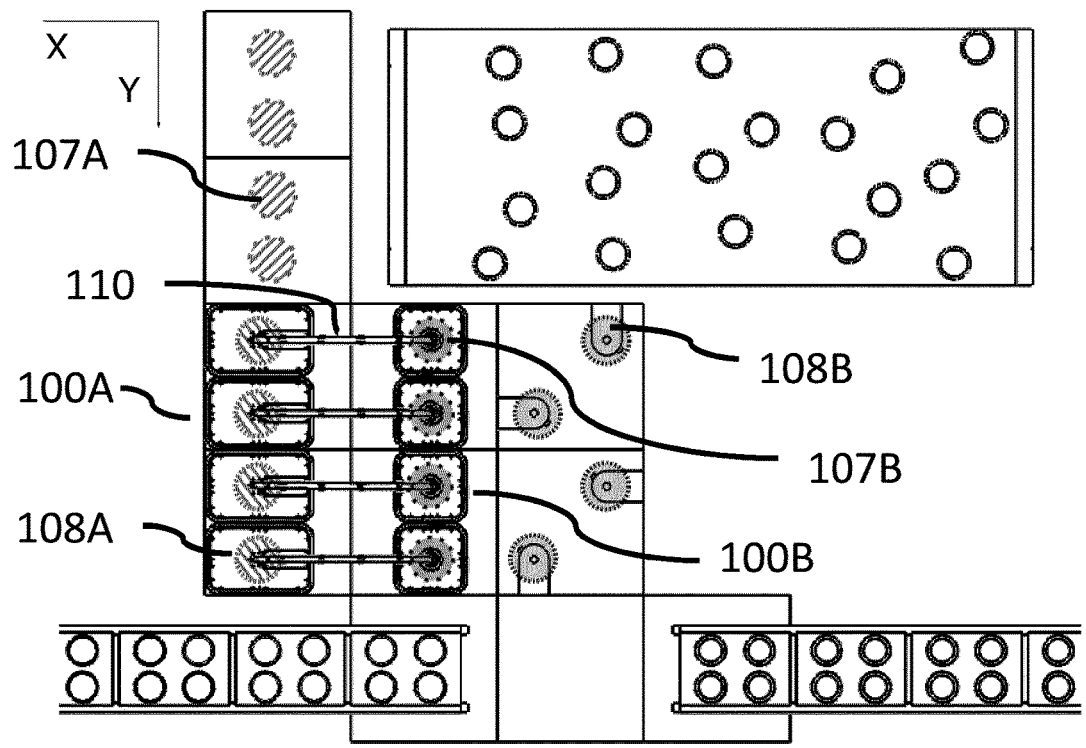
FIG. 1C is a plan view of two groups of movers directly transferring product
Figure 1D:
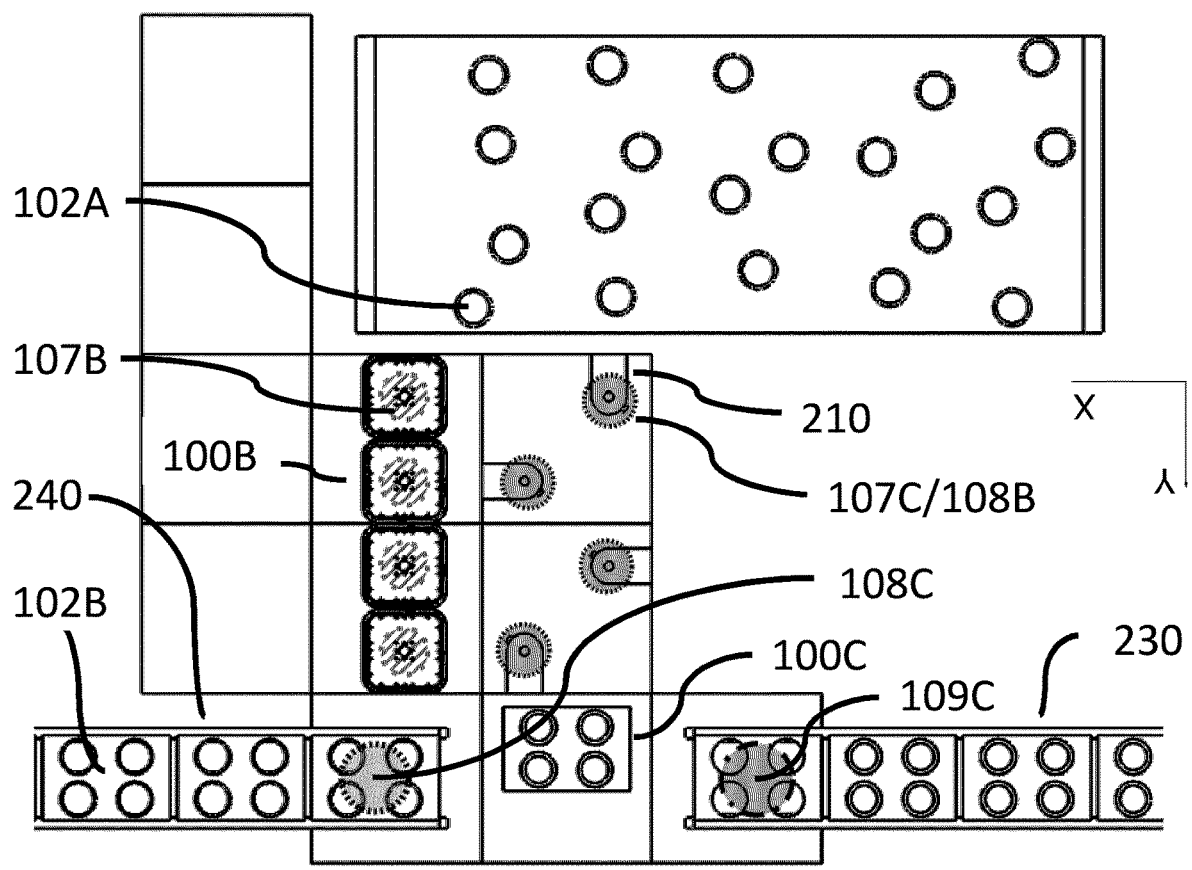
FIG. 1D is a plan view of two groups of movers transferring product via a transfer device
Figure 1E:
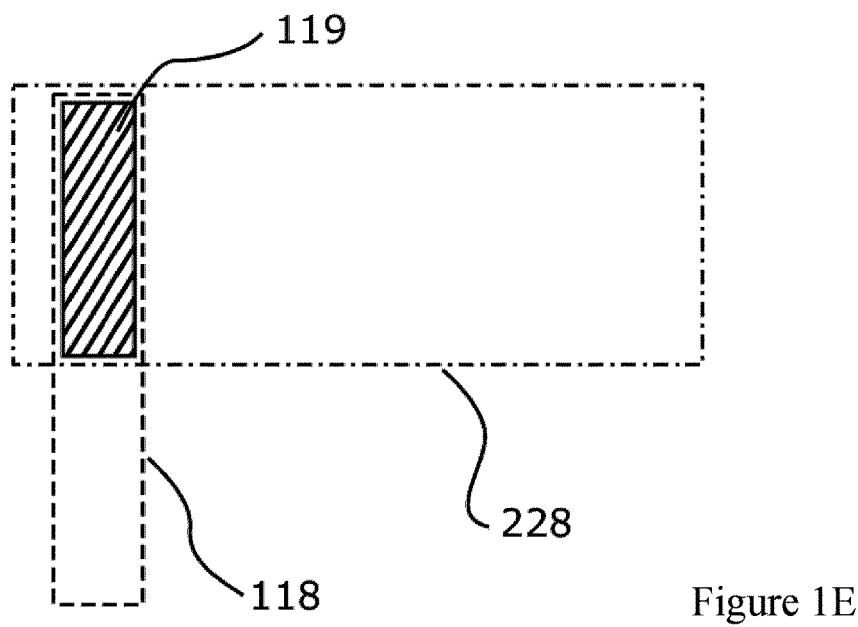
FIG. 1E is a plan view of overlapping 2D areas
Figure 2:
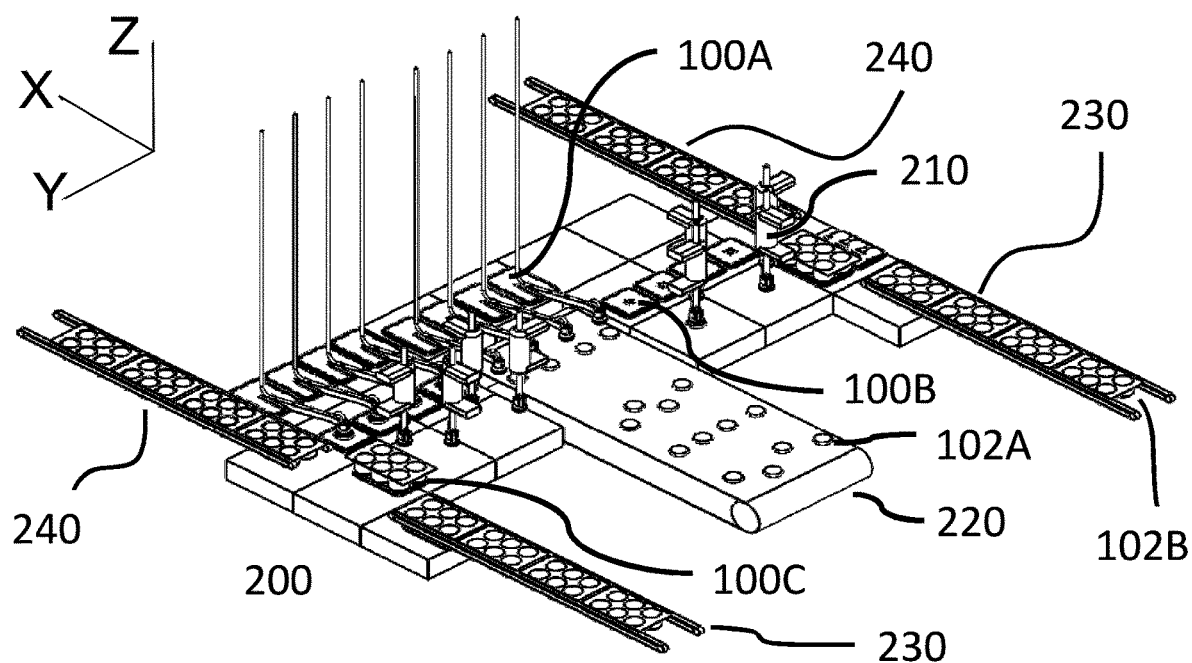
FIG. 2 is a perspective view of an assembly system.

FIGS. 1 and 2 describes a non-limiting example of a robotic assembly system 900 according to a particular embodiment. The system comprises one stator 200 comprising one or more stator modules, one or more movers 100, one or more controllers 70 (not shown), and one or more mover sensors 180 (not shown). The one or more movers may include 100A/100B/100C (operating in distinct streams on the left and right sides respectively). The system may further comprises an unsorted infeed 220, a product sensor 80 (not shown) to determine product locations on the infeed surface 221, one or more packaging infeeds 230, one or more packaging outfeeds 240 and one or more vertical actuators 210 with optional additional actuable Degrees of Freedom (DOF). Picking mover 100A carries an actuated product securing mechanism 110 (shown in detail in various embodiments in FIGS. 4, 5, 7, 8, 9 and 10) mounted on the mover and raised or lowered through the mover's vertical movement and/or rotational movement. Engagement of the securing mechanism 110 is powered/driven through an external (pneumatic or electric) connection 112 to a power source in order to secure, grip, retain or otherwise pick products at the outlet of the infeed. These movers dispose of the product at an outfeed transfer subsystem, in an ordered pattern (the pattern may be more conducive to packing).

There may be several outfeed subsystems to process, rotate or otherwise transfer the products to some final outfeed for assembly or packaging.

FIG. 1B shows a subset of the embodiment from FIG. 1A comprising a single set of movers comprising a first group of movers 100A (with a conveying area 118 for products 102A carried by the mover's product handling mechanism 110) and conveyor 220 (with conveyor working surface 228 for any carried products 102A on the conveyor surface 222). In this particular embodiment, the stator working surface and conveyor working surface 228 do not overlap, this is not necessary. The mover conveying area refers to the mover's capable planar motion offset to the carried product location (ie. to an end effector), creating an area that the product may be conveyed by the mover. The mover conveying area 118 and the conveyor working surface 228 overlap with each other in Z direction. Their overlapping area forms a 2D overlapping common region 119 (as shown in FIG. 1E). Inside the overlapping common region, a mover 100A may utilize Y motion to align the mover-mounted end effector's 111 Y position with the product 102's Y position, while utilizing X motion to match the end effector's 111 X position and speed with the X position and speed of the product along the conveying direction (X direction) before actuating the end effector along the Z direction to transfer a product from the conveyor to the mover. In this particular embodiment the stator 200 work surface does not overlap with conveyor work surface 229 along the Z direction. The receiving location 107A of a mover during the transfer is represented in the figure for illustrative purposes, however for this embodiment the specific location is not fixed due to the varying position of product 102A in the unsorted infeed. After receiving a product a mover will go to its respective unloading location 108A where the product may be released to a subsequent process. In some embodiments, the end effector 111 is a vacuum cup that can be activated by a vacuum source; in some embodiments, the end effector is an electrically activated actuator or gripper or clamp.

In FIG. 1B, more than one mover 100A may move as a group, i.e. they move together to their respective target locations with generally similar motion patterns but different start-to-ending displacement vectors (as the product pitch is generally not fixed due to the unsorted nature of the in-feeding products on the conveyor), to pick their respective target product from the conveyor 220, with coordinated motion to move closely and yet avoid collision. This is advantageous to improve productivity.

In various embodiments mover speed matching with conveyor speed along the conveyor's direction of motion is used, this is not always required to transfer the product between mover and conveyor. In most cases however speed matching will allow a higher throughput overall compared to stationary picking and will be less damaging to a received/unloaded moving product. Speed matching can be generalized to reaching a speed within 10% of the target along the corresponding direction of motion of the target.

FIG. 1C shows a subset of the embodiment from FIG. 1A comprising a first group of movers 100A (with respective first receiving locations 107A and first unloading locations 108A), a second group of movers 100B (with respective second group of receiving locations 107B and second group of unloading locations 108B), and product 102A. When the first group of movers 100A (at first unloading locations 108A) transfers the carried product to the second group of movers (at the receiving locations 107B) a first mover 100A and second mover are at an offset position corresponding to the first mover's product handling mechanism 110 which carries the product at an offset position. It should be understood by those skilled in the art that such offset is not necessary. In some other embodiments, the first unloading locations and the second receiving locations can be the same as shown later. In this particular embodiment each mover in the first group of movers 100A has a product securing mechanism 110 as a tooling to handle products, and each mover in the second group of movers 100B utilize their top surface or a fixture 104 (not shown) as tooling to handle their respective products 102A. Although in this example an equal first mover 100A and second mover 100B quantities are shown, this is not required. Any quantity of one or more first movers 100A and one or more second movers 100B may be used. Furthermore each first mover 100A and second mover 100B may carry more than one product 102A, which may be transferred from a first mover 100A to one or more second movers 100B or more than one first movers 100A to a second mover 100B FIG. 1D shows a subset of the embodiment from FIG. 1A comprising a first group of movers 100B (with respective first group of receiving locations 107B and first group of unloading locations 108B), a second group of movers 100C (with respective second receiving locations 107C, third receiving locations 109C and second unloading locations 108C), a first product 102A and second product 102B. In this particular embodiment, a first unloading location 108B is collocated with a second receiving location 107C, though this is not required. To transfer a product a first group mover (or a first mover) 100B may carry its product 102A to a transfer device 210 (ie. Z actuator) at a first unloading location 108B and unload the product 102A to the transfer device. A second group mover (or a second mover) 100C will receive a second product 102B (ie. packaging) at a third receiving location 109C from a package infeed (second transfer device) 230 and go to a second receiving location 107C, where the transfer device 210 may release the first product 102A to the mover. The second group of movers will go to the second group of unloading locations to unload carried first product 102A and carried second product 102B. Although in the above example, only one product is carried by a mover, this is not necessary. In some embodiments, a mover may carry multiple products simultaneously, and furthermore, receive one or more products at a time and may unload one or more products at a time. Although in the above example, one second product (packaging) 102B is received by a second mover 100C, this is not necessary. In some embodiments, more than one second products 102B may be received by a second mover at a time. Generally, a robotic device may comprise a stator providing a working surface supporting a plurality of movers driven in at least two in-plane DOF by the stator with suitable current commanded by one or more controllers.

In various embodiments, the plurality of movers may comprise a first group comprising one or more first movers each having a first tooling and a second group comprising one or more second movers each having a second tooling, different from the first tooling.

In various embodiments, the controller may be programmed to drive the first movers (such as 100A in FIG. 1) within a first region (the bottom row of stator modules in FIG. 1A) of the working surface to transfer one or more first products (such as 102A in FIG. 1) from a first receiving location (107A, when a 100A is positioned at 107A to pick a product 102A from a conveyor 220) for receiving the first products to a first unloading location (108A, such as when a 100A moves to 108A where the product 102A picked by the 100A is right over an 100B that is located at 107B) for unloading at least one of the first products; and circulate the second movers (such as 100B) within a second region (the second and third row of stator modules from the bottom in FIG. 1A) of the working surface, different from the first region, to receive at a second receiving location (for example, 107B, when a 100B is positioned at 107B to receive a 102A from a 100A located at 108A) one or more of the first products (102A) that are unloaded from first movers (100A) and transfer first products (102A) to a second unloading location (108B, for example, when a 100B is positioned 108B right under a transfer device, such as z-axis actuator, 210) for unloading one or more of the first products.

In various embodiments, the controller may be programmed to drive a second mover to a third receiving location to receive one or more second products (such as but not being limited to a package for the first product or a component to be assembled with the first product, generally termed as a receiving body in this document) first, then go to the second receiving location to receive one or more first products, and finally go to a second unloading location to unload the received first product(s) along with the second product(s). Particularly, the second product may be a packaging for the first product. Particularly, a first unloading location may collocate a second receiving location.

A group of movers 100B may be used as an intermediary outfeed between the picking movers 100A and the next or final outfeed. These movers 100B may utilize their top surface or a fixture 104 to support products 102A placed on it and carry the products to a subsequent outfeed. The vertical actuator (transfer device) 210 is a transfer subsystem to raise and lower products it receives using one or more actuated vertical elements with optional re-orientation of a product during placement. An additional group of movers 100C (see FIG. 14), acting as a further outfeed subsystem, carries packaging 102B, constrained and/or gripped by a fixture 104 mounted on the mover's top surface to the next or final outfeed.

During a synchronized product transfer (picking movement) for this embodiment, a mover 100 moves to a location above the surface of the stator 200, with its end effector 111 located above a product 102A on the product infeed 220 located within a picking region. While maintaining the relative location of the end effector 111 to the product (typically in motion along the conveyor's 220 infeed direction) the mover may actuate its securing mechanism (e.g. by suction cup 111) to grip and lift the product 102A from the product infeed surface 221. After being lifted from the product infeed surface 221 the product will be securely held by the securing mechanism 110 during future movements of the mover 100.

The mover 100A, carrying a product 102 gripped by the securing mechanism, moves to a unloading location 108A of the outfeed. This may be on another group of movers 100B, optionally also having a securing mechanism 104, conveyor or other suitable transfer system. At this disposal location the actuated gripper 111 releases the product so it is placed on the mover 100B (see FIG. 20).

Figure 22:
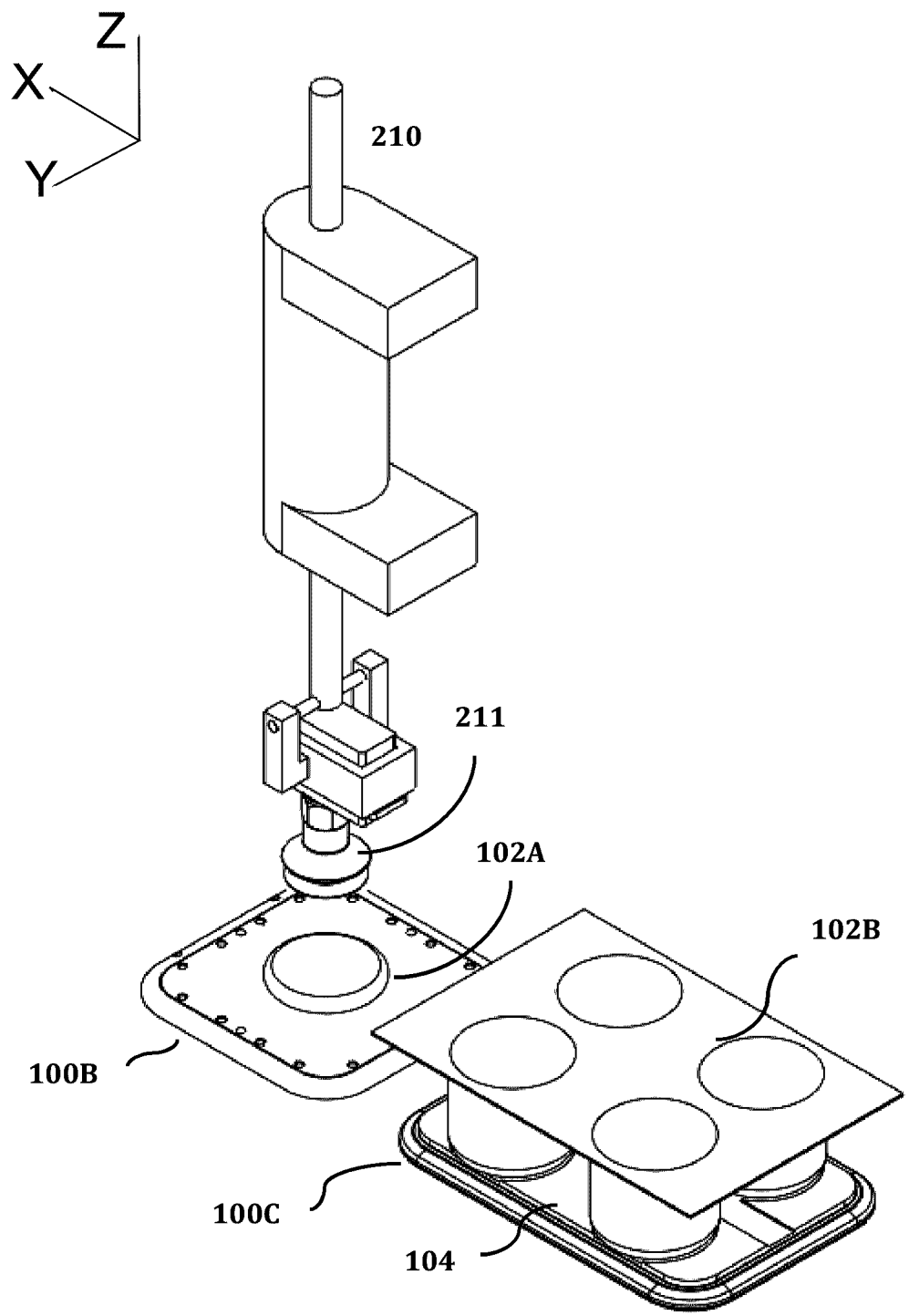
FIG. 22 is a perspective view of a vertical transfer prior to moving a product to a package.
Figure 23:
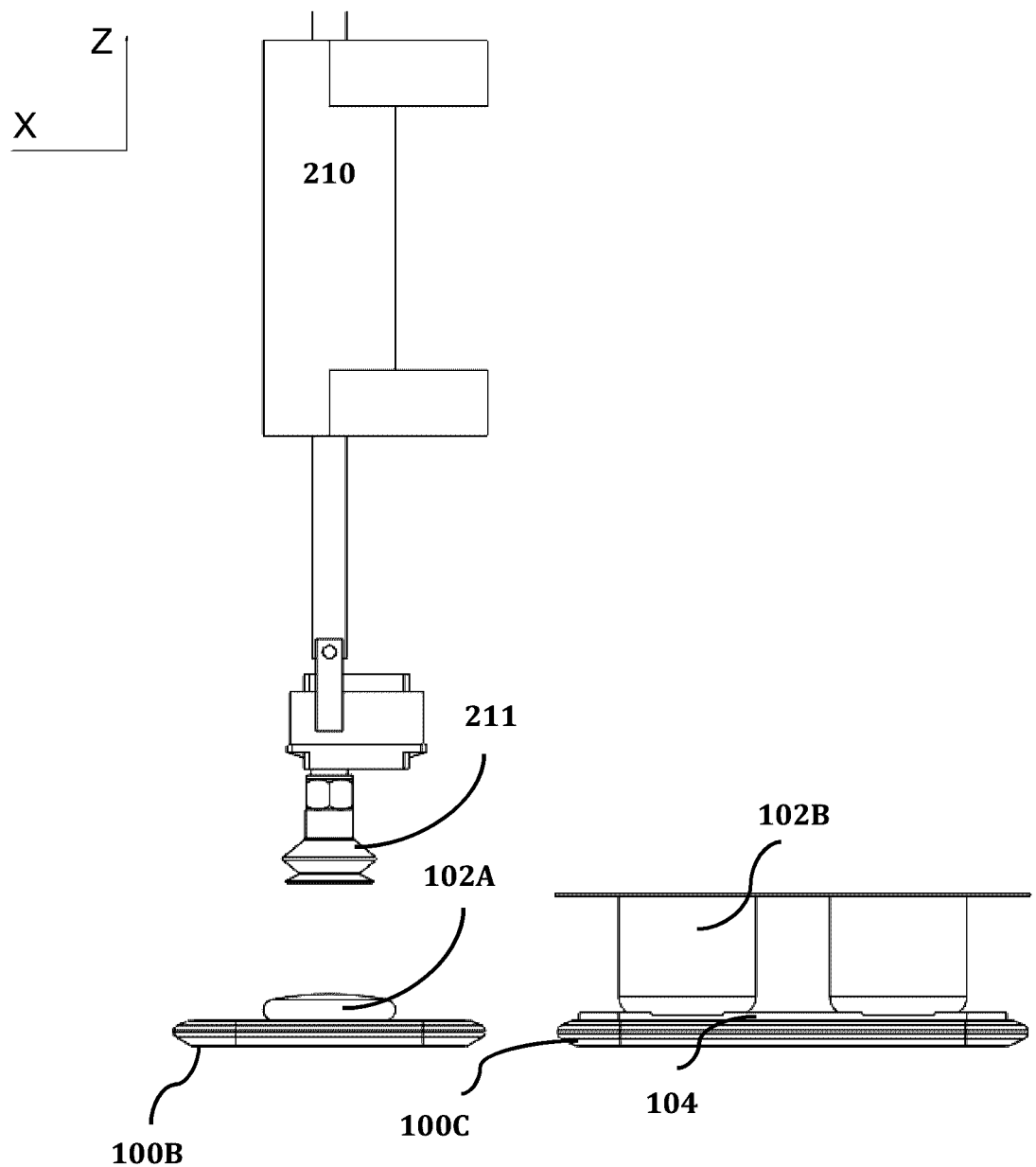
FIG. 23 is a side view of a vertical transfer prior to moving a product to a package.
Figure 24:
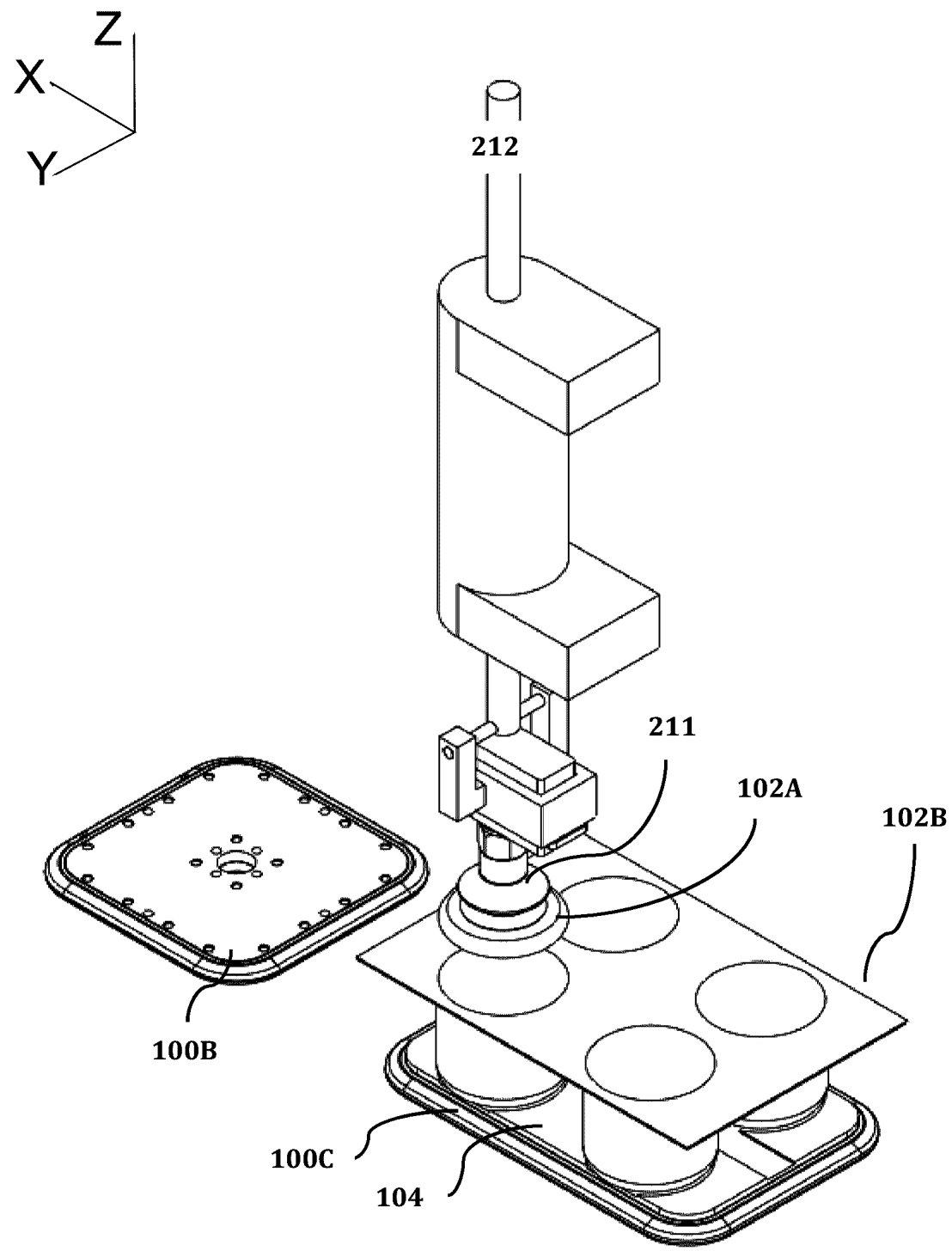
FIG. 24 is a perspective view of a vertical transfer dispensing a product to a package.

During a transfer motion (as shown in FIGS. 22-24), the mover 100B carries a product 102A underneath a transfer device 210 (vertical actuator), where the transfer device's 210 securing mechanism 211 is lowered until contact occurs with the product. After contact occurs the securing mechanism will grip and lift the product to an elevated position above the stator surface. A mover 100C (which could be the same or different from the initial mover) will move underneath the raised product to a desired position relative to the transfer device 210 (usually determined by the loading location of product onto the mover) The vertical actuator then lowers the securing mechanism to a location above mover 100C and releases the product thereby depositing the product 102A on the mover 100C, preferably in the packaging 102B.

In some embodiments the gripping mechanism securing mechanism 111 actively grips the product 102A. In some embodiments the gripping mechanism securing mechanism passively grips the product 102A.

In some embodiments the placement motion involves releasing the product 102A at an elevated position. In some embodiments the product is released while contacting the mover 100 surface or the fixture 104 mounted on the mover 100.

In some embodiments, the transfer device 210 operation will be a purely vertical motion to remove and deposit the product 102. In some embodiments, the product will be lifted vertically and rotated with respect to 1, 2 or 3 axes (X, Y, Z). In some embodiments the product will be deposited to a mover 100 surface or its receiving bay 104. The gantry may lower the product into the packaging by a variable distance depending on the packaging depth and number of products stacked.

In overview of the embodiment in FIG. 1A, product 102A is delivered to the product infeed 220 in a random, dispersed order. The system 900 uses one or more movers 100A with an actuated gripping mechanism 110 to receive the product 102A. The actuated gripping mechanism 110 will remove the product 102A from the infeed 220 and place the product on a secondary mover 100B. The secondary mover 100B will position the product 102A below an transfer device 210 (vertical actuator), which will receive, then raise the product 102A to an elevated position. A third mover 100C will go to the packaging infeed (a second transfer device) 230 for a loading motion of one or more pieces of packaging 102B, then while holding packaging 102B will move directly below the vertical actuator 210 such that the product 102A can be deposited in a desired location with respect to the packaging 102B. This process may be repeated until all desired products 102A are placed within the packaging 102B. Then the packaging 102B will be moved to the packaging outfeed 240 for an unloading motion.

As shown in FIGS. 1A and 2, there may be additional parallel groups of movers 100A/100B/100C moving from the picking region (shared with the first group) to its own packaging loading process with transfer device 210, infeed 230 and outfeed 240 subsystems, spaced-apart from the other infeed and outfeed. Thus, while one group of movers 100A is disposing product on one side of the assembly system 900, the other group of movers 100A is picking product from the infeed 220. Each of the two groups of movers will move from their respective unloading sides to the product infeed (with individual respective receiving locations) with opposite Y direction motion.

To be space and time efficient, several movers 100A, each with securing mechanism 110, may be operated in concert to simultaneously grab multiple products 102A on the infeed 220. Thus although the movers are actuated individually via the common stator, they move together as a group, covering generally the same path on the working surface between receiving locations and the unloading locations. The receiving location for each mover in the group will vary slightly for their respective products. The products may also be of multiple types requiring sorting, stacking and/or arrangement into a desired pattern conducive to packaging.

In some embodiments, more than one type of product will be picked and packed. In some embodiments with multiple mover 100C, multiple different types of a first product 102A or second product 102B will be held by a different mover 100C simultaneously, with potentially different respective product receiving or unloading locations. In some embodiments a product 102A will be directly transferred to packaging 102B carried by a mover 100C by the actuated gripping mechanism 110.

Figure 4:
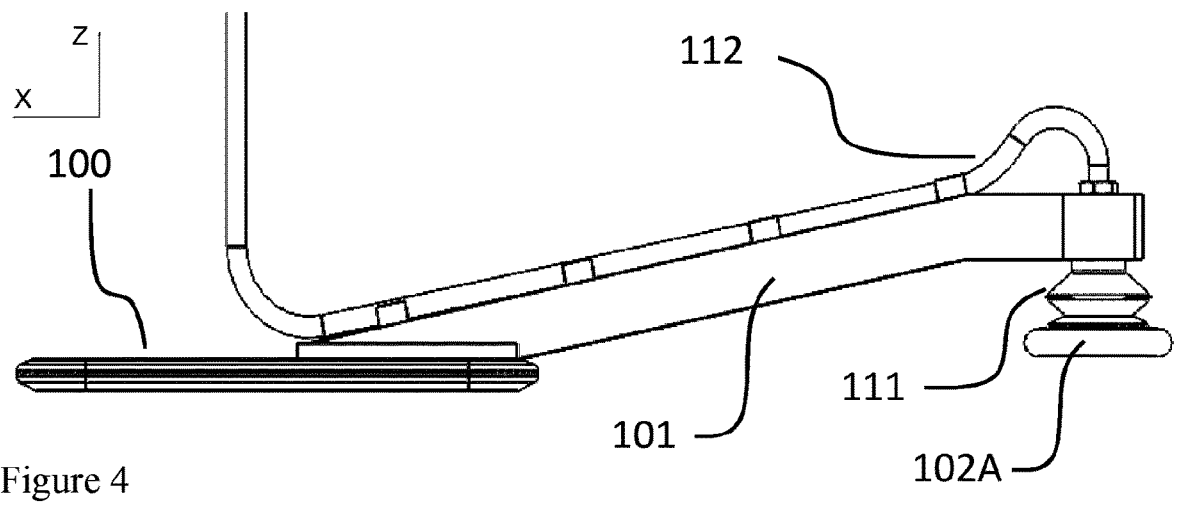
FIG. 4 is a side view of an air-actuated product securing tool on a planar robot.

As shown in FIG. 4, a mover comprising a securing mechanism 110 (vacuum cup connected 111 to an external source via a vacuum line 112), a cantilevered structure 101 (connecting the end effector 111 to the mover 100), and a stator 200 (not shown). This embodiment utilizes a combination of the mover's vertical position control and rotation about the Y axis to raise and lower the securing mechanism (particularly the end effector 111). The vertical position and pitch can be controlled separately from the planar motion of the mover 100 allowing the actuated gripping mechanism to pick up the product 102A while moving.

Figure 5:
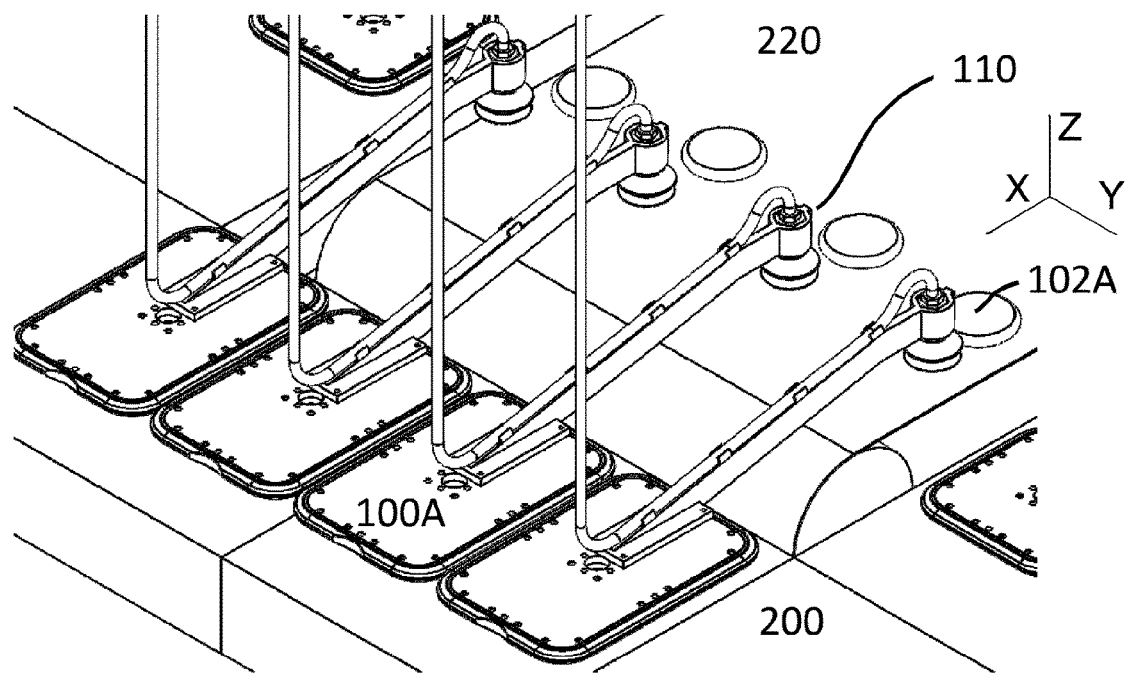
FIG. 5 is a perspective view of a group of planar robots in positions to pick products from a conveyor.

As shown in FIG. 5, a picking system comprising more than one mover 100A (each carrying an actuated gripping mechanism 110), a product infeed 220 (the product infeed surface 221 has more than one product 102A distributed on its working surface (in a sorted or unsorted manner), with a sensor 80 tracking their position) and a stator 200. The mover 100A carrying an actuated gripping mechanism 110 will move its end effector 111 to a position with respect to the product 102A and may match speeds during the picking motion to assist with product retrieval. During removal each mover 100 will use a combination of vertical motion and pitch motion to lift the product 102A from the infeed conveyor belt 221 and rotation about Z axis to locate the securing mechanism over the product when the product 102A is closer than the minimum mover 100 spacing. Alternatively, as needed a staggered pickup sequence is used if rotational movement is insufficient to pick up excessively close products 102. To perform a transfer with a moving product 102A on the product infeed 220 the mover 100A must utilize precise timing and movement to rapidly accelerate to simultaneously achieve synchronous position and motion with a workpiece for sufficient duration to perform a transfer motion before decelerating. Interception may be constrained by operating distance at each stage or cumulatively. Generally to achieve picking in quick succession two or more movers 100A will align with their respective products along the Y direction simultaneously, and the actual transfer (picking) timing for each mover will be dependent on each respective products conveying direction position and speed on the conveyor working surface.

In some embodiments, the product 102A position on the product infeed surface 221 is measured with an overhead camera or sensor 80 to allow the mover 100 carrying an actuated gripping mechanism 110 to accurately secure the product 102A during a picking motion. In some embodiments, the product is located by triggering one or more sensors located at fixed locations along the product infeed 220. In some embodiments the contact force between the product 102A and the securing mechanism 111 is used to trigger the picking motion of the actuated gripping mechanism 110.

Figure 6:
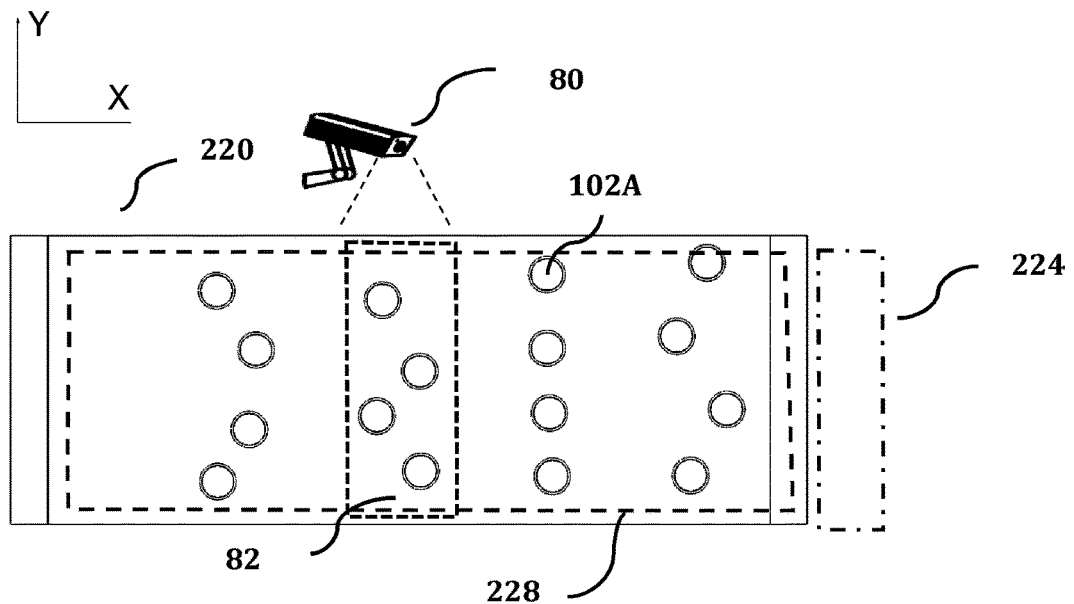
FIG. 6 is a plan view of an infeed subsystem carrying products.

FIG. 6 shows an overhead view of a product infeed 220 embodiment comprising an infeed surface (a conveyor belt), multiple products 102A (distributed unevenly on the infeed surface 221), an infeed sensor 80, a conveyor working surface 228 (comprising locations where products may be conveyed by the mover) and a rejection area 224 (located at the end of the infeed). The sensor identifies the non-deterministic position of each product 102A on the infeed surface 221 and the controller 70 utilizes the position information to coordinate the picking operation of each product 102A by an actuated gripping mechanism 110 in a common conveying region 119. The infeed sensor is also used to assess the quality of each product any products identified as not meeting quality requirements will not be picked by an actuated gripping mechanism thereby falling off the end of the infeed into a rejection area for disposal or further processing.

In some embodiments products 102A identified as defective will not be picked up by a product handling mechanism 110 thereby falling off the end of the conveyor into a suitable disposal area 224. In some embodiments where the product infeed 210 is operated at a fixed speed, any products exceeding the capacity of the product handling mechanisms 210 or in excessive density on the infeed 220 will automatically be rejected to a disposal area 224, potentially to be reused again in the future. In some embodiments a product infeed 220 will be variable speed-controlled the infeed to regulate the product 102A rate.

Figure 7:
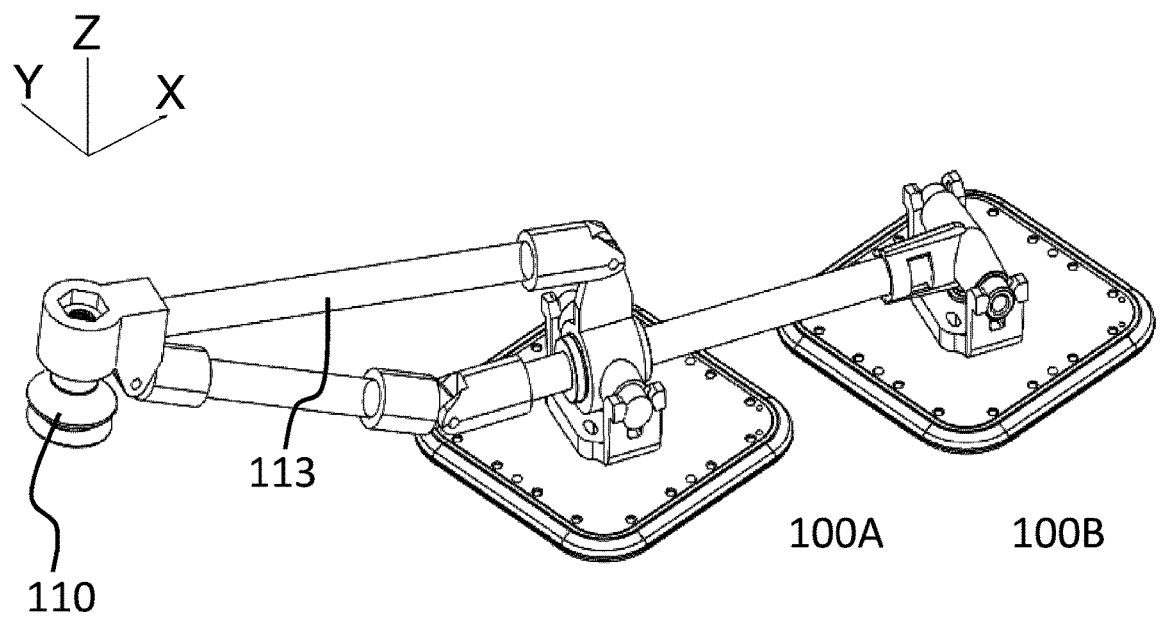
FIG. 7 is a perspective view of an alternative securing tool using dual movers.
Figure 8:
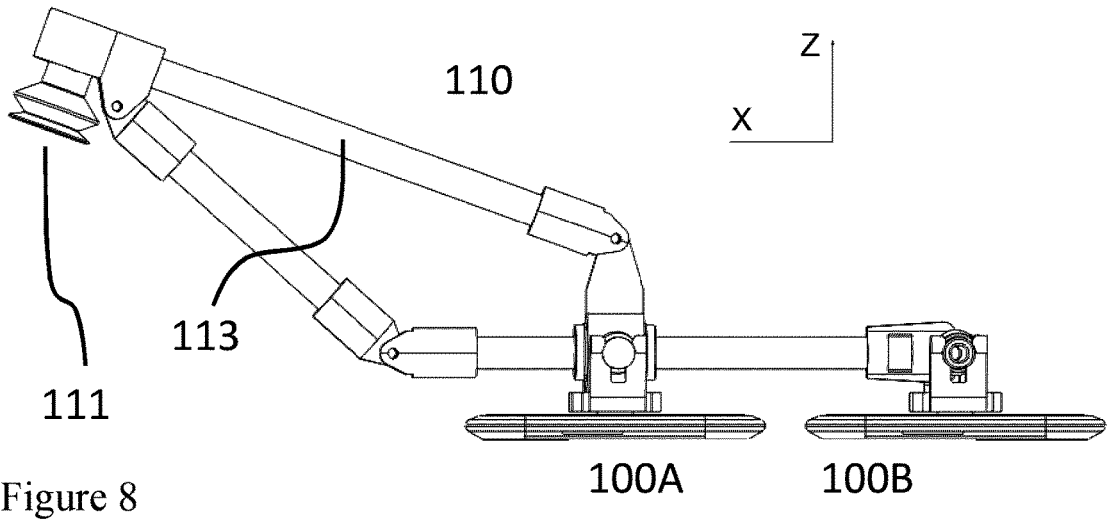
FIG. 8 is a side view of a securing tool using dual movers in a raised position.
Figure 9:
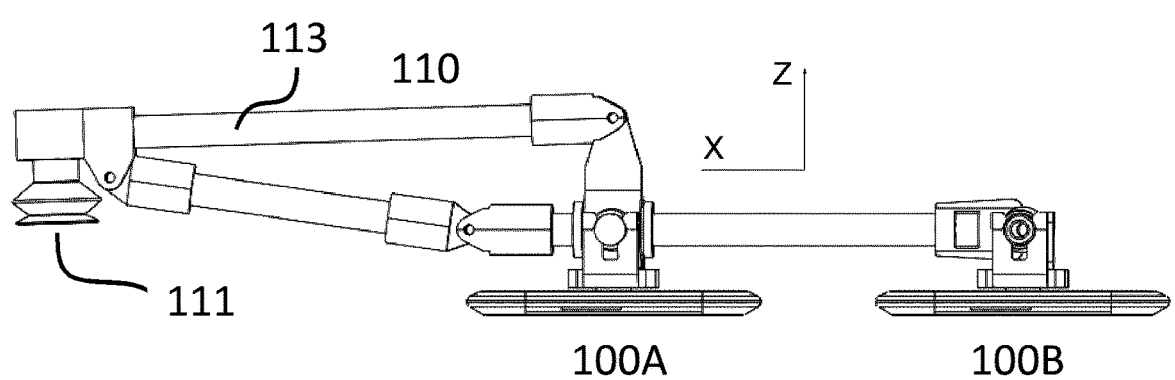
FIG. 9 is a side view of a securing tool using dual movers in a lowered position.

FIGS. 7, 8 and 9 show an iso and side views of an actuated gripping mechanism 110 in lowered and raised configurations. This embodiment comprises a cantilevered arm 113 (three struts connected with hinge elements and a linear bearing), two movers 100A/100B, a securing mechanism 110 (vacuum cup or actuated gripper). This embodiment utilizes a constrained linkage 113 to convert the relative movement of two movers into a rotational movement (with a vertical movement component) capable of lifting products 102 off the infeed surface 221. In this embodiment the relative distance controls the height of the securing mechanism and the angular position of mover 100B about mover 100A controls the rotation of the securing mechanism 111 about mover 100A (as shown in FIG. 7). In some embodiments the strut connections on each mover may be capable of rotational movement about the vertical axis and/or a secondary orthogonal axis. The additional rotational compliance would be used to allow for angled lifting of products 102 and prevent over constraining the movers 100.

Figure 10:
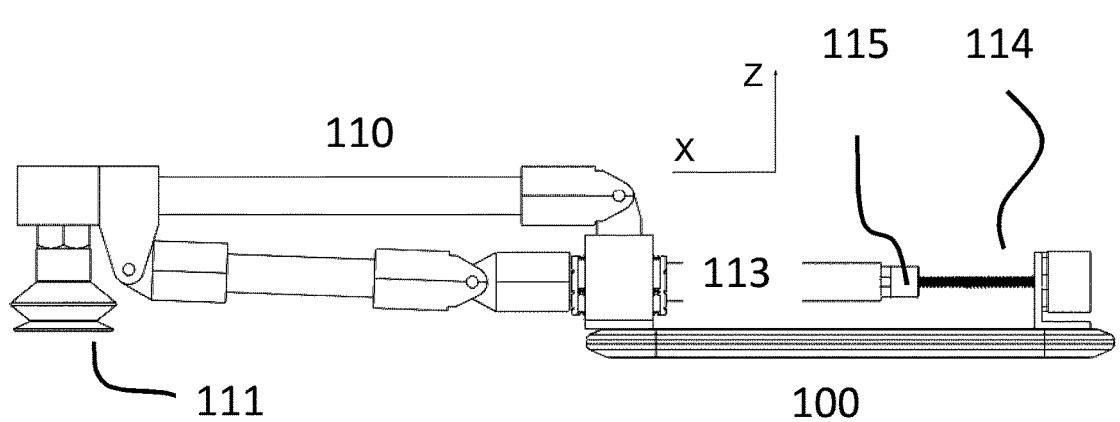
FIG. 10 is a side view of a securing tool using a single mover in a lowered position.

FIG. 10 shows a side-view of the product removal apparatus comprising a mover 100, an actuator 114 (electric motor), cantilevered arm 113 (three struts connected with hinge elements and a linear bearing), a gearing mechanism 115 (lead screw and nut), and a securing mechanism. The lead screw mechanism 115 is connected to the motor 114 and can be actuated to control the vertical position of the securing mechanism 111. By coordinating the control of the motor with the mover 100 movement it is possible to pick a product 102 from the infeed surface 221, while matching the infeed 220 speed to smoothly pick up the product 102. Raising and lowering the securing mechanism 111 may also be achieved with a combination of motor actuation and mover 100 motion control to achieve a faster picking motion.

In various other non-limiting embodiments, the onboard actuation of the lifting linkage shown in FIG. 10 could be replaced with a pneumatic cylinder, a motor driven rack and pinion, motor driven cable system or similar actuation mechanism.

Generally the product securing mechanism 110 embodiments where the end effector is positioned beyond the edge of the mover 100 may be utilized to extend an end effector beyond the edge of the mover's working surface, thereby allowing mover product handling outside of the mover's working surface area.

In some embodiments a transfer device 210 is used to transfer a product 102A to a mover 100, a fixture 104, or a product 102B. In some embodiments the vertical actuator 210 rotates the product 102 with respect to one or more axis of rotation. Rotation around the vertical axis allows for non-circular products, which may require a particular orientation, to fit within the packaging 102B. An additional rotation axis would allow the product 102A to be placed at an angle into the packaging 102B. In some embodiments each vertical actuator moves independently. In some embodiments multiple vertical actuators may utilize a single actuating element to actuate a shared degree of freedom for multiple vertical actuators 210.

Figure 11:
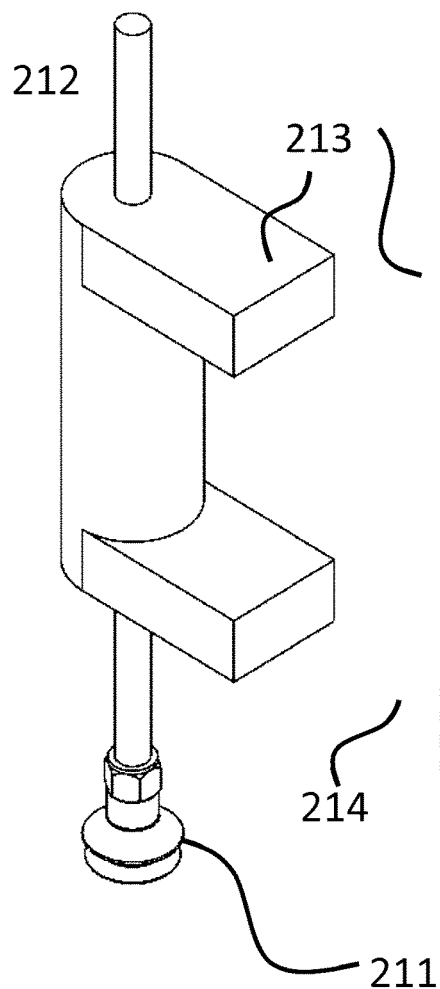
FIG. 11 is a vertical transfer mechanism.

FIG. 11 shows a transfer device (vertical actuator) 210 according to one embodiment comprising a linear actuator (the linear actuator is aligned vertically with a securing mechanism 211 located at its end), and a rotating actuator 213 (the rotating actuator supports the linear actuator 212 and rotates it with respect to the Z axis). In operation, mover 100 (carrying a product 102) positions the product 102 beneath the securing mechanism 211, then the securing mechanism 211 is moved by the linear actuator in the −Z direction until contact occurs between the securing mechanism and the product 102. After the securing mechanism 211 is actuated to actively grip the product 102, the linear actuator 212 moves the securing mechanism in the +Z direction to sufficient height for a further transfer device to be moved beneath the vertical actuator to receive the product. The rotating mount 213 allows the vertical actuator to deposit the product after rotating from an initial Z axis orientation to a new Z axis orientation. The combined motion of the vertical actuator 212 with the mover 100 will create analogous functionality as a SCARA robot, except with the packaging 102B moving with respect to the fixed (in X and Y directions) product 102A.

In another embodiment similar to the embodiment shown in FIG. 11, the mount 213 is fixed and does not rotate the securing mechanism 211 relative to the stator 200. This embodiment would be suitable for handling circular products 102 or in cases where any yaw orientation of the product can be accommodated by larger receiving locations in the packaging 102B.

Figure 12:
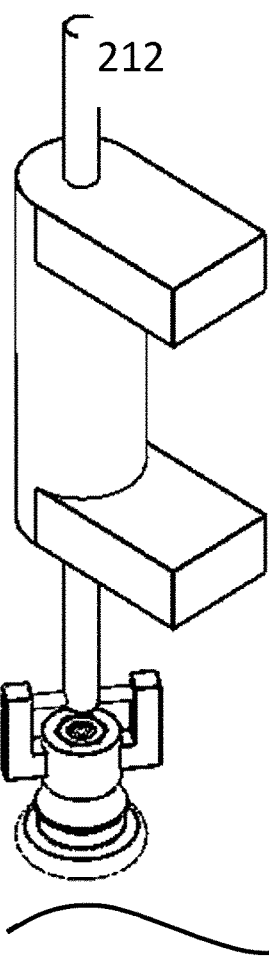
FIG. 12 is an alternative vertical transfer mechanism.

FIG. 12 shows a transfer device (vertical actuator) 210 according to one embodiment comprising a linear actuator 212 (actuation in Z axis) and rotary actuating system 213 (rotation about Z axis), securing mechanism 211, and an actuated revolute joint 214 (a secondary non-Z axis). This embodiment is capable of three DOF controlled motion, vertical, rotation about vertical axis and rotation about secondary revolute joint 214 (rotated perpendicular to Z-axis rotation). When the transfer device (vertical actuator) 210 is operated with movers 100, each product 102 can be placed in a desired orientation at a position controlled by the mover 100 receiving the product. This embodiment's control of rotation about the vertical axis is useful for non-circular products which enter the infeed in a non-desired orientation. Using rotation about the vertical axis, the vertical actuator 210 can adjust product 102 orientation during deposition to match its placement within the packaging 102B. In the case of a product entering the infeed upside down, when received by the vertical actuator a flipping operation can be carried out using the secondary rotation axis 214 of the vertical actuator 210 in this embodiment, by rotating the product 90 degrees or more before releasing the securing mechanism 211 and utilizing the movement of the mover 100 to set the product down on the desired side. This embodiment's secondary axis of rotation 214 may also be utilized when placing the product at a predetermined angle for packaging. Since this embodiment only features one secondary rotation axis 214, if the secondary rotation axis is going to be used for non-circular products 102 the product must be picked up such that the secondary rotation axis is aligned with the required motion.

Figure 13:
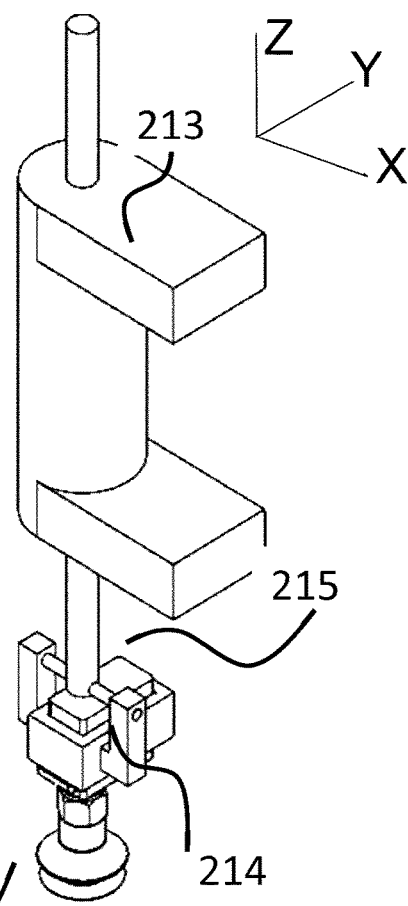
FIG. 13 is an alternative vertical transfer mechanism.

FIG. 13 shows a particular transfer device (vertical actuator) 210 embodiment comprising a motorized linear actuator 212 (actuated in Z direction), rotary actuator 213 (rotation about Z axis), a securing mechanism 211, an actuated revolute joint 214, and a servo or equivalent actuated revolute joint 215. The actuated rotation axes may be aligned to create a spherical wrist for simpler kinematics. In this embodiment the combination of three actuated rotational axis allows for full orientation control limited only by each axes range. This embodiment's capability for orientation control allows a product 102 to be picked up with non-deterministic orientation and placed in any orientation required for the packaging 102. The combined movement of the vertical actuator 210 and the mover 100 will result in analogous movement to a 6 DOF SCARA robot. In this configuration the transfer device (vertical actuator) 210 will fully compensate for the inherent limited vertical motion and rotation capabilities of the mover 100 for movement of product 102A and packaging 102B relative to each other.

Figure 14:
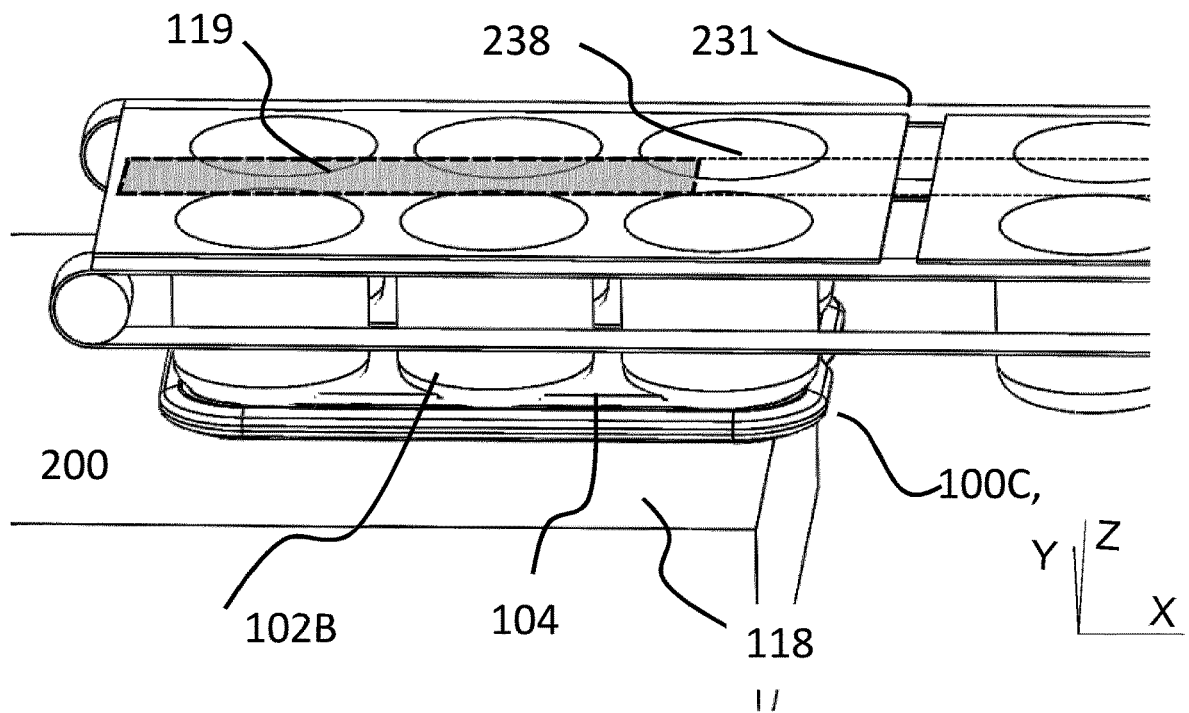
FIG. 14 is a perspective view of a packaging infeed transfer system.
Figure 15:
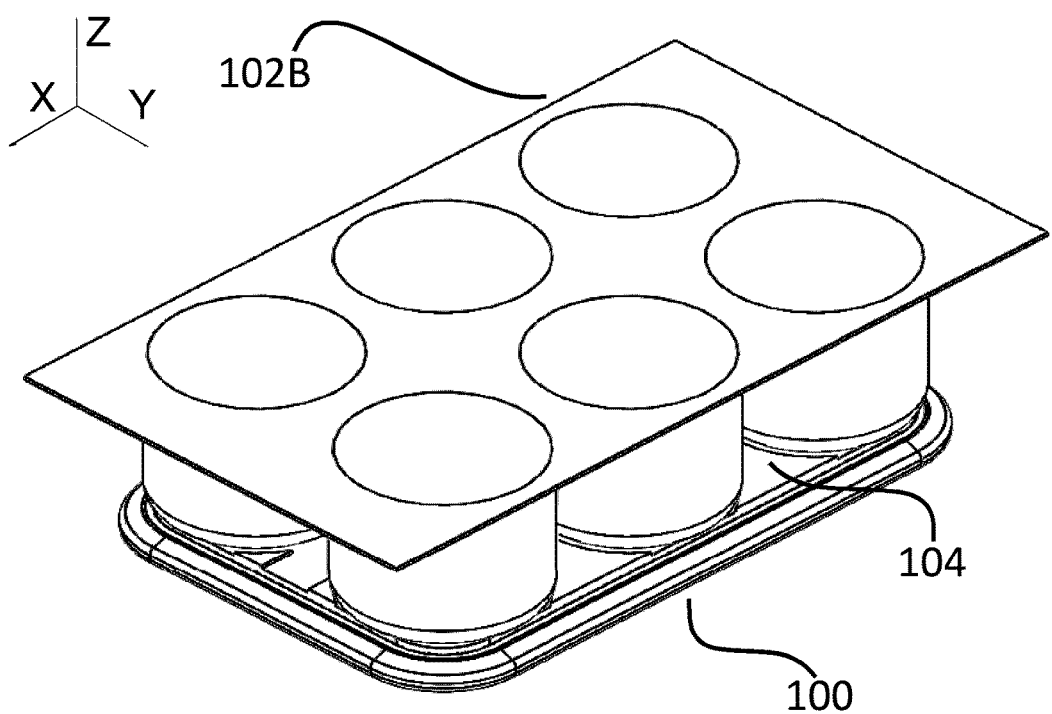
FIG. 15 is a perspective view of a packaging module on a mover.

As seen in FIG. 14, for the packaging infeed 230 product transfer subsystem there is an effective conveyor working surface 238 determined by the movement direction of the infeed and the lateral positionality of a product (packaging) 102B on the infeed. The packaging carrying mover 100 also has a product conveying area 118 generally equivalent to the stator 200 working surface in this particular embodiment. At locations where the two generally parallel planes of the mover's working surface and conveyor's working surface overlap (along the Z direction) in a common region 119 a product transfer may be possible with a transfer motion. When the mover 100 moves to an overlapping position (aligns with respect to Y direction and X direction) underneath the product 102B on the packaging infeed and synchronizes the mover's X position and motion with the product on the conveyor a transfer motion (+Z movement) may be used to transfer the packaging from the infeed to the mover. The mover 100C with a fixture 104 moves underneath the parallel infeed belts 231 carrying products (packaging) 102B. While maintaining the relative X/Y position of the mover to the product 102B, the mover levitates at a high Z position to contact the product and lift it from the infeed belts, by moving in a direction aligned with the belt motion the end of the belts is reached. While the mover is carrying the product 102B, the mover mounted fixture 104 supports and constrains the motion of the product (a shown in FIG. 15).

Figure 16:
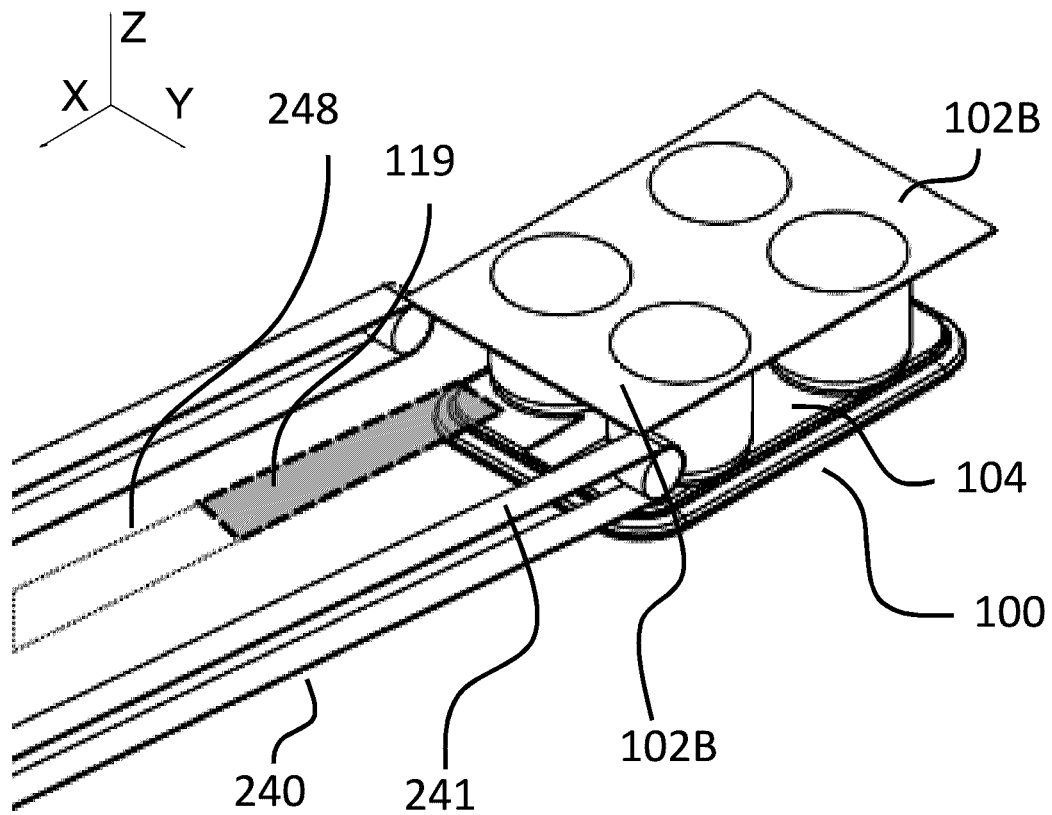
FIG. 16 is a perspective view of an outfeed transfer system being loaded.

A product outfeed embodiment is shown in FIG. 16, comprising a mover 100 (with a mover conveying area 118 generally equivalent to the mover 100 working surface for this particular embodiment where a carried product can be moved by the mover, not shown) the packaging outfeed 240 (with a effective conveyor working surface 248 determined by the movement direction of the outfeed and the lateral positionality of packaging on the outfeed). At locations where the two generally parallel planes overlap (along the Z direction) there is a common region 119 where a product transfer may be possible. When the mover 100 moves to an overlapping position, while carrying packaging (mover is underneath the packaging outfeed) a transfer motion (−Zm movement) may be used to transfer the packaging from the mover to the outfeed surface 241 while the mover maintains synchronous motion with the conveyor.

In some embodiments outfeed belts may be angled slightly to allow the outfeed to assist with lifting the packaging off the mover as it is actuated with matching speed by the mover/outfeed along its length. In some embodiments the outfeed surfaces may be inclined to create a lifting action as the mover pushes the packaging along the outfeed's length.

Figure 17:
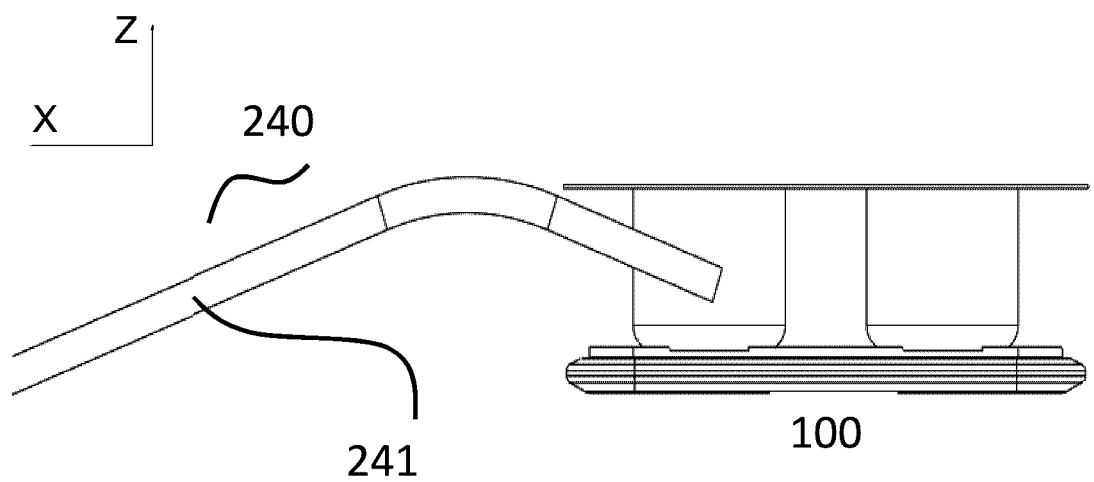
FIG. 17 is a side view of an outfeed transfer system
Figure 18:
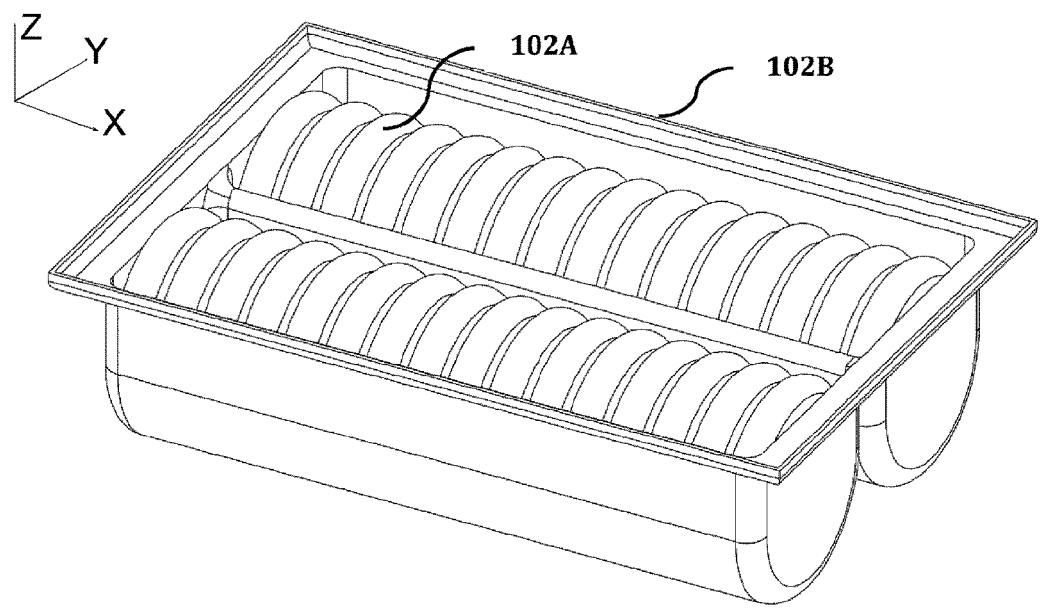
FIG. 18 is a perspective view of a package loaded with products.

FIG. 17 shows a product outfeed embodiment utilizing an inclined chute to convey product along the outfeed FIG. 18 shows an embodiment of product packaging comprising a piece of packaging 102B and multiple products 102A (arranged in a multi-product layout with products reoriented to be on edge. During a transfer process the packaging 102B (a product designed to hold other products 102A) for different applications requires the products to be reoriented before placement, and this particular embodiment requires each product to be rotated with respect to the X axis by around 90 degrees before being placed. This reorientation can be accommodated by embodiments such as the ones shown in FIG. 12 and FIG. 13 with an actuated revolute joint 214.

Figure 19:
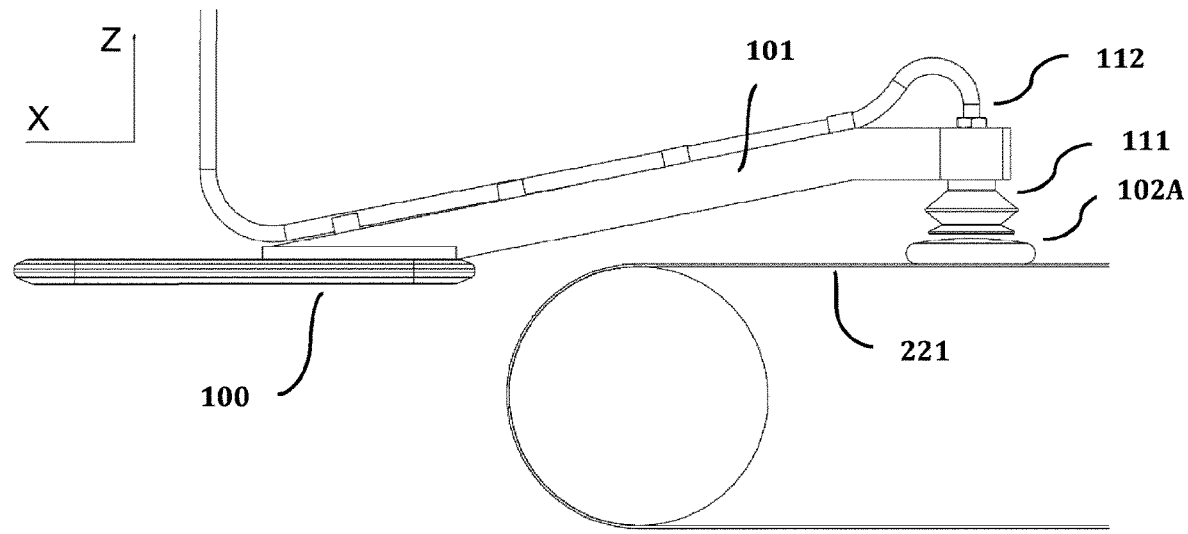
FIG. 19 is a side view of a mover with picking tool picking a product from an infeed.

FIG. 19 shows picking process embodiment comprising a mover 100 (carrying a product handling mechanism 110), an infeed 220, a product 102A (located on the infeed surface 221), and a stator 200 (not shown). During the picking process the mover 100 aligns the end effector 111 with respect to the Y position of the product 102A on the conveyor working surface. The mover then matches the X position of the product 102A with its end effector 102A (during conveyor motion speed will typically also be matched). While the correct relative position of the mover 100 and product 102A is achieved (the relative position is determined by the position of the end effector 111 relative to the mover 100) the end effector 111 is then moved in a −Z direction towards the product 102A until contact occurs (a vacuum cup end effector 111 has some compliance to avoid damaging the product 102) through Ry rotation, −Z vertical movement or some combination. After contact occurs the securing mechanism is activated by the controller 70 (ie. the vacuum cup 111 is activated through a solenoid 114 regulating the vacuum line 113). After gripping the product 102A the mover 100 lifts the securing mechanism 111 (particularly its end effector) and product 102A with a +Z movement through Ry rotation, +Z movement or some combination.

Figure 20:
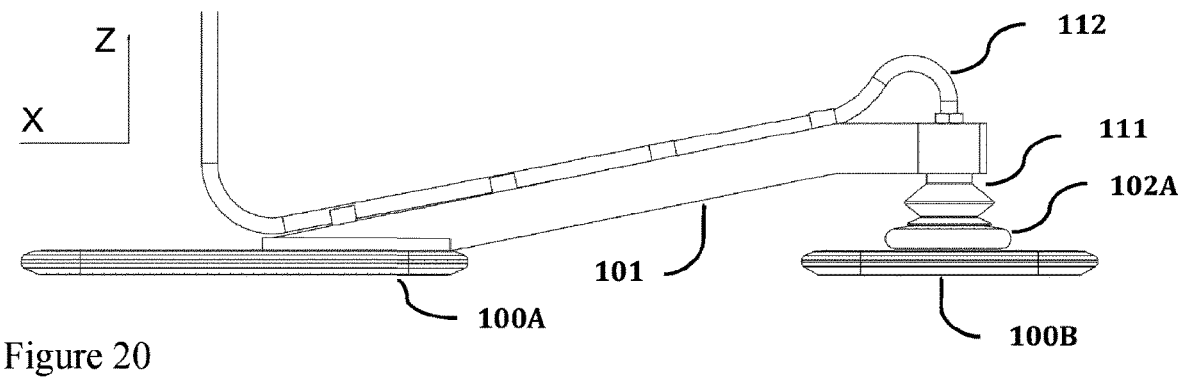
FIG. 20 is a side view of a mover with picking tool disposing a product on an outfeed mover.
Figure 21:
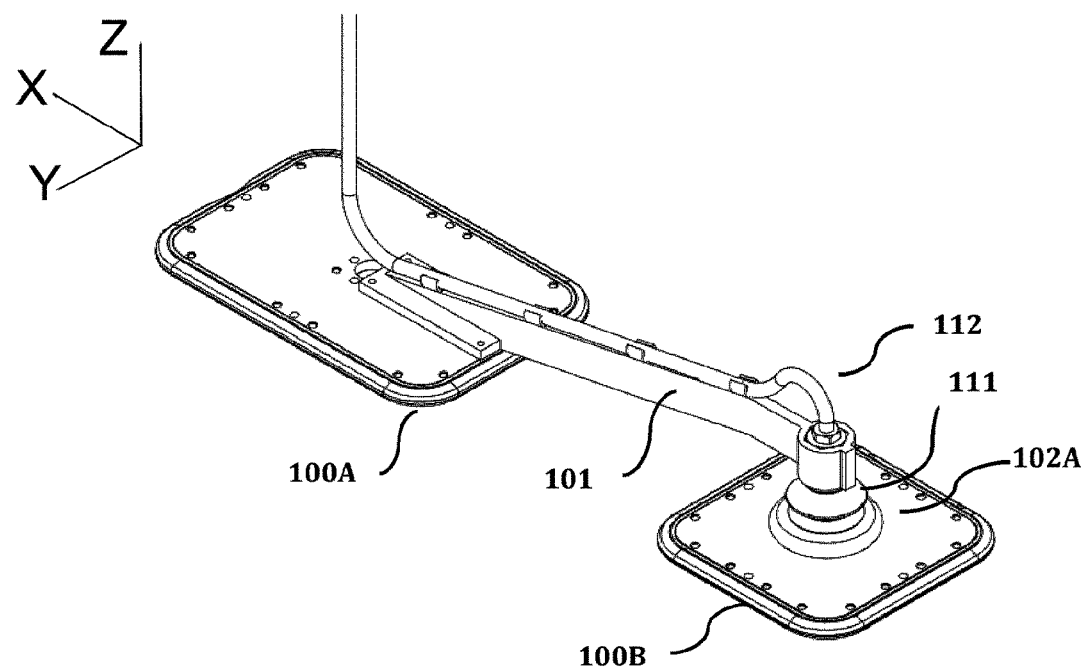
FIG. 21 is a perspective view of the mover in FIG. 20.

FIG. 20 and FIG. 21 show a placement process embodiment comprising a first mover 100A (carrying a product handling mechanism 110), a second mover 100B, a product 102A (carried by the product handling mechanism 110 securing mechanism 111), and a stator 200 (not shown). During a placement process first mover 100A will move to a position (first unloading location 108A) relative to the receiving second mover 100B (the relative distance is determined by the position of the securing mechanism relative to the mover 100) positioning the product 102A directly over the second mover 100B(positioned at second receiving location 107B) top surface (mover 100B may optionally be carrying a fixture 104 to support the product 102). Through −Z vertical movement of the end effector the product is moved until it contacts the mover 100 or reaches a safe vertical dropping distance. When the end effector 111 is vertically positioned over the second mover 100B the controller 70 will deactivate the securing mechanism 111 (the vacuum cup 111 is de-activated through a valve 114 regulating the vacuum line 113), resulting in the securing mechanism 111 no longer gripping the product 102A and the second mover 100B fully supporting the product 102. Mover 100A will raise the securing mechanism to a vertical height sufficient to avoid incidental contact with the product 102A through Ry rotation or +Z movement before moving away from mover 100B (with X/Y motion). In this embodiment the first mover 100A circulates between the product infeed receiving area (first loading location 107A) and a inter mover transfer location (first unloading location 108A), while the second mover 100B circulates between the inter mover transfer location (second receiving location 107B) and a unloading area 108B. At the mover to mover transfer location the product held by the first mover at an elevated position is released to the second mover, thereby changing how the product is held by a mover allowing a subsequent transfer not initially possible from the first mover. The transfer process requires the coordinated motion of both movers, with each mover capable of independent 3DOF control.

FIGS. 22 to 24 show isometric and side views of an aided transfer process embodiment comprising a first mover 100B (initially carries the product 102A), a second mover 100C (carries packaging 102B to place the product 102A within), a transfer device (vertical actuator) 210, and a stator 200 (not shown). During a transfer process the first mover 100A will move to a first unloading location (at a position relative to the transfer device's 210 securing mechanism 211) positioning the product such that the securing mechanism 211 will be able to grip effectively at a known position. The vertical actuator 110 will lower the securing mechanism though a linear actuation of an actuator 212 in −Z direction. After contact occurs between the product 102A and the securing mechanism 211, the controller 70 will actuate the securing mechanism 211 to grip the product (for a vacuum cup securing mechanism a valve 216 will be actuated to control a vacuum line 217). While gripping the product 102A the securing mechanism 211 will be moved in a +Z direction to a sufficient height for mover 100B and the packaging 102B being carried by it to move underneath the securing mechanism 211 (to a second receiving location 107C) while avoiding any incidental contact. When mover 100B has positioned the packaging 102B relative to the product 102A then the securing mechanism is lowered with a −Z motion until either contact occurs between product 102A and packaging 102B or the product is at a suitable height, and at this point the product 102A is released by the securing mechanism for placement in the packaging 102B. After this occurs the securing mechanism will move in a +Z motion to avoid incidental contact. Although the first mover is shown carrying a single first product, this is not necessary and additional first products 102A could be carried by a first mover 100B and transferred to a second mover 100C. Similarly the second mover is shown carrying a single second product, this is not necessary and additional second products 102B could be carried by a second mover 100C.

Generally a second product 102B is not limited to a particular form such as packaging and may be anything.

In another assembly application, the mover/stator system may be used in the automation of packaging where products need to be arranged into a particular pattern for packaging and by pre-arranging products relative to each other on a single mover and/or arranging movers carrying products relative to each other. This method of arrangement allows for rapid transfer to packaging using simple one or more degrees of freedom actuation such as in a gantry system.

FIG. 1 describes a robotic system 900 according to a particular embodiment. An alternative assembly system shown in FIG. 25 comprises a stator 200 and a mover 100, one or more controllers 70(not shown), and one or more sensors 80 (not shown). The system further comprises an infeed 220, an outfeed 240, and a transfer mechanism with at least 1 degree of freedom 210. The mover 100 may optionally be fitted with a load securing mechanism 120.

In this embodiment, a product 102A is delivered by the infeed 220 to the system 900. The system uses one or more movers 100 to receive the product 102. The mover 100 may comprise a load securing mechanism 104 that allows it to receive one or more products 102A easily. The load securing mechanism 120 may allow multiple products to be deposited onto a single mover 100, though this is not necessary. The product 102A is then transferred to the outfeed 240 by one or more movers 100 through a transfer mechanism 210, where it is deposited onto the outfeed 240.

In some embodiments, the system further comprises an inspection station. In the event wherein a first product 102A carried by a first mover 100A is defective, the first product will be removed, and the first mover will be routed to a desired destination for processing. For example, the first mover may be sent to the infeed area and receive a replacement product 102A. A second mover 100B carrying a satisfactory product 102A may replace the first mover in the workflow, without disrupting the process.

Figure 25:
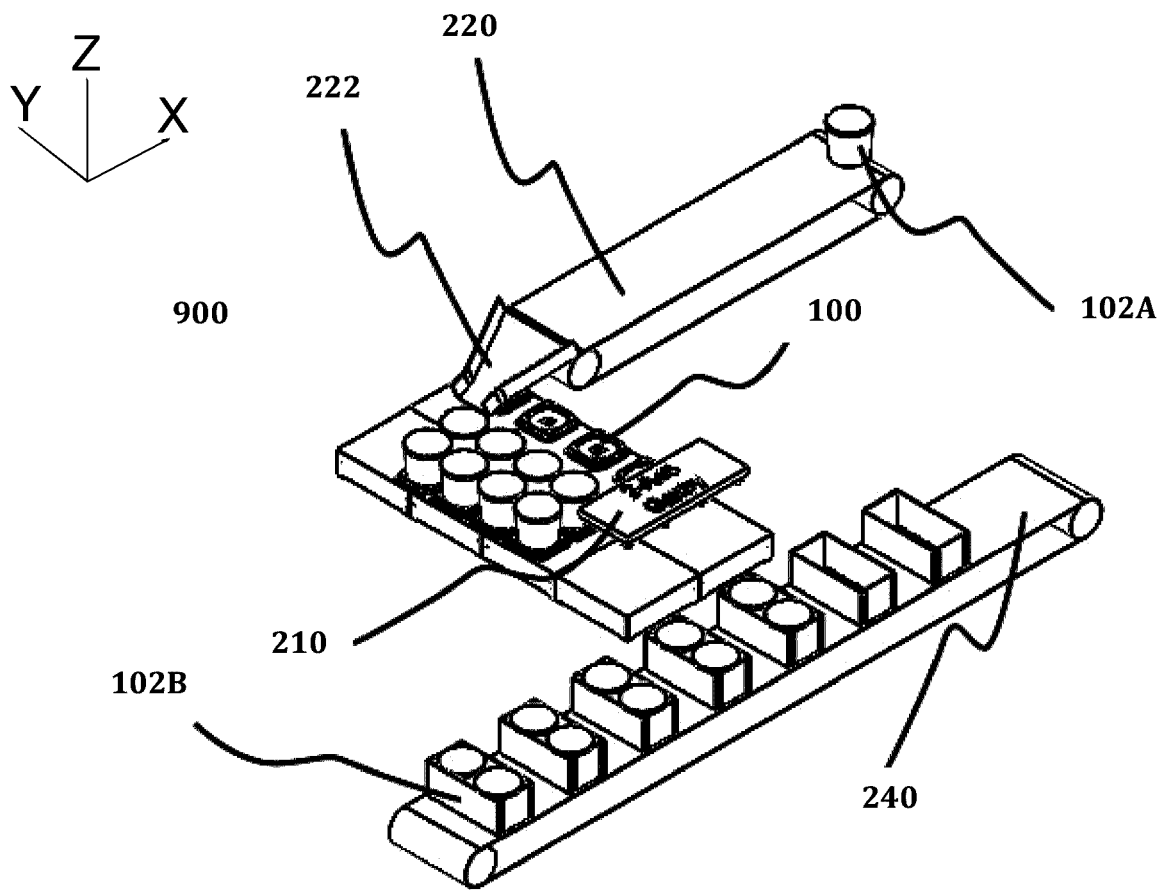
FIG. 25 is a perspective view of an alternative assembly system.

FIG. 25 shows multiple movers arranged on the stator surface 200. Each mover 100 can be positioned in a queueing area to await further instruction. The queuing area allows the movers carrying products to pre-arrange into the desired configuration or a simplified version of that configuration while the outfeed is still occupied with unloading the previous set of products. The queuing area may also provide a buffer functionality if there is some variability in the infeed so the outfeed can maintain a consistent packaging rate. In some other embodiments, the mover 100 is moved directly to the unloading area 241. A mover 100 can be sent to the outlet of the infeed system to receive a new product any time the mover has an available bay to receive a new product.

Figure 26:
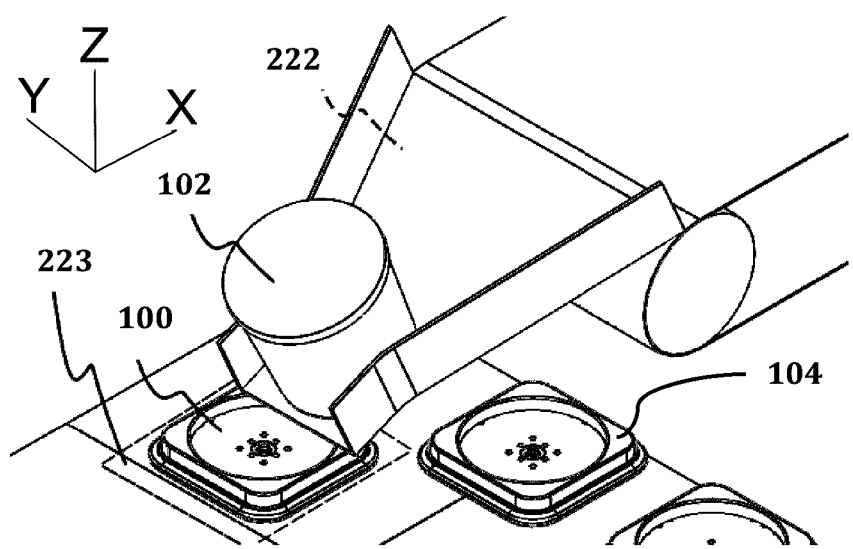
FIG. 26 is a perspective view of a product loading onto a transfer mover.

FIG. 26 shows a product infeed embodiment comprising one or more movers 100 (with load securing fixtures 104 for carrying a product 102), a package infeed belt 221, a inclined chute 222 (inclined at an angle theta relative to the mover working surface) and stator 200. For this embodiment a loading motion is a mover 100 enters the loading area 229 on the stator surface and waits for a product 102. The products are moved along the infeed's 220 belt surface 221 before reaching a inclined chute 222 (inclined at an angle theta sufficient to ensure smooth motion along the chute with or without initial momentum depending on the application), which optionally centers the product as it slides along the chute surface to align the product with respect to a Y direction position corresponding to the load securing fixture 110 carried by the mover 100. Generally a receiving mover 100 will align itself with respect to the fixed or variable Y position of the product's receiving location. The mover 100 moves in the product's 102 direction of motion (conveying direction of chute, which is −X direction for this particular embodiment) as the product goes from the inclined chute 222 surface to the fixture 110 to assist the loading operation. In this particular embodiment the chute's conveying direction is aligned with the conveyor belt, this is not necessary. When the mover's 100 fixture 110 securely holds the product 102 it will move to the next area of the process. The chute (or outlet) is located above the working surface allowing gravity to feed the products. A gap between chute and working surface permits the mover to pass through in time to catch the product, where this particular embodiment's stator working surface overlaps along the inclined chute's normal direction, this is not necessary but has certain mover pre-positioning advantages In some embodiments, the product 102 passes through an infeed singulator mechanism 222 before it is deposited onto the mover 100. It is not necessary for the singulator mechanism to be placed at the end of the infeed 220 if utilized. Herein the infeed 220 is considered to contain all the non-mover components required to deposit a product onto a mover 100, though additional components may not be necessary. The mover 100 is sent to the correct locations to capture the product from the infeed 220. The mover 100 may be programmed to move in a way to assist the product capture process. In some embodiments, the mover 100 is fitted with a load securing mechanism 120 to secure the product or assist with the capture process. In some embodiments, the mover 100 may carry only one product 102 at a time. In other embodiments the mover can carry plural products at a time on multi-carrier means*, by adjusting its position after capturing a first product 102, so that a second product 102 can be deposited onto the mover 100 at a second slot or location on that mover. If desired, the mover 100 can be used this way to create a desired product layout 219 directly on top of the first mover.

Generally the inclination angle of an inclined chute for products with no initial momentum will be greater than the angle of repose (sliding angle) of the product on that chute.

Figure 27:
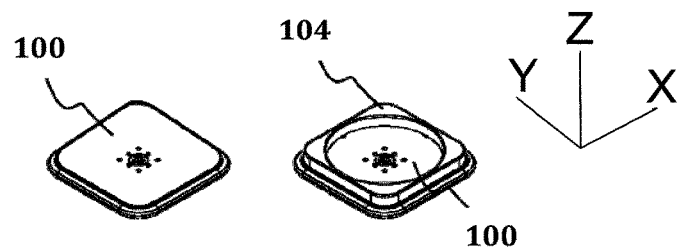
FIG. 27 is a perspective view of movers with and without securing base.

FIG. 27 shows a product carrying mover 100 embodiments with and without a load securing fixture 104. A mover 100 embodiment without a fixture as shown in FIG. 3A relies on the friction between the mover 100 and the product 102 to limit the motion of the product 102 relative to the mover 100, therefore while carrying a product 102 these movers 100 are limited to low acceleration and deceleration motion and products should generally have a low center of gravity. A mover 100 embodiment with a load securing fixture 104 relies on the fixture to constrain the horizontal motion and tilting of the product 102 relative to the mover 100 and this particular load securing fixture 104 embodiment is a raised perimeter encircling the product thereby providing support for all planar directions of motion.

Figure 28:
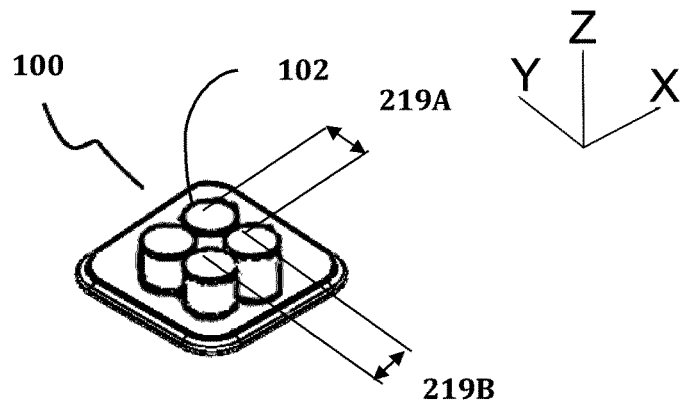
FIG. 28 is a perspective view of a product loaded in a pattern on a mover.

FIG. 28 shows an embodiment of a mover 100 carrying multiple products 102 arranged in a layout 219 of pitch_x and pitch_y. The loading process for this embodiment may be completed by repeating the loading process for a single mover at different loading positions for plural products 102. This embodiment may also use a load securing fixture 104 to locate each product 102 with respect to the mover 100 in a predetermined layout 219.

Figure 29:
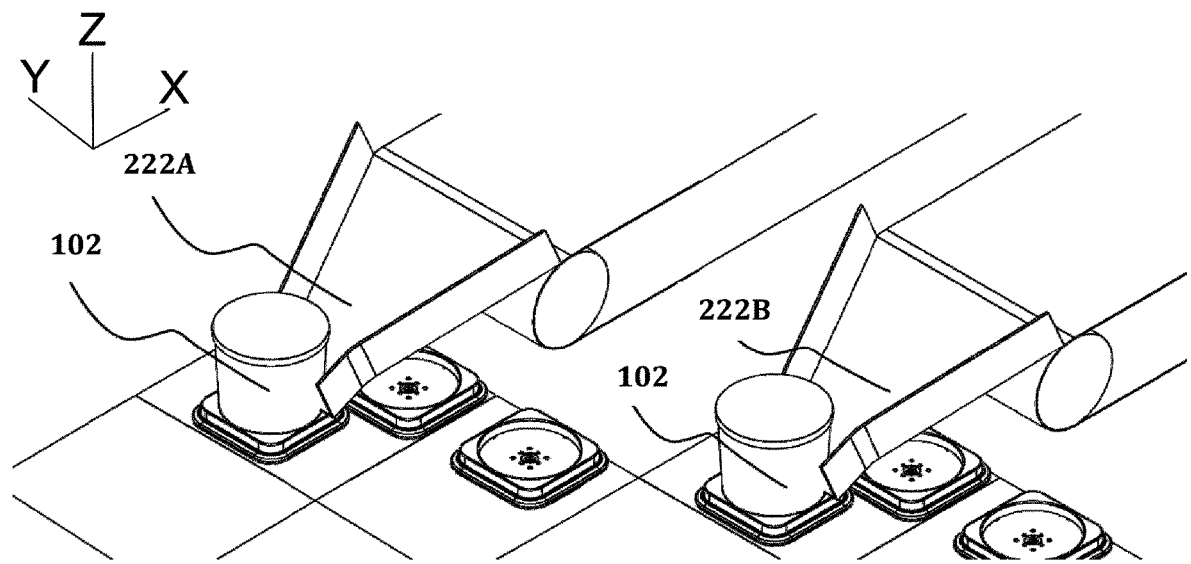
FIG. 29 is a perspective view of plural infeeds loading transfer movers simultaneously.

In some embodiments, the system further comprises a plurality of infeeds 220. FIG. 29 shows an embodiment with a first infeed line 220 and second parallel infeed line 220B each comprising one or more movers 100 (with load securing fixtures 104 for carrying a product 102), a package infeed belt 221A/221B, a inclined chute 222A/222B and stator 200. The first mover has the flexibility to capture products from multiple infeeds, for example, it 100 may capture product (s) 102 from the first infeed 220A, as well as the second infeed 220B in a subsequent loading operation. The first mover 100 may carry product (s) 102 from the first 220A and second infeed 220B simultaneously, but this is not necessary. The product from the first infeed may be different from the product from the second infeed, though this is not necessary. The use of multiple infeeds can increase overall productivity by allowing multiple parallel loading processes to occur simultaneously or allow each infeed to be operated at slower speeds to assist the loading process motion.

Figure 30:
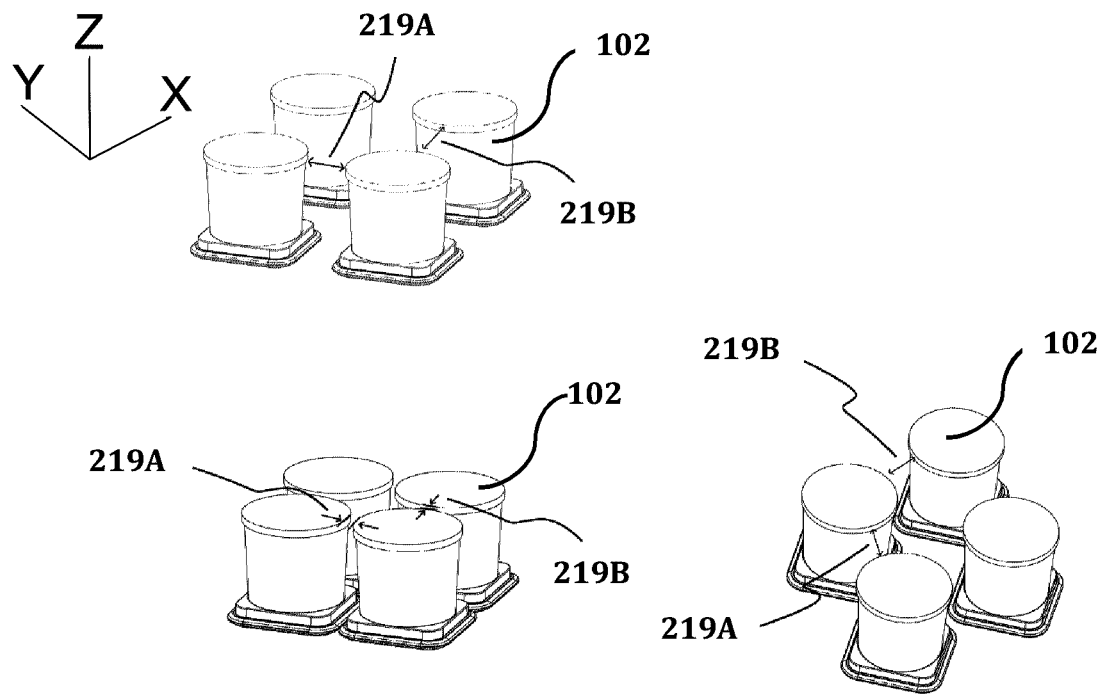
FIG. 30 is a perspective view of alternative patterns of groups of products.

FIG. 30 shows examples of different product arrangements 219 created by the movers 100. Whether in the queueing area or the unloading area, the first mover 100A and the second mover 100B could be positioned with minimum allowable spacing between them, or they could be positioned so the spacing between them is some desired value as determined by the user. In some embodiments, the system further comprises a third mover 100C. The third mover 100C may be used in conjunction with the first 100A and second mover 100B to create a desired product layout 219 in one or more dimensions. For example, they may form a straight line, or a triangle, etc. Additional movers may be used to create a desired product layout 219 of arbitrary shape and size, working region space permitting.

It should be noted that the dimensional axes of the desired product layout 219 do not need to overlap with the working region axes of the system. Arranging the products into a desired product layout 219 can be accomplished in the queueing area, or directly in the unloading area 241.

Figure 31:
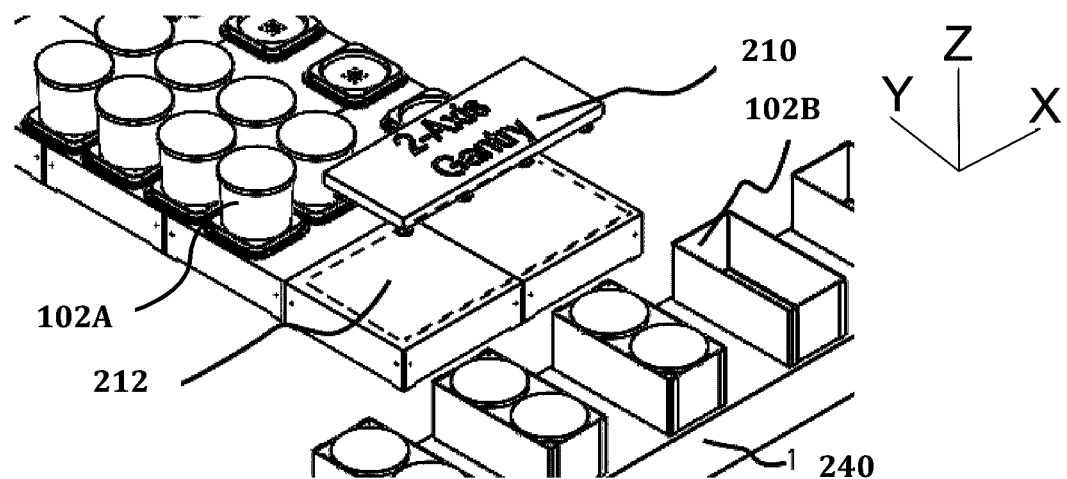
FIG. 31 is a perspective view of an outfeed process using a gantry system.

FIG. 31 shows an embodiment of the outfeed for the process comprising one or more movers 100 (carrying one or more products 102A), a two-axis gantry 210 (comprising a vertical and secondary linear degree of freedom with an arrangement of one or more securing mechanisms 211), an outfeed 240 (carrying multiple incoming empty packages 102B distributed along its surface 241 at a predetermined spacing). During the unloading process each mover 100 will position itself in a transfer area 212 underneath the gantry system 210 in a layout 219 consisting of one or more movers 100, then the gantry will be lowered until each product 102A is contacted by a securing mechanism 211. The gantry securing mechanisms 211 will be activated to grip each product 102A securely before the products are lifted vertically off their respective mover 100 and horizontally moved over one or more pieces of packaging 102B, which each product is lowered and released into. Generally, the layout 219 will be related to the incoming empty package 102B spacing on the outfeed 240 and the dimensions of each packaging 102B.

In some embodiments the outfeed may be operated at a constant speed with products deposited into moving packaging. In some embodiments the outfeed speed will be slowed or stopped during product deposition. In some embodiments selective packaging will be slowed or stopped relative to the outfeed during product deposition. In some embodiments packaging will be foregone and products will be directly deposited on the outfeed surface 241 or in conveyor compartments distributed along the outfeed surface.

In some embodiments, a first product 102A is placed into a first outfeed container 102B. In other embodiments, two or more products 102A are placed into the outfeed container 102B. The products 102A may optionally have a desired pitch in at least one direction inside the outfeed container 102B. The desired pattern of products 219 inside the outfeed container 102B is referred herein as desired product layout 219. In some embodiments, it is possible to create two or more different desired product layouts with no changeover on the system 900.

At a desired time, the mover(s) 100 are positioned inside the unloading area. The mover(s) 100 may be arranged in some desired product layout 219, and the product (s) 102A carried by them are transferred to the outfeed 240 by a transfer mechanism 210. In some embodiments, the transfer mechanism 210 is a robot with 2 or more degrees of freedom, using a picker to transfer the product from the mover 100 to the outfeed 240. Typically, the outfeed is carrying one or more package(s) 102B to hold the products, though this is not necessary.

Figure 32:
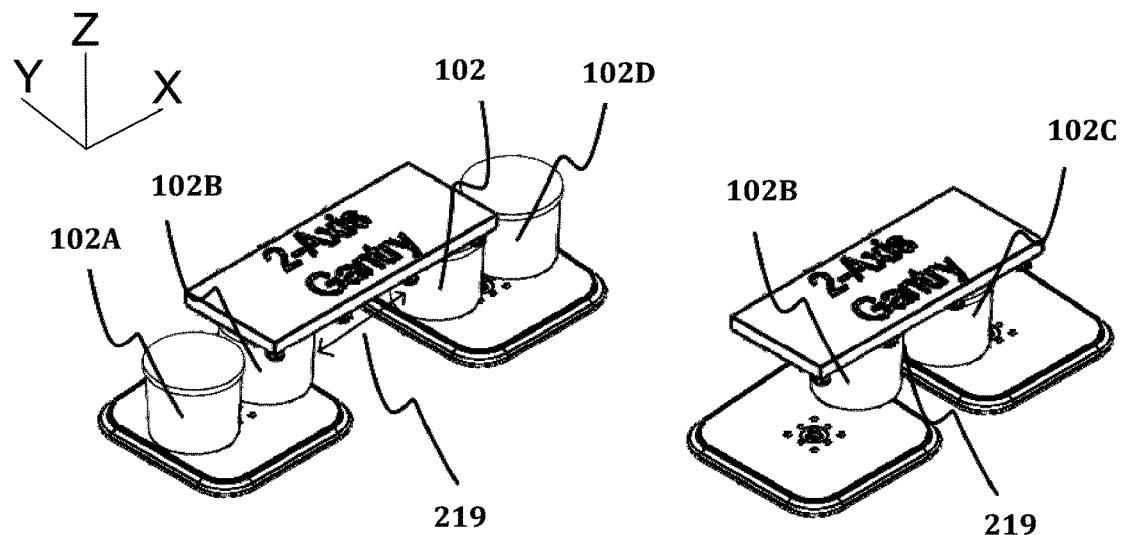
FIG. 32 is a perspective view of a gantry system loading in different patterns.

FIG. 32 shows embodiments of packaging with multiple pick operations conducted by the transfer mechanism 210. Multiple pick operations allow products 102 to be placed closer than allowed with a single pick operation. For movers 100 carrying a single product 102 the minimum spacing would normally be based on the mover's overall dimensions, however a subsequent picking operation would allow a product to be placed adjacent to a previously picked product or some distance between the minimum distance and the mover's minimum center to center distance. In cases where multiple products 102 are carried by a single mover 100 a distance closer than the product fixture 120 spacing could be achieved up to and including direct product contact.

In cases where a first mover 100A is carrying more than one product 102, it is desirable for the transfer mechanism 210 to transfer all products carried by the first mover 100A simultaneously. For example, in embodiments where the first mover 100A is carrying two or more products102, the transfer mechanism can transfer a first product from the first mover 100A to the outfeed 240 during a first pass, then transfer a second product from the first mover to the outfeed during a second pass. Between the first pass and the second pass by the transfer mechanism 210, it is possible to reposition the first mover 100A to a new desired position. In embodiments where there is a second mover 100B carrying two or more products 102, it is possible for the transfer mechanism 210 to transfer the first product from the first mover together with a third product from the second mover during the first pass. The first product and the third product are spaced by a first desired pitch 219A. The first mover and second mover can then reposition themselves such that the transfer mechanism will pick up a second product from the first mover and a fourth product from the second mover. The second product and the fourth product are spaced apart by a second desired pitch 219B. It is possible for the first desired pitch to be different from the second desired pitch, though this is not necessary. The gripping elements of the transfer mechanism may optionally be independently controlled to allow for selective picking of products where more products than desired are within the pickup area.

Figure 39:
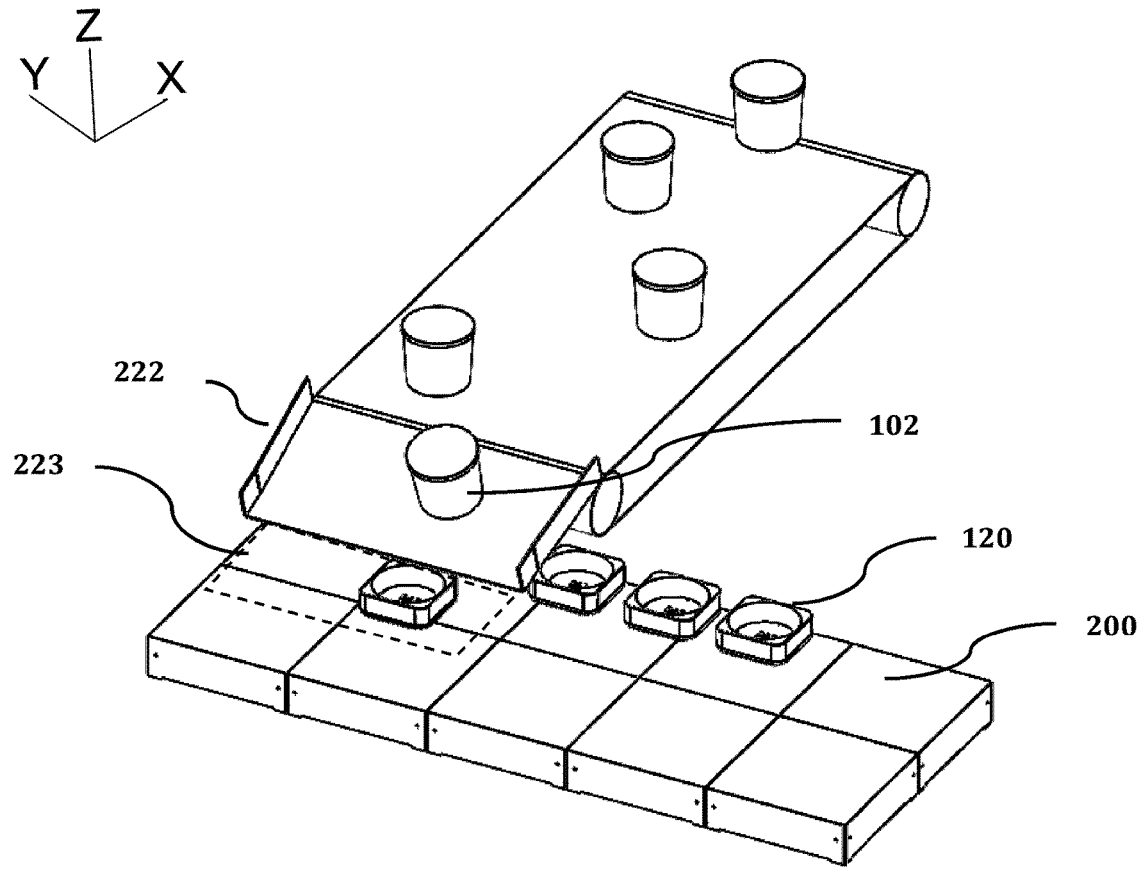
FIG. 39 is a perspective view of an unsingulated infeed loading movers simultaneously.

FIG. 39 shows an un-singulated infeed 220 embodiment comprising an infeed 220 (the infeed contains multiple products 102 distributed unevenly over the infeed surface 221 and a inclined chute 222 for the products to move from the infeed to a mover 100), one or more movers 100 (carrying a load securing fixture 104), a sensor 80 (ie. overhead camera system, not shown) and a stator 200. The incoming products 102 on the infeed belt and subsequent inclined chute have varying Y positions. An un-singulated infeed 220 may be used for reasons such as reduced cost or to allow multiple product 102 loading processes to occur at once. An un-singulated embodiment requires the usage of sensors 80 such as a vision-based system to track the position of products 102 traveling along the infeed 220 and send movers 100 to align themselves with the product along the Y direction and utilize X direction movement (position and speed matching) along the conveying direction to intercept and capture them as they descend along the inclined chute (at an incline theta, sufficient to ensure smooth motion) to the stator 200 surface. This embodiment utilizes a chute running over (overlapping along the chute's working surface normal) a portion of the stator 200 surface to allow movers 100 to move to positions in the loading are 221 without obstructing the loading process for other movers 100 or being blocked by movers waiting for a product 102 to arrive. The embodiment would adjust the timing and positioning of mover's 100 receiving products 102 to compensate for variability in the product frequency and conveyor positioning of incoming products. Such a system may also include a variable speed infeed to speed up or slow down the infeed to a suitable high rate achievable by the movers.

In the embodiment shown in FIG. 39, to perform a transfer with a workpiece 102 moving along the chute 222 (simultaneously descending to the stator surface) the mover 100 must intercept the product (align along X and match Y position) and match horizontal motion (X direction). A successful interception utilizes precise timing and movement to rapidly accelerate the mover to simultaneously achieve synchronous position and motion (horizontal motion component) with a workpiece while the workpiece's relative Z position to the mover decreases until contact occurs with the mover and the workpiece transfer from the infeed conveying system to the mover. In contrast waiting for a workpiece descending along the chute requires additional devices to arrest the horizontal motion of the workpiece (preventing tipping for high center of gravity products) and encourage settlement of the workpiece on the mover with additional accelerating motion time to leave the area after receiving, thereby negatively effecting throughput.

Figure 40:
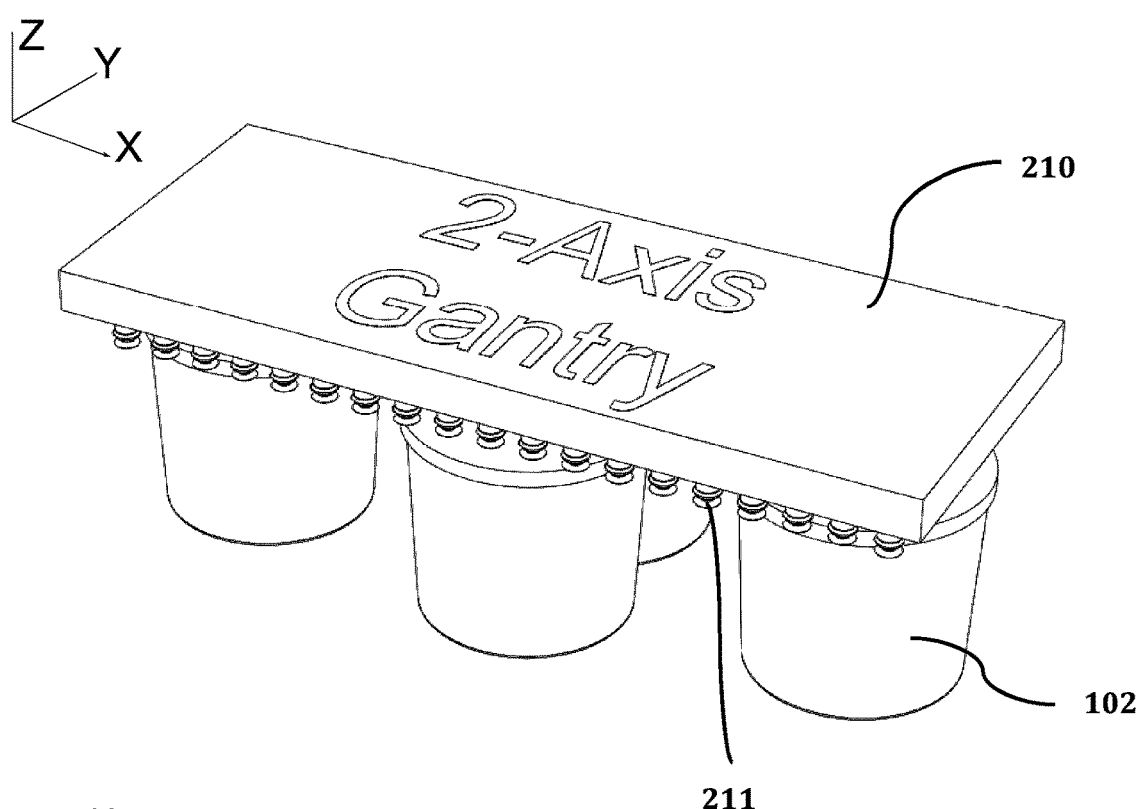
FIG. 40 is a perspective view of a gantry with plural grippers to transfer plural products.

FIG. 40 shows a transfer mechanism 210 embodiment for flexible layouts comprising a gantry system with two or more axis of motion, and comprising a plurality of securing mechanisms 211. In this embodiment a large number of gripping elements 211 are spaced out so that for any possible position in the pickup area 212 there will be one or more gripping elements able to secure each product 102. Such a system would provide complete flexibility within its size constraints for users to alter configurations 219. Additionally, this embodiment could include selective control of groups of one or more gripping elements to selectively control the pickup and/or release of individuals or groups of products for increased flexibility.

Figure 45:
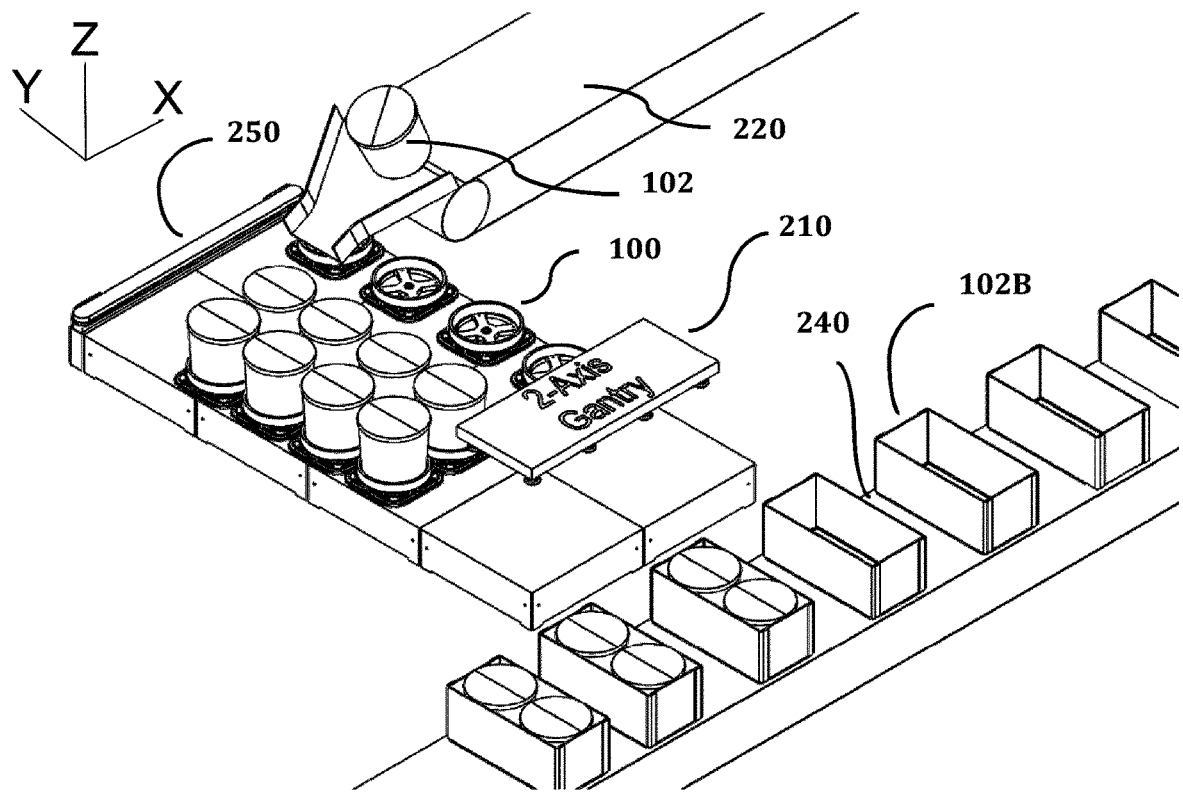
FIG. 45 is a perspective view of a transfer process for re-orienting products.

FIG. 45 shows a particular embodiment of the process 910 comprising a stator 200 (with a static actuating surface 250), a mover 100 (each carrying a rotatable load securing mechanism 110), one or more controllers 70, and one or more sensors 80 (not shown). The system further comprises an infeed 220, an outfeed 240, and a transfer mechanism with at least 1 degree of freedom 210. During the loading process a sensor 80 (e.g. camera system) is used to measure the orientation of each product loaded onto a mover 100 and based on the required orientation of the product for packaging each rotatable load securing mechanism 110 interacts with the static actuating surface 250 and is actuated the required amount through motion of the mover with respect to the static actuating surface. In some embodiments, each mover may rotate the rotatable load securing mechanism to a particular orientation before loading occurs.

Figure 46:
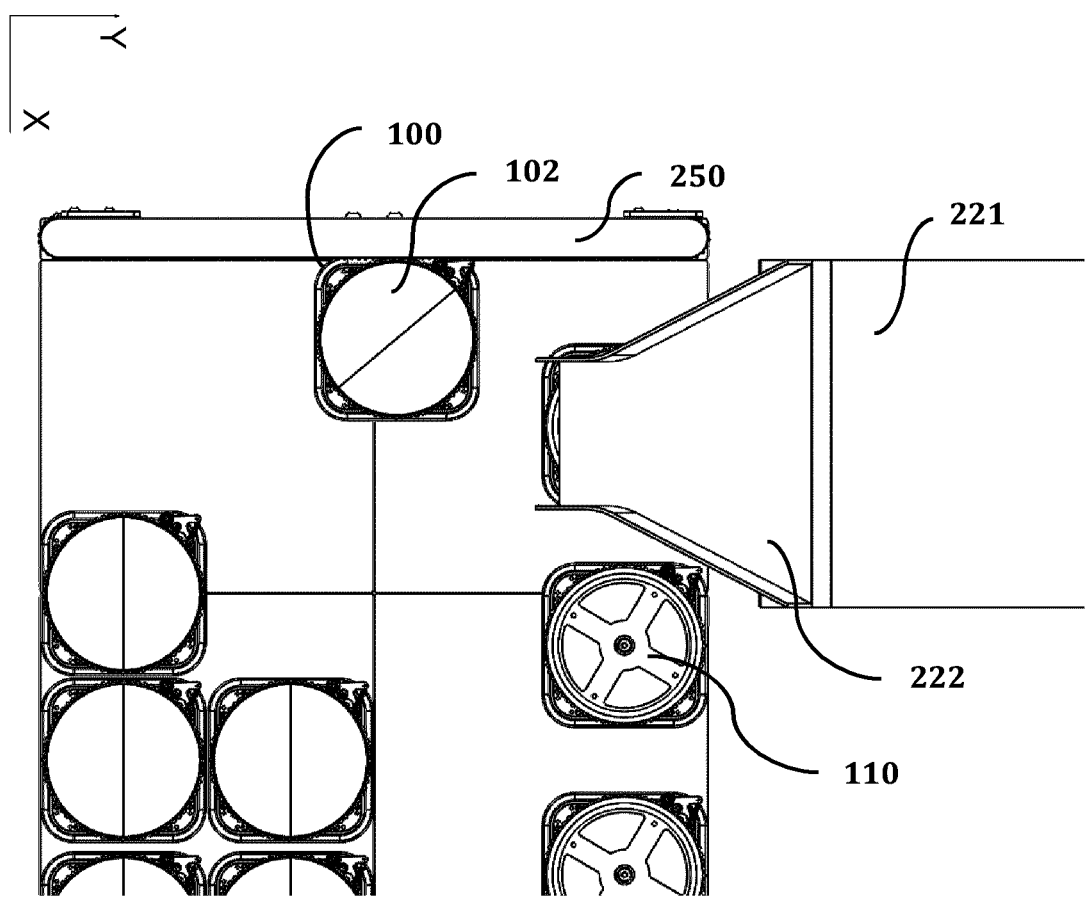
FIG. 46 is a plan view of a transfer process for re-orienting products.

FIGS. 45 and 46 show an isometric and top view of the rotatable load securing mechanism interacting with the static actuating surface. In this particular embodiment the rotatable load securing mechanism is prevented from rotating by a locking mechanism which unlocks when the rotatable load securing mechanism is engaged with the static actuating surface 250 (through a +Y movement resulting in contact) and during engagement the mover motion in +X will result in +Rz rotation and motion in −X will result in −Rz rotation. After rotating to the correct position the mover 100 will move in −Y direction to disengage and lock the rotation of the rotatable load securing mechanism 110 and product 102. The addition of orientation control allows each product to be packaged in the same orientation or a set of different predetermined orientations.

Figure 33:
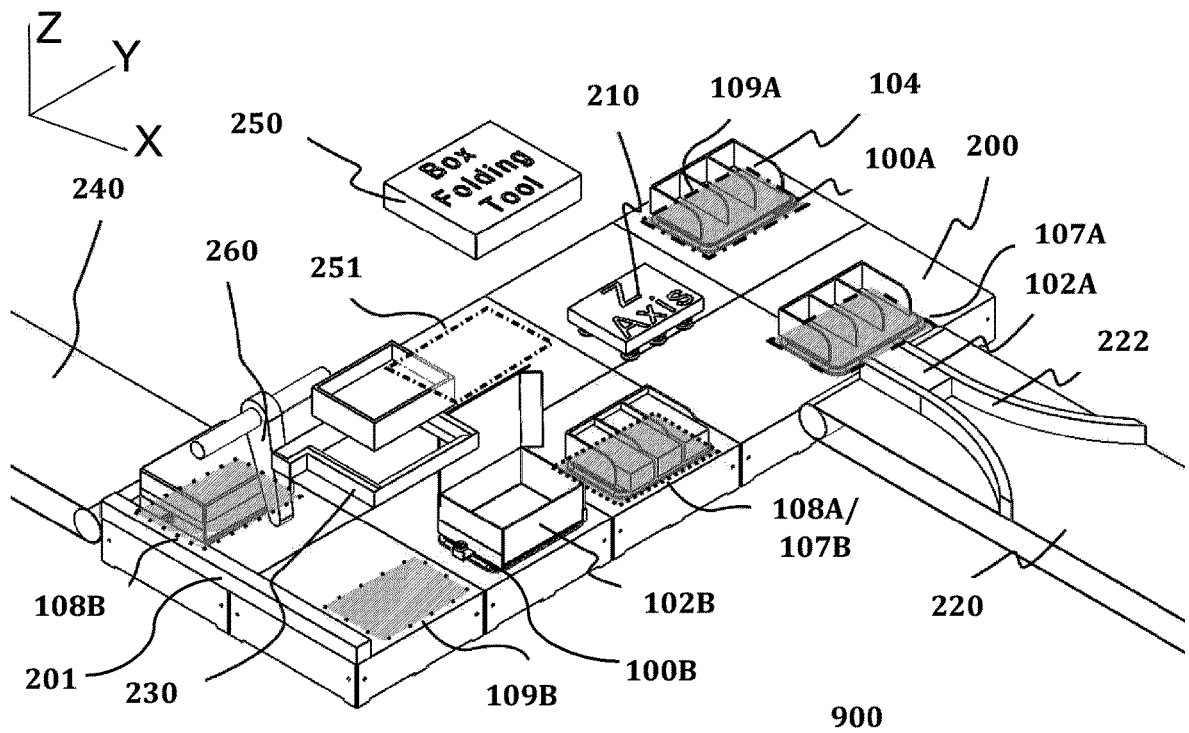
FIG. 33 is a perspective view of an alternative assembly system.

FIG. 33 describes a robotic system 900 according to a particular embodiment. The system comprises a stator 200 and movers 100 (comprising a first group of one or more first movers 100A and a second group of one or more second movers 100B), one or more controllers 70 (not shown), and one or more sensors 80 (not shown). The system further comprises an infeed 220, an outfeed 240. The mover 100 may optionally be fitted with a load securing mechanism 104. The system may optionally comprise a package forming/deposit tool 230, a package sealing tool 250, package release mechanism 260, and a robotic arm with at least 1 degree of freedom 210.

In this embodiment, products 102A are delivered by the infeed 220 to the system 900. The system uses one or more first movers 100A to receive the products 102A in retaining bays. A first mover 100A may comprise a load securing mechanism 104 as tooling that allows it to receive one or more products 102A easily. Each retaining bay of the securing mechanism 104 is shaped to receive product at an opening and constrain the product in at least two dimensions The load securing mechanism 104 may allow multiple products 102A to be deposited onto bays of a single mover 100. The product 102A is then transferred to the outfeed 240 by one or more movers 100B, where it is deposited onto the outfeed by a release mechanism 260.

After the first mover 100A receives the first product(s) 102A (at a first receiving location 107A), it travels to unload the first product 102A (at a first unloading location 108A) via a transfer device 210, where the first product(s) 102A are removed from the first mover 100A to the transfer device. In this embodiment, a single axis robot 210 is used, though additional axes are possible. After unloading the first mover 100A may then move away from the transfer station to a queuing location 109A, before receiving additional first product 102A at the first receiving location 107A for additional transfer(s). A second mover 100B carrying one or more second products 102B (packages) (received prior from a second transfer device 230 at a third receiving location 109B) goes to a second receiving location 107B, where one or more first products 102A are received from the transfer device 210. In this particular embodiment the first unloading location 108A and second receiving location are collocated, however this is not required. If the transfer device has more than one DOF (ie. X or Y movement in addition to Z movement) a position offset between a first unloading location 108A and second receiving location 107B can be achieved. The transfer device 210 (actuator/robot) generally deposits the first product(s) 102A into one or more second products 102B (packages). The second mover 100B can repeat this transfer process as many times as needed until a desired number of first products 102A are placed in their desired positions inside the one or more second products 102B carried by the second mover 100', creating a desired layout 219. After receiving the one or more first products 102A transferred from one or more first movers 100A, a second mover 100B may go to a second unloading location 108B (to unload carried first products 102A and second products 102B). In this particular embodiment the second product 102B with contained first product(s) 102A is transferred to an outfeed 240 by the package release mechanism 260.

In some embodiments a full array of first products 102A may be transferred from one or more first movers 100A to create a complete layer of first products (placed into a second product 102B) through a single transfer. Transferring a full layer can prevent unwanted first product movement inside of the second product and achieve a high throughput Generally at least one degree of freedom is required for the transfer device with preferred motion along the Z direction or mover working surface normal and additional degrees of freedom typically providing more flexibility.

It should be noted that the flexibility of this novel assembly system allows a nearly infinite number of ways to fill a package 102B with products 102A. One method for arbitrary product placement is to pick up one first product 102A at a time using the transfer device 210 (robot arm), then position the second mover 100B accurately such that the robot arm can deposit the product 102 into the desired position in the package 102B one by one. An extension from this method is to place multiple products onto the first mover 100A, such that the robot arm 210 can pick up multiple products102 at the same time. Furthermore, if the gripping elements of the transfer mechanism can be independently actuated or actuated in some subsets it is possible to selectively pick up and release products to achieve even more placement flexibility.

Figure 41:
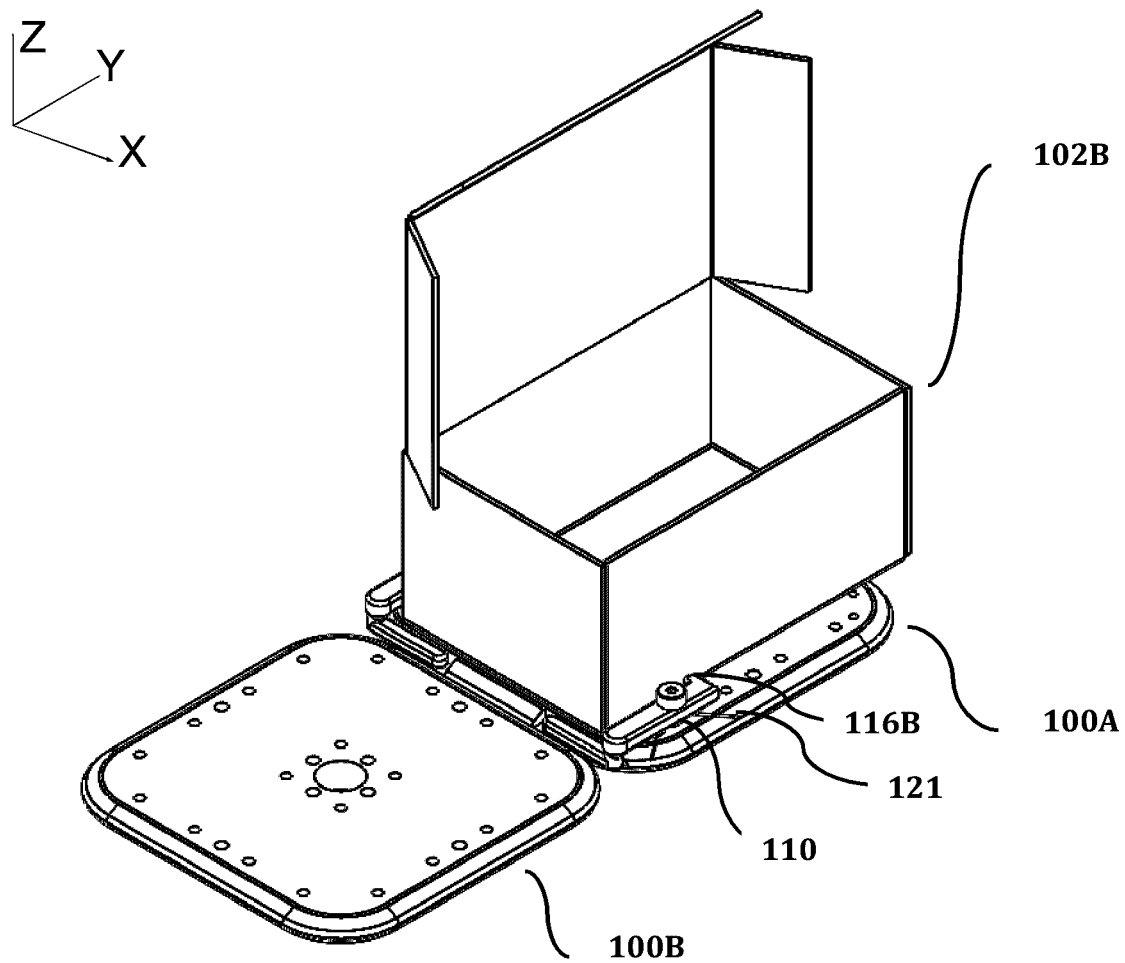
FIG. 41 is a perspective view of an empty box on a securing base.
Figure 42:
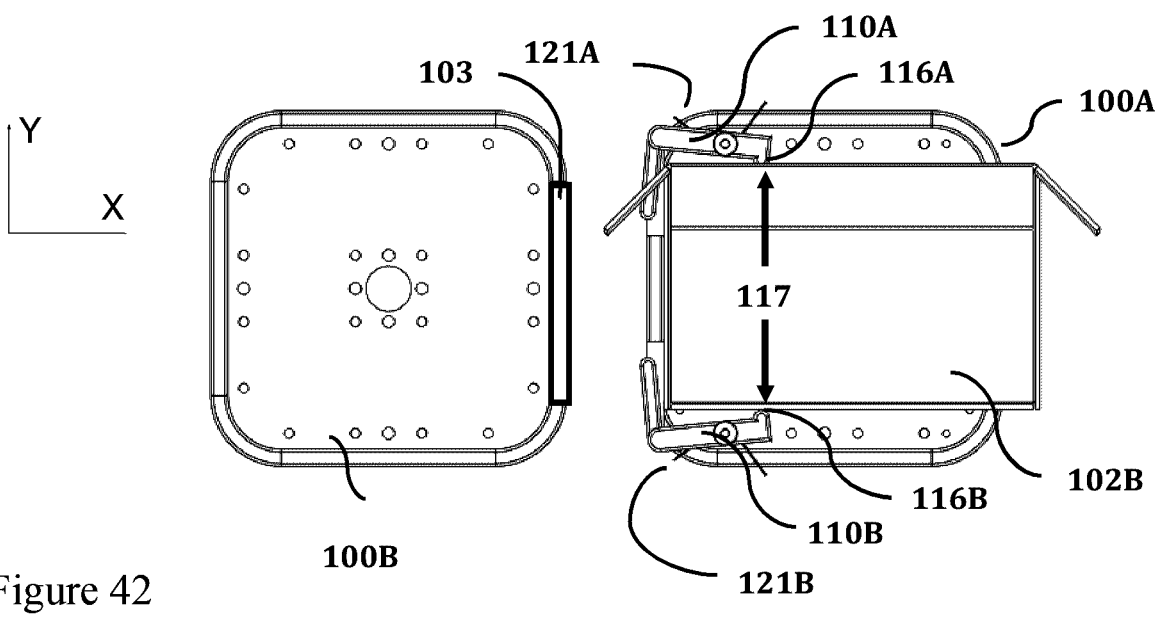
FIG. 42 is a plan view of an empty box on a securing base.

In the embodiments of FIGS. 38, 41, 42 and 43, the package (second product) 102B carried by a mover 100 may be optionally clamped to the mover through a clamping mechanism 110. This mechanism comprises two or more clamping surfaces 116A/116B to be adjusted relative to one another along a clamping direction to vary the clamping distance 117, by the motion of the mover. In a particular embodiment, the mechanism can be engaged with a second mover then adjusted by a movement, or the mechanism may be engaged by contacting the engaging element with a stationary object 201 (external to the mover and stator) then adjusted with a pushing motion towards the stationary object. When the engaged mechanism is moved sufficiently towards the stationary object, the package clamping mechanism 110 is opened (clamping surfaces 116A and 116 B moved apart) providing a large enough clamping distance 117 in the open position to accept a new package 102B, which may be from a box forming mechanism 230. When the mechanism is closed by moving the mover 100 sufficiently away from the stationary object 201, the package clamping mechanism 110 may be closed by internal forces (opposed by external forces from the external object 201 during engagement) from a resilient deformable element 121 (creating a normally closed bias), with sufficient restoration force to hold the package 102B in place while disengaged from the external object. The process may be repeated to open the package clamping mechanism 110 for removal of the package 102B from the mover 100 during an unloading process. In some particular embodiments (as shown in FIGS. 41 and 42) the engaging element may be an object 103 mounted to a second mover 100B and the relative motion of movers may be utilized to create engagement between the clamping mechanism and the mover mounted object 103, followed by adjustment of the clamping surfaces 116A/16B clamping distance by relative motion.

Figure 38:
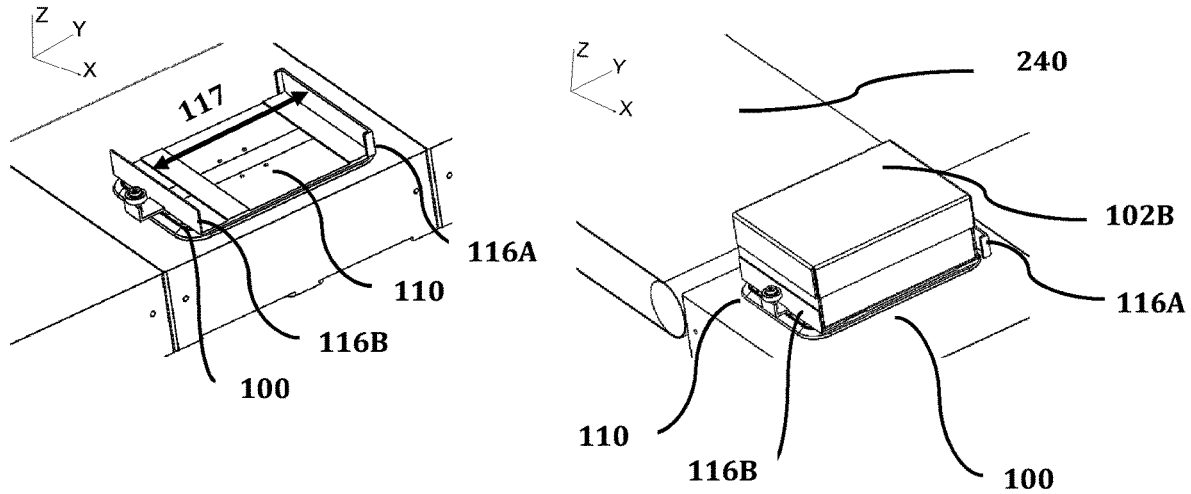
FIG. 38 is a perspective view of a mover with packaging securing base.

The specific form of the clamping mechanism 110 may take various forms for example FIG. 38 shows an embodiment where one clamping surface 116B is fixed relative to the mover body (magnetic components) and a second clamping surface is movable along the Y axis relative to the mover. Although this particular embodiment describes a subset of the clamping surfaces being fixed, In various other embodiments all of the two or more of the clamping surfaces may be moveable relative to the mover body(magnetic components). When this particular embodiment's clamping mechanism is engaged with an object external to the mover (at the −Y edge of the mover) The movers relative position along the Y direction with respect to the object may be varied to directly vary clamping surface 166A position relative to the mover thereby varying the clamping distance 117 (the distance between two clamping surfaces 116A and 116B) continuously (where the clamping distance is a continuous smooth function of the relative position between the mover and the object during engagement). In this particular embodiment the mechanism is biased towards closing (decreasing clamping distance 117) through a resilient deformable element.

An alternative form of the clamping mechanism 110 for example is shown in FIG. 41 through 44 comprising two independent movable clamping members 110A/110B, each rotatable with respect to an axis fixed to the mover and comprising a clamping surface for engaging with a product 102B. Although two movable clamping surfaces are shown a single movable clamping surface or additional clamping surfaces are also acceptable. While engaged with a stationary external object the relative motion along X direction of the mover adjusts the rotation of the one or more rotating members thereby varying the relative clamping distance between the two or more clamping surfaces. In the case of the two movable rotating members for this particular example the opposite rotation of each clamping surface generates a controllable increase or decrease of the clamping distance.

Generally the clamping mechanism 110 engagement with an external body is utilized to adjust the clamping distance 117 for the two or more clamping sides 116. An additional latch may be used to temporarily lock the clamping mechanism to achieve a particular clamping distance 117 or clamping force, such a latch provides additional flexibility during an unloading or loading process. Although the clamping direction is generally described as decreasing the clamping distance to achieve a closed position this is not necessary. In some particular product embodiments the clamping surfaces must separate to provide an outwards clamping force on a product.

After the package has achieved the desired product layout 219 of products 102A placed by the transfer device 210 (vertical actuator), the mover 100 may optionally be sent to additional processing stations. In some embodiments it is sent to an inspection station 270. In some embodiments, it is sent to a package folding/sealing station 250, where the package is sealed (may include box folding or closing processes for certain packaging types). Eventually, the mover 100B is sent to the outfeed station 240, where a package release mechanism 260 may be used to transfer the package 102B from the mover 100 to the outfeed 240.

In one non-limiting example, the robotic system is used to place one or more products 102A into a package 102B. FIG. 33 shows an embodiment of the infeed loading process comprising one or more mover 100A (each carrying a fixture 120, with retaining bays for each product 102A to be held), a infeed 220 (a belt surface 220 which drives products into a aligning device 222 before loading occurs) and a stator surface 200. A first mover 100 receives the products 102A by moving to one or more receiving locations 107A at the infeed 220. By controlling the first mover's 100A position carefully, multiple products 102A can be loaded onto different positions on the first mover 100 without adjusting the infeed position 220. The relative position between the products 102A on the same mover may match the final desired position of the products in the package 102B, though this is not necessary. While multiple products 102A can be loaded onto the first mover 100A in this embodiment, it is not necessary. Although the first mover and second mover are shown to be the same dimensions, this is not necessary. For example a first mover may receive eight first products requiring a longer first mover dimension to adequately support the carried products and those first products may be loaded four at a time to a second mover which has a different X dimension or Y dimension corresponding to the desired product layout 219 and payload (mover size dependent) of first products and second products carried by the second mover. An appropriate choice of mover (as small as possible usually) for carrying the desired first product(s) or second product(s) can reduce the overall system size or allow a larger quantity of movers to operate in the same working region.

Generally a first mover 100A and second mover 100B will comprise specific tooling designed to accommodate their respective first product(s) and second product(s) based on the quantity, receiving/unloading manner and layout of the product for that mover. Additionally since a first product 102A and second product 102B may geometrically differ the first tooling and second tooling are expected to differ accordingly.

Figure 34:
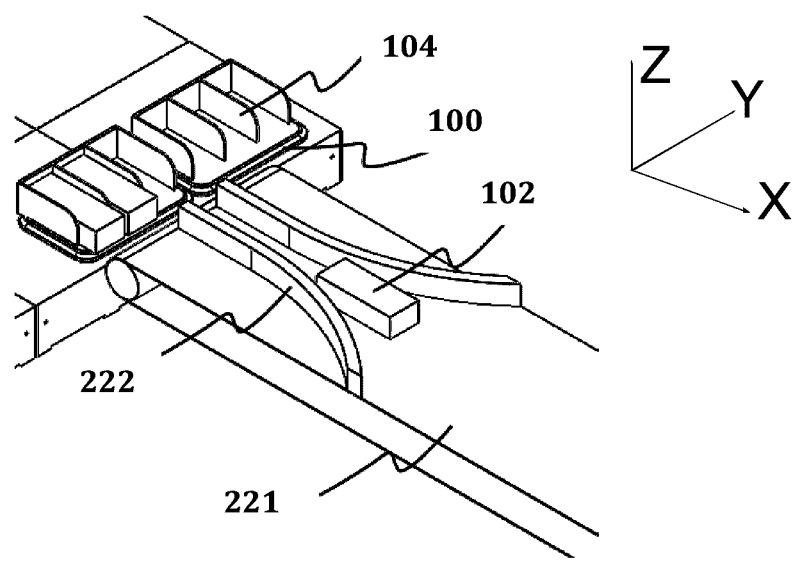
FIG. 34 is a perspective view of an infeed singulator loading movers with multiple slots.

FIG. 34 shows a product infeed embodiment, comprising a 220 (a belt surface 220 which drives products into an aligning device 222 before loading occurs) and one or more movers 100 (each carrying a fixture 120, with retaining bays for each product to be held), and a stator surface 200. A first mover loads its first bay by positioning the bay at the opening to the product infeed and waits to receive the product. After receiving a first product the process will be repeated to fill each retaining bay. After a first mover has filled each retaining bay the mover will move to an unloading location while a second mover moves to the product infeed from an intermediate queuing location 109A and repeats the overall loading process. Constraining the path of products through the infeed (with a aligning device 222 and prior singulation) is not required, but results in a predictable loading location may be achieved limiting unnecessary movement (thereby increasing potential throughput) during the loading process.

To achieve a seamless high throughput loading process requires synchronized indexed receiving motion of the movers. During loading two movers will be positioned at the loading area of the product infeed, one currently loading and a subsequent mover ready to load next (positioned at an intermediate queuing location 109A). Each loading process will synchronize the motion of the mover to the arrival of each product during the loading process utilizing one or more sensors 80. By identifying the moment of loading a corresponding receiving motion may be performed (ie. a mover moves along direction of motion to reduce impact during loading) or feed-forward force control to counteract the impact, before indexing to the next position (to await next product loading in bay or synchronized to arrive at the moment of loading).

Figure 35:
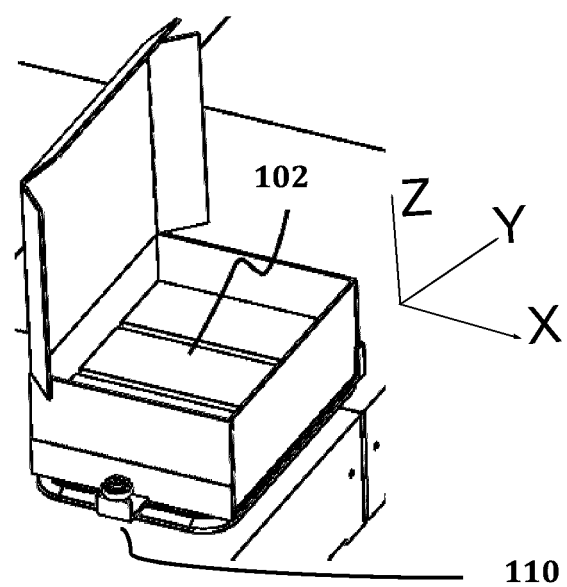
FIG. 35 is a perspective view of a package loaded with product.

FIG. 35 shows a packaging layout 219 embodiment comprising a package 102B (partially filled with products 102), a mover 100 (carrying the package 102B with a clamping mechanism 210) and a stator surface 200. In this particular embodiment an array of products 102 has already been deposited in the package 102B and an additional array of products102 may be placed on top matching the previous array or in a new arrangement according to the packaging layout 219. The gripping mechanism for this particular embodiment comprises a fixed clamping side 116B and a movable clamping side 116A, which together secure the package between their respective clamping surfaces when in a closed position by applying a securing force on the product along their clamping direction (the securing force may be generated by the restoration force of a resilient deformable element 121).

Figure 36:
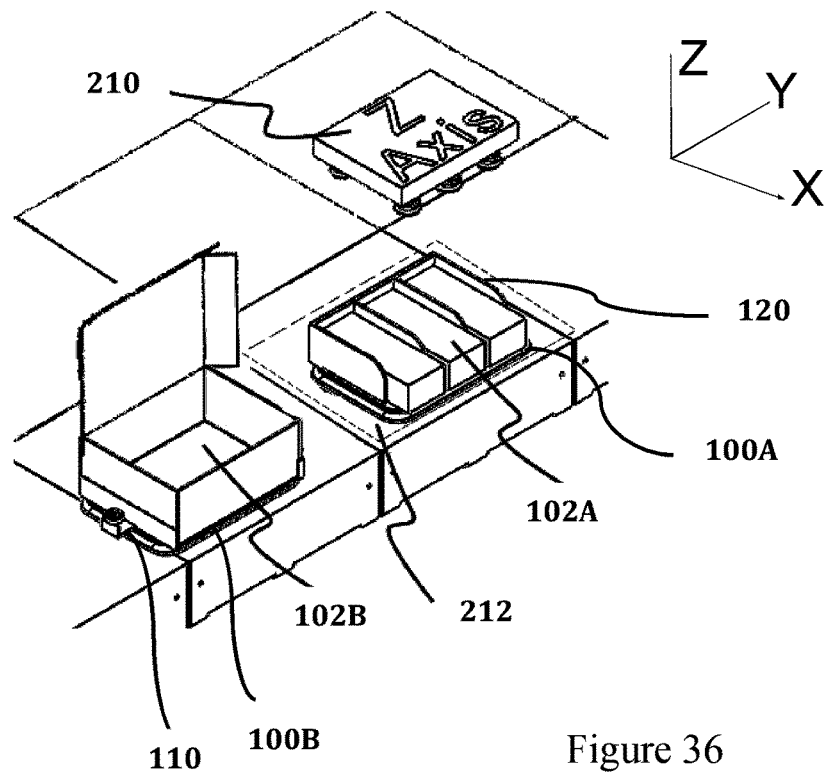
FIG. 36 is a perspective view of a loaded transfer mover and empty packaging mover.

FIG. 36 shows an embodiment of the transfer station comprising a mover 100A (carrying one or more products 102 held by a load securing mechanism 120), a mover 100B (carrying one or more packages 102B held by a package clamping mechanism 110) and a stator 200. After the first mover 100A receives a first product 102A), it travels to the transfer device 210, where the product (s) 102 are removed from the first mover 100A (while positioned at a first unloading location 108A). The transfer device (gantry) 210 actuates the securing mechanisms in a −Z direction until contact occurs with each product, then the securing mechanisms are activated to securely hold each product 102 and lift them from the mover with a +Z motion. In this embodiment, a single axis robot 210 (transfer device) is used, though additional axes of actuation are also acceptable. The first mover 100A may then move away from the transfer station, and a second mover 100B moves to the transfer device (gantry) 210. The second mover 100B may be carrying one or more packages 102B. The transfer device (gantry) 210 then deposits the product (s) 102 into the package 102B (while the second mover is at a second receiving location 107B). The second mover 100B can repeat this process as many times as needed until a desired number of products 102 is placed in their desired positions inside the one of more packages 102B carried by the second mover 100', creating a desired layout 219.

In some embodiments, the products 102 could be arranged in more than one layer, where each layer is positioned in the same way as the products on the first mover 100. In other embodiments, each layer may require more products than carried by the first mover 100A at one time, in these embodiments, a subsequent number of one or more movers 100A may be used, or the first mover 100A may be used multiple times to deposit items into the second mover's 100B package 102B consecutively.

It should be noted that the flexibility of this novel robotics system allows a nearly infinite number of ways to fill a package 102B with products 102. One method for arbitrary product placement is to pick up one product 102 at a time using the robot arm 210, then position the second mover 100B accurately such that the robot arm can deposit the product 102 into the desired position in the package 102B one by one. An extension from this method is to place multiple products onto the first mover 100, such that the robot arm 210 can pick up multiple products 102 at the same time. Furthermore, if the gripping elements of the transfer mechanism can be independently actuated or actuated in some subsets it is possible to selectively pick up and release products to achieve even more placement flexibility.

Figure 37:
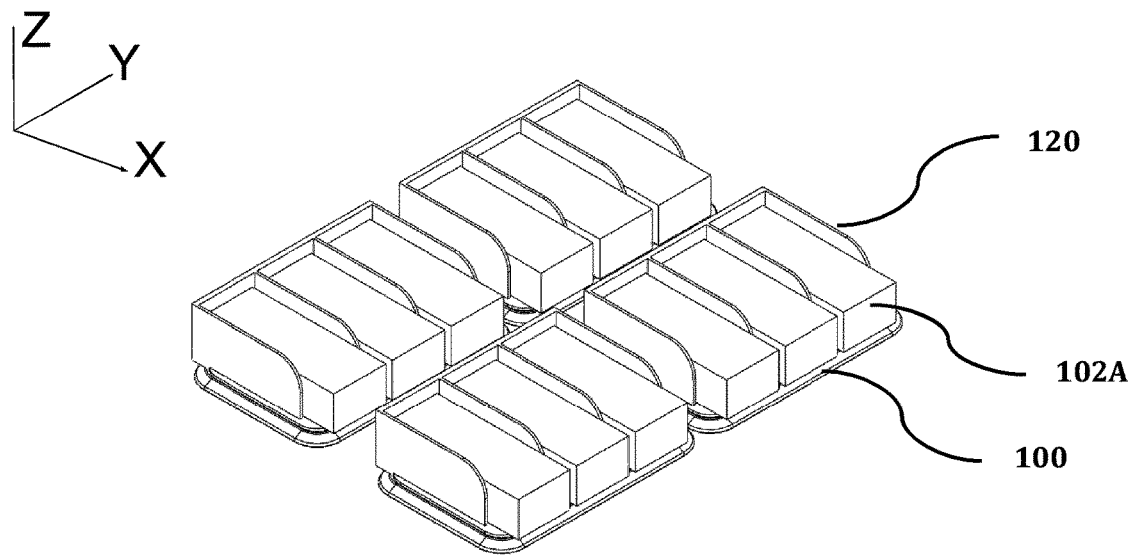
FIG. 37 is a perspective view of plural transfer movers with plural securing slots.

FIG. 37 shows multiple movers 100 used in conjunction to create an array of products 219 that can be picked up simultaneously by a gantry. The arrangement 219 is a layout that can be arbitrarily defined by changing the spacing between the first and third mover 100 or first and second mover. Similarly, a fourth mover 100 can be used together with the first, second and third movers, to create a 2-dimensional array of parts. The distance between the movers can be adjusted as desired to achieve the desired layout pattern, with as many movers as required.

FIG. 41/42 shows an embodiment of a box carrying mover loading process comprising two movers 100A/100B (the first mover 100A carries a package clamping mechanism 110, while the second mover 100B comprises a fixed surface 103), and a package 102B. During the loading process the package clamping mechanism 110 carried by the mover 100A is actuated by the second mover's 100B fixed surface 103 engaging (pushing against) the package clamping mechanism and while engaged the relative position is changed thereby opening the mechanism(separating the the two clamping sides 116A/116B with a clamping distance 117) so a box can be placed on the mover 100A between the two clamping sides 116A/116B. After the package 102B is loaded on the mover 100A (ie. by a box forming mechanism 230 shown in FIG. 33) the second mover 100B will move away from the first mover 100A allowing the resilient deformable elements (restoration springs) 121A/121B to return the package clamping mechanism 110 to a closed position (clamping sides 116A/116B moved together reducing the clamping distance 117) thereby gripping the package 102B preventing movement relative to the mover 100A.

Figure 43:
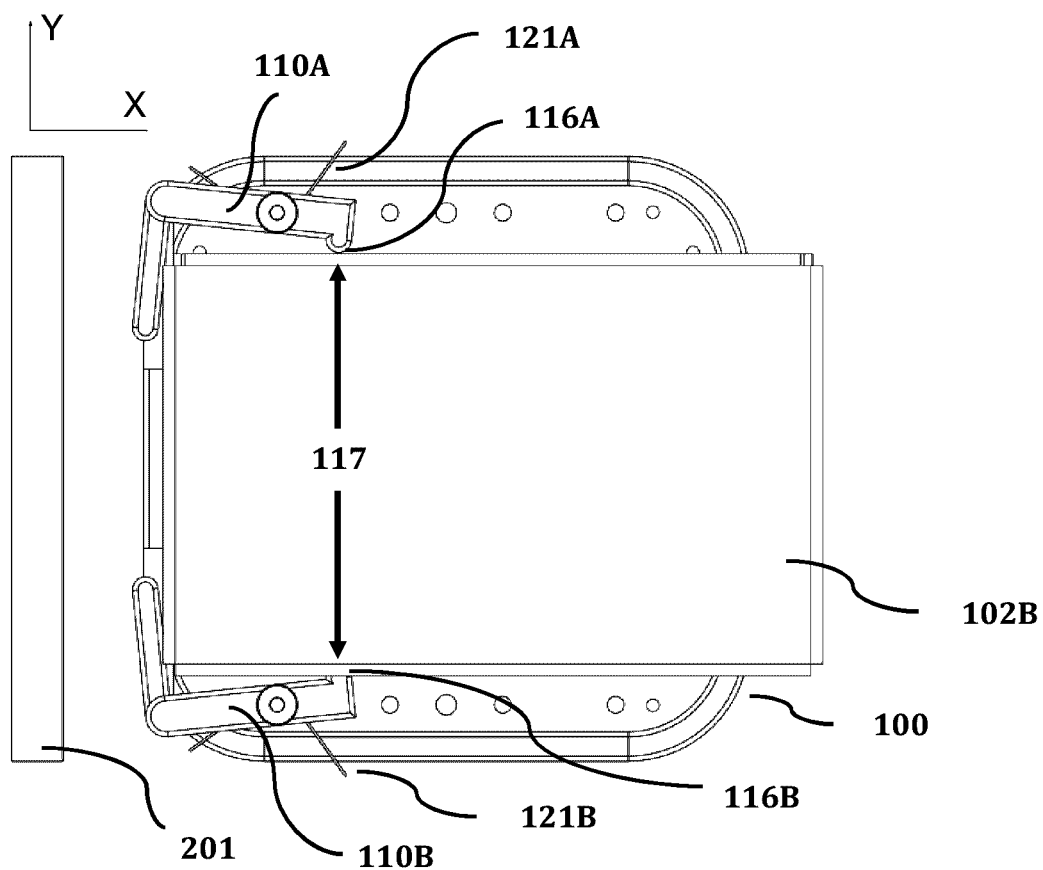
FIG. 43 is a plan view of a securing base approaching a releasing bar.
Figure 44:
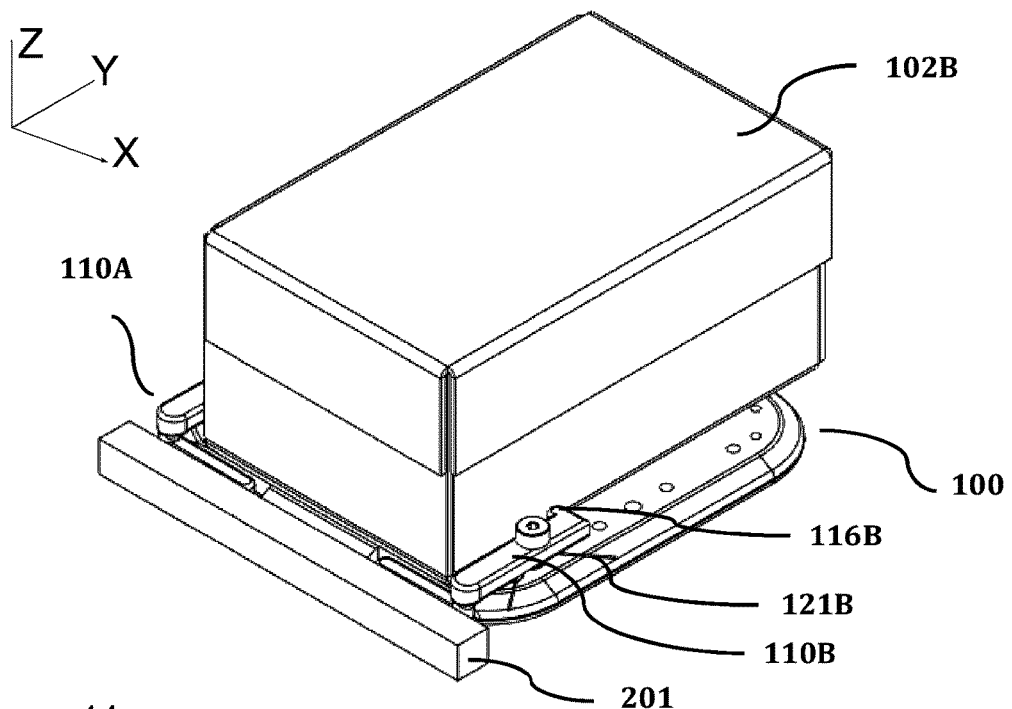
FIG. 44 is a perspective view of a securing base approaching a releasing bar.

FIG. 43 shows an embodiment of the package clamping mechanism 110 comprising a mover 100, a package clamping mechanism 110 (the clamping mechanism is composed of a fixed portion and a moving portion actuated when pushed against a surface and loaded with a resilient deformable element 121), a package 102B, and a fixed surface 201 mounted to the stator 200. To open the box when loading a package the package clamping mechanism 210 is pushed into the fixed surface 201 thereby opening the clamping mechanism and after the package 102B has been loaded, the mover 100 will move away from the fixed surface 201 allowing the resilient deformable element 121 (restoration spring) to return the clamping mechanism 110 to a clamping state. During unloading the mover 100 will approach the fixed surface 201 and push the clamping mechanism 210 against it to open the clamping sides 116A/116B of the mechanism thereby allowing the package release tool 260 to transfer the package to the outfeed 240.

The particular embodiment shown in FIGS. 41-44 comprises two rotating members 110A/110B, where one side may contact (engage) a surface (of an external object) and the other side is a clamping side 116A/116B which can grip a product between the two clamping sides. While engaged with an external object 201 the rotating members 110A/110B rotational position (with respect to the mover) is altered as a function of the relative position of the mover to the external object. The particular embodiment shown is normally closed and opened with relative X movement while engaged generating opposing rotation thereby decreasing or increasing the clamping distance of the clamping surfaces 116A/116B.

In an embodiment utilizing a package clamping mechanism 110 shown in FIGS. 41-44, a box carrying mover unloading process comprises a mover 100 (with a product securing mechanism 110), a package 102B, a fixed contact surface 201, a unloading actuator 260 (see FIG. 33) and an outfeed 240. During an unloading motion the mover 100 will move towards the fixed contact surface 201 until the package clamping mechanism 110 contacts the fixed surface 201 and each arm is rotated (around a bearing element) to an open position (package clamping sides 116A/116B move apart). After the package clamping mechanism 110 is opened an unloading actuator 260 will push the package through the gap 117 between the package clamping sides 116A/116B over the fixed contact surface 201 to the outfeed 240. After unloading has occurred the mover 100 will move away from the contact surface 201 allowing the package clamping mechanism 110A/110B rotary arms to return to a closed position (clamping sides move together) actuated by each rotary arm's resilient deformable element (restoration spring) 111A/111B (biased to closing).

Generally a particular clamping mechanism will have an associated clamping distance 117 range (minimum and maximum distance), clamping direction, natural position (ie. normally open, normally closed, etc.) and clamping forces. Each particular clamping mechanism 110 design will be suitable for certain products and applications.

The system 900 permits changes to the product 102A, package 102B and desired product layout 219 with minimal effort. The mover 100 can be fitted with a flexible load mechanism 120 that can be swapped out easily, or the load mechanism 120 can be configured to accept different product layouts. For example, it can load only the desired number of products during each trip to the infeed station 220.

After changing the product requirement, the only change in transferring the products 102A to the package 102B would be programming changes to let the movers go to the loading/unloading locations. By making these minor changes or pre-programming, it is possible to easily adapt the system 900 for many different products 102 and packaging configurations 219, with minimal downtime.

The assembly system 900 (such as the one shown in FIG. 33) permits the use of force measurements from the control of each mover to determine the weight of each product to assess product quality issues. In addition, the measured force impact and/or change in mass may be utilized to indicate that a product has been received, interacted with or unloaded triggering subsequent actions. By avoiding the use of a timing sequence for the infeed it is possible to achieve more consistent performance tolerant to some variability. With a more robust action triggering control of the system should result in an easier setup process, while being more predictable and reliable.

Figure 47:
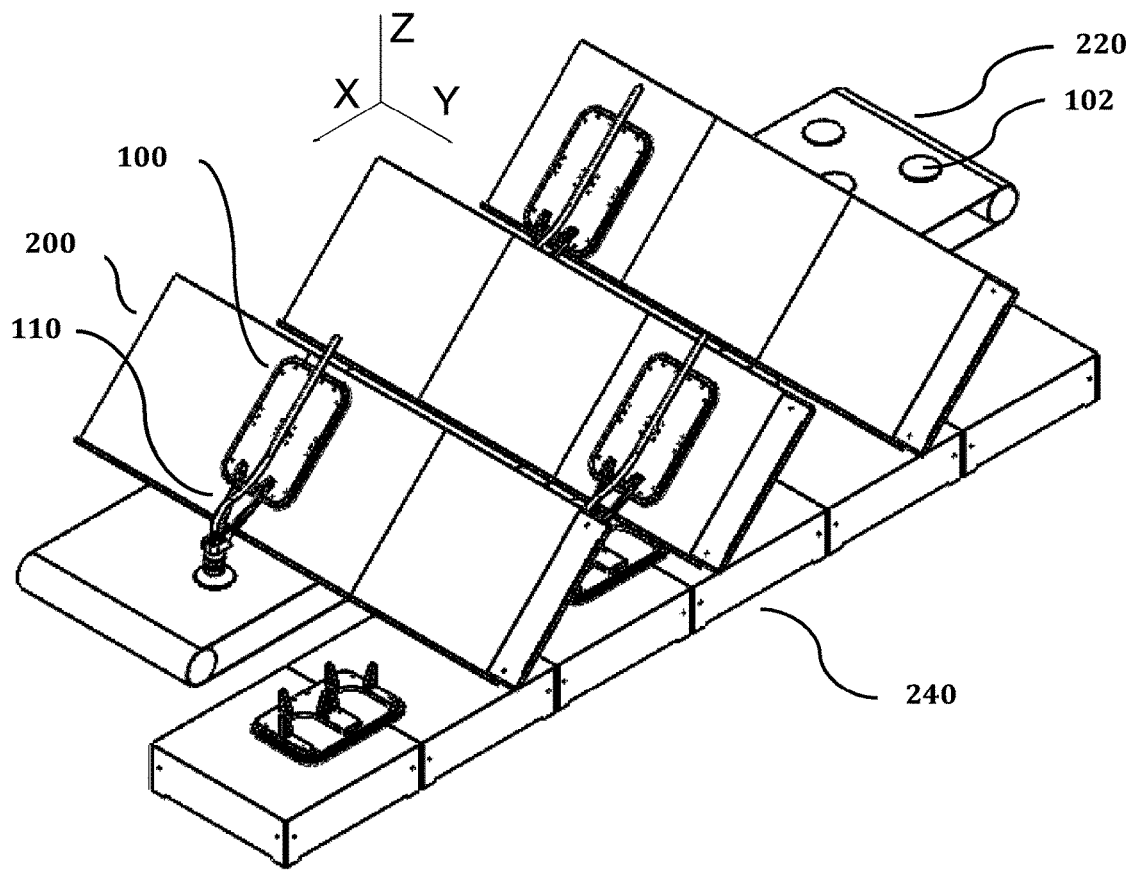
FIG. 47 is a perspective view of an alternative assembly system

FIG. 47 shows a robotic assembly system 900 according to a particular embodiment. The system comprises plural connected stators 200 (arranged in one or more sets of working regions with respective working surface inclined from vertical) and one or more movers 100 (carrying an actuated product securing mechanism 110 situated on the inclined stators), one or more controllers 70 (not shown), and one or more mover sensors 180 (not shown). The system furthermore comprises an unsorted infeed 220 (with respective conveyor working surface), a product sensor 80 (not shown) to determine product 102A locations on the infeed surface 221, and a packaging outfeed 240 (additional horizontal stator 200 working region, or alternative horizontal transfer device capable of carrying workpieces 102A or packaging 102B). A picking mover 100 operates on an inclined stator 200 working region while carrying an actuated product securing mechanism 110 (with active end effector 111) mounted to the mover and positioned past the edge of the mover. Extending the end effector 111 to a suitable offset relative to the mover allows the end effector to coincide with the infeed surface 221 region during a picking motion (picking with Xs movement, aligned with Ys movement). By utilizing the translation movement of the mover 100 to actuate the picking motion, high-speed picking, speed matching, low shear on the product 102A and a relatively large z stroke of the end effector can be achieved. To compensate for excessive Z movement a compliant mechanism may be used (compliant along Z/Xs), additionally the mover's end effector (ie. vacuum cup) may actuate the workpiece with a Z motion. After successfully picking the moving workpiece 102A from the unsorted infeed 220 the mover 100 may utilize its movement (Ys axis movement) to position the workpiece with respect to the outfeed (potentially coordinating movement with the outfeed to achieve a desired X position) before releasing the workpiece to the outfeed (optionally being received by packaging 102B). The product 102A may be arranged in stacks, patterns etc. as required by a particular application. When the picking mover 100 releases a product to another mover operating at the outfeed 240 the coordinated movement may be utilized to drop a product 102A deep into receiving packaging 102B by matching the horizontal (X axis) component of the inclined movers (Xs axis) movement. Multiple movers 100 may be utilized on a single inclined stator 200 working area to perform multiple picking operations by moving in a cooperative manner. Each mover 100 may optionally utilize multiple individually actuated product securing mechanisms 110 to pick workpieces from infeed surface 221.

In some embodiments rotational movement of the picking mover 100 may be used to assist with movement of the end effector 111 for positioning or picking. In some embodiments an end-stop 201 can be mounted on the front/lower edge of the inclined stators 200 to prevent a mover 100 from falling off the stator during all off states (ie. power failure). Depending on the incline angle of the stator 200 it is possible that the incline will exceed the angle of repose for the mover 100, thereby always inducing a downwards sliding movement to the lower edge of the stator when not counteracted by active control via the stator.

Multiple sets of independent inclined stators 200 with respective picking movers 100 (carrying an actuated product securing mechanism 110) may be positioned at different locations along the workpiece infeed 220. Each set of inclined stators/movers will operate in a cooperative manner to pick workpieces 102A from the conveyor. The number of sets of picking movers 100 operating on each inclined stator 200 working region may be increased as needed to meet required throughput and/or reliability requirements.

In some embodiments the multiple sets of inclined stators 200 and movers 100 improves the potential throughput and may be utilized to sort different types of workpieces into different streams or for specific placement in the outfeed 240. In one particular embodiment a plurality of different sets of inclined working regions (with respective picking movers) may each pick a specific type of workpiece from the unsorted infeed and deposit the workpiece on their own dedicated outfeed (ie. a chute).

Figure 48:
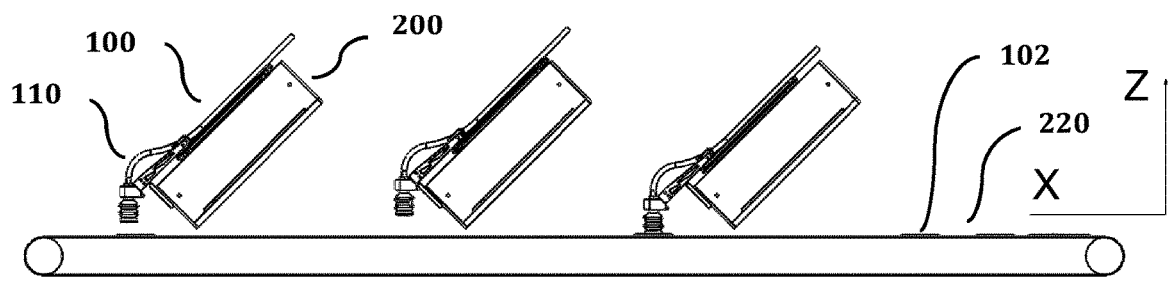
FIG. 48 is a side view of movers picking workpieces on the infeed from multiple inclined stator working regions

As shown in FIG. 48 the infeed unloading embodiment utilizes stators 200 located above the infeed surface 221 (with an incline angle theta between the mover working surface and conveyor working surface) and movers 100 (carrying an actuated product securing mechanism 110) to unload products 102 from the infeed 220. The inclined angle of the stator 200 with movement along the stator working surface (Xs direction) creates a vertical movement component which allows the mover 100 to actuate the product securing mechanism 110 with large Z movement towards (and after picking, away from) the infeed surface 221, and a horizontal movement component which can be used to for moving along the direction of motion (X axis) of the product during transfer thereby reducing or eliminating workpiece shear during picking of a moving product 102. The additional lateral translation (Ys axis) is used for positioning with respect to Y axis). Additionally the compliance along X-axis and Z-axis of an end effector 111 in this arrangement may be built in (ie. with a rubber vacuum cup) to reduce shear acting on the workpiece and provide time for deceleration (along Xs) after picking contact has occurred between the end effector 111 and workpiece 102. An alternative direction of compliance is along the Xs axis, which aligns with the movers 100 motion during a picking operation.

In some embodiments the end effectors 111 actuation will secure the workpiece 102A while simultaneously lifting the workpiece (ie. a vacuum cup's bellows may compress when under vacuum) thereby assisting with lifting the workpiece clear of adjacent workpieces.

Figure 49A:
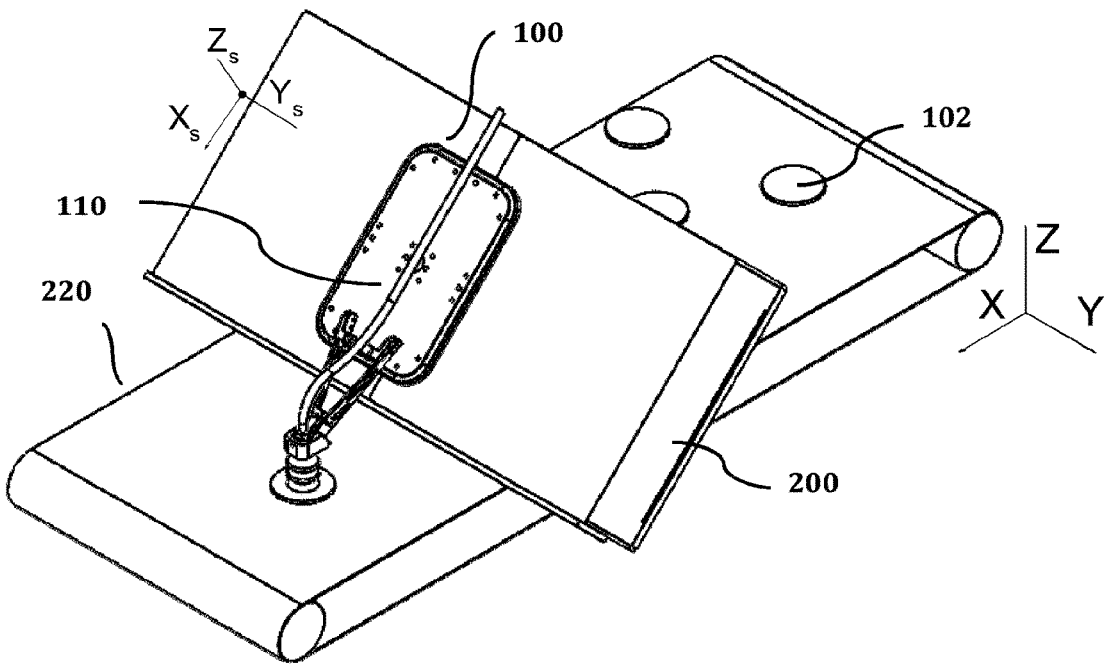
FIG. 49A is a perspective view of a alternative assembly system
Figure 49B:
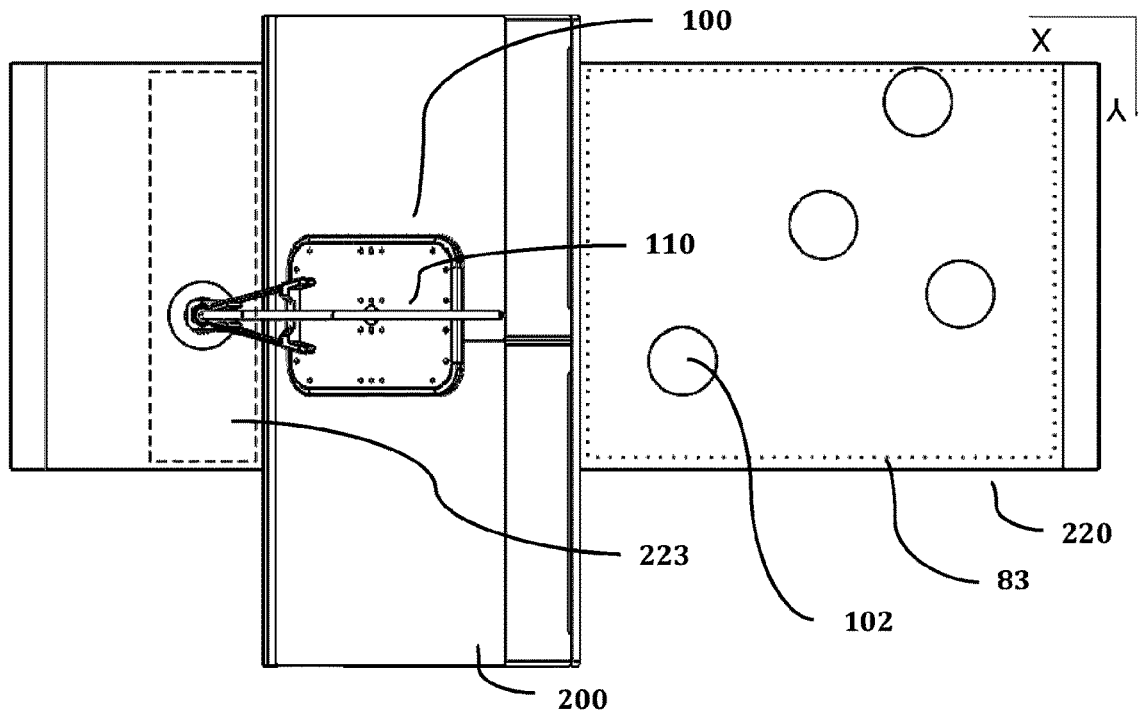
FIG. 49B is a plan view of the alternative assembly system's conveyor locations

As shown in FIG. 49A a product transfer embodiment comprising a infeed 220, inclined stator 200 (inclined from vertical), mover 100 (operating on working region of inclined stator, with product securing mechanism 110), product 102, product sensor 80 (not shown). To transfer products the X and Y position on the conveyor of each product is determined via the product sensor 80. Based on the position of the workpiece 102 the mover will align its Y position with the product 102 and perform a transfer motion utilizing the synchronized actuation of the mover 100 (along Xs direction, to create −Z motion of end effector and motion of mover along the conveying direction) and the end effector 111 (of the mover carried product securing mechanism 110) to grab the moving product from the infeed. A compliant mechanism and/or vertical actuation by the product securing mechanism (ie. through non-rigid bellows of a vacuum cup deforming and/or compressing) may be used to compensate for overshoot in Z motion of the end effector after transfer (required to decelerate along Xs if speed is matched during transfer). Although this particular embodiment has the Y direction of the conveyor and stator (Ys) parallel this is not necessary, further angle offset(s) (such as rotation of stator about Z axis with respect to conveyor) is also possible As shown in FIG. 49B, with same embodiment as FIG. 49A the infeed additionally comprises a sensing area 83 (where a sensor such as an overhead camera determines the position of each product 102 on the infeed surface 221) and a transfer area 223 (where products are removed from the infeed by a mover100 utilizing its product securing mechanism 110). In this particular embodiment the mover 100 working surface overlaps the conveyor 220 working surface along the conveyor working surface's normal direction, this is not necessary but can provide an improved ease of control or accessibility of the conveyor's full width (along Y direction).

Figure 49C:
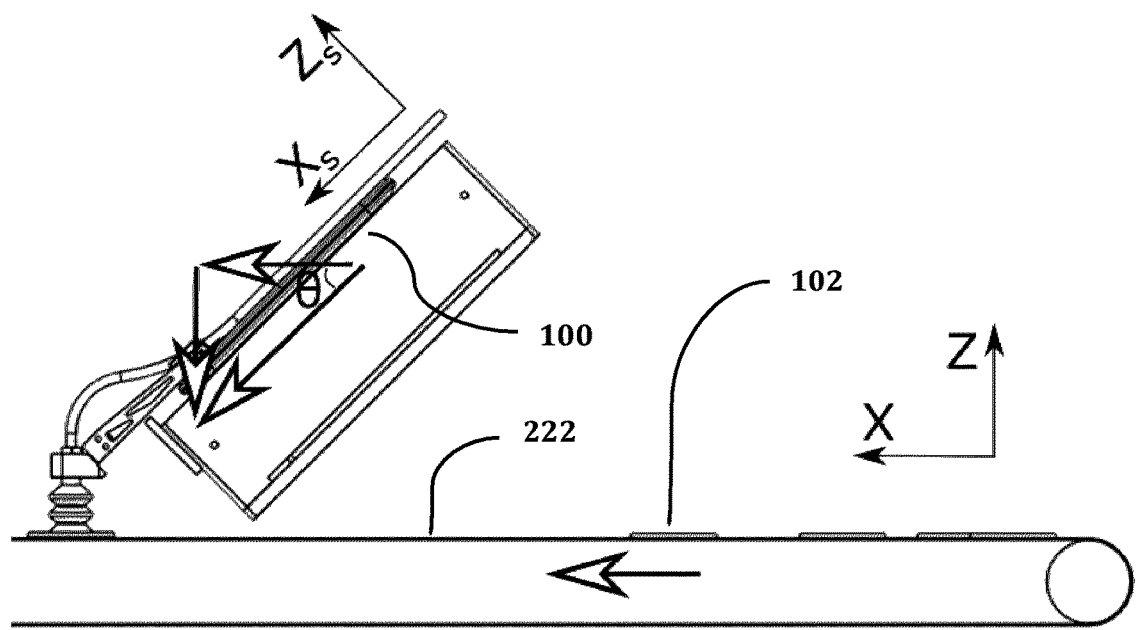
FIG. 49C is a side view showing the relative movement between workpieces on the infeed and movers on an inclined stator working region.

As shown in FIG. 49C the inclined angle of the stators 200 angularly offsets the stators coordinate system (Xs,Ys, and Zs) by the inclination angle theta about the infeed's 220 Y axis. As a result the mover's 100 velocity (v) along the Xs axis has a corresponding component with respect to the X axis and Z axis, with a product 102 on the infeed 220 having X motion and a variable Y position (matchable with mover Ys motion) along the conveyor surface.

In FIG. 49C, the speed matching can be easily understood: the mover 100 is moved by the controller along the stator surface with motion component in X direction (generally the first direction) substantially matching the conveyor speed, so as to have no relative shear between the vacuum suction cup 111 and the conveyed product 102 during the process of transferring the product 102 from the conveyor 222 to the mover.

If the system was to be optimized the typical constraints on the angle ($\theta$) are the maximum achievable mover velocity (along Xs direction) during the moment of picking (limited by acceleration, movable distance, payload etc.), and the workpiece's 102 speed (typically restricted by an upstream process and relatively constant).

$$\theta \le \left( \frac{WorkpieceSpeed}{MaxMoverSpeed} \right)$$

Conversely the effective z stroke of the mover's 100 end effector 111 is equal to the vertical component of the mover's $X_s$ movement (Z=sin(θ)*Xs). Users may desire to maximize the z-stroke (steep incline θ) to achieve larger clearances while carrying a workpiece 102, therefore a large incline angle θ may be desired.

In some embodiments the angle theta of the stators 200 (and angle of actuated product securing mechanism's 110 end effector 111) inclination from horizontal may be varied (ie. actuated) to match a changing infeed 220 speed. By varying the incline angle θ a large z stroke may be maintained for different operating conditions.

In some embodiments stationary picking may be performed, however the lack of infeed movement will result in non-ideal picking conditions. Due to the coupled X and Z movement inherent with the inclined Xs movement of the mover the end effector's X movement relative to the workpiece 102 will always occur at a rate determined by the effective downwards Z movement (as a function of the incline angle). The resulting shear created on the workpiece 102 is generally unwanted and will create variability in picking location on the workpiece while simultaneously creating a rubbing action between the end effector and workpiece during picking.

Generally an incline angle may be defined as an angle between the normal directions of the conveyor working surface and mover working surface.

Figure 50:
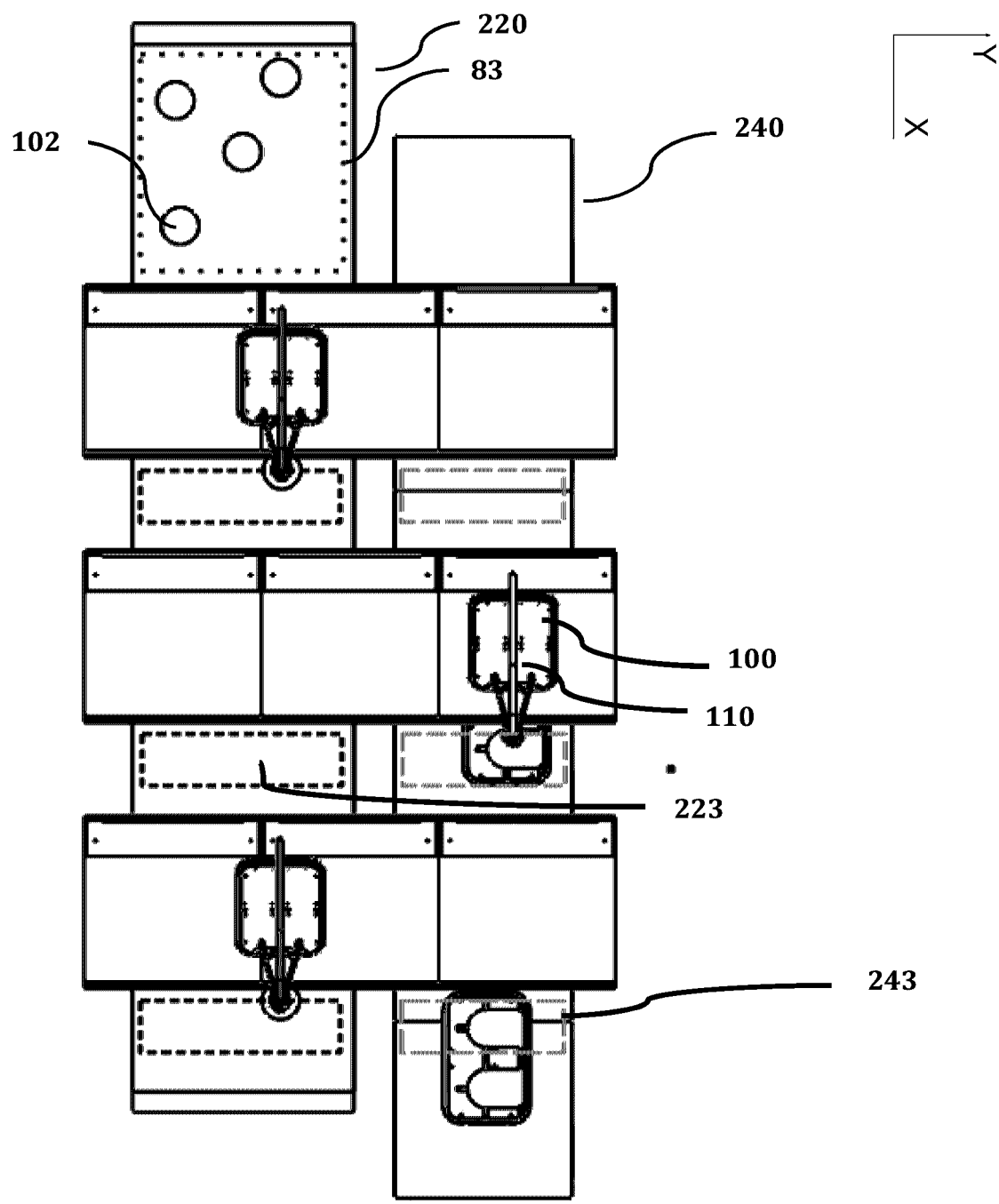
FIG. 50 is a plan view of an assembly system according to one embodiment.

FIG. 50 shows a plan view of the embodiment shown in FIG. 47, additionally showing the sensing area 80, one or more picking areas 229 and workpiece unloading areas 242. When workpieces 102 enter the unsorted infeed 220 one or more sensors 80 (ie. overhead camera) are used to identify each workpiece's position on the infeed surface 221. After identifying each workpiece 102 the system 900 will assign the most optimal mover 100 to pick the workpiece 102 from the infeed 220. The assigned part picking mover 100 will align with the lateral position (Y/Ys axis) of the workpiece 102A, and time the movers Xs motion so the end effector 111 coincides with the workpiece (with matching position and speed) at the desired picking location. Each of the part picking movers 100 has an associated picking area 223 determined by the effective pickable contact area of each workpiece and feasible mover movements. Additionally each part picking mover 100 has an associated dropping area 243 in the packaging outfeed 240 determined by the reach of the end effector 111. The system may additionally use sensors 80 to validate whether a pick was successful, such as by reidentifying workpieces 102 downstream of the picking area, validating whether the end effector 111 is gripping a workpiece (ie. measuring the vacuum pressure of a vacuum cup), or force measurement. If a pick was unsuccessful the system may utilize sensors 80 to reidentify the position of the workpiece and if possible, assign picking to a suitable mover 100 downstream. In some cases where a second attempt is not possible the workpiece may exit the system as a reject or be fed through the infeed an additional time.

Figure 51:
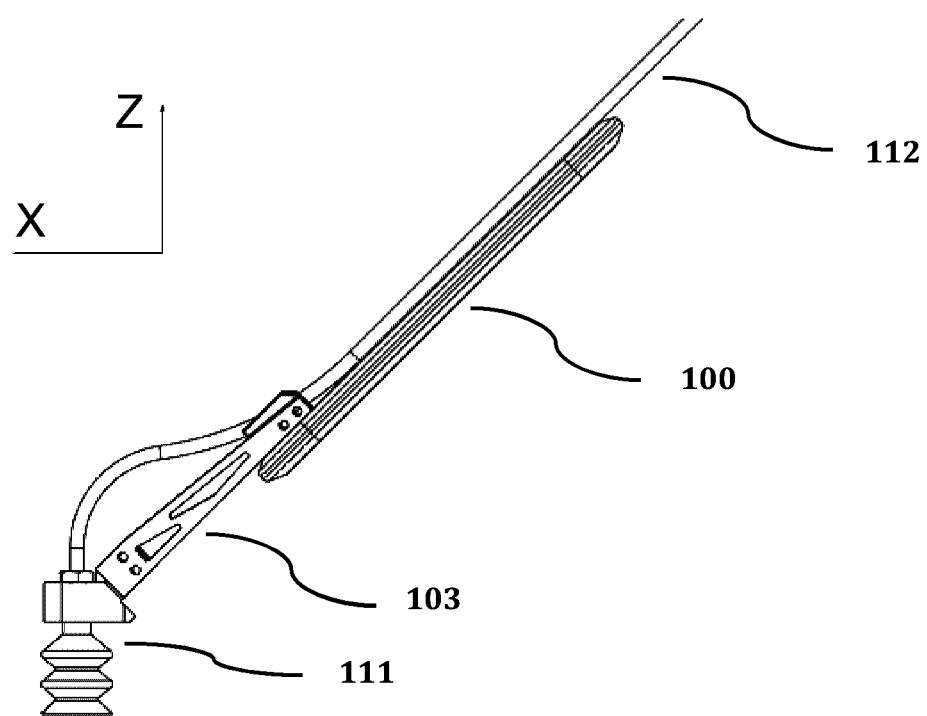
FIG. 51 is a side view of an inclined product securing tool on a planar robot.
Figure 52:
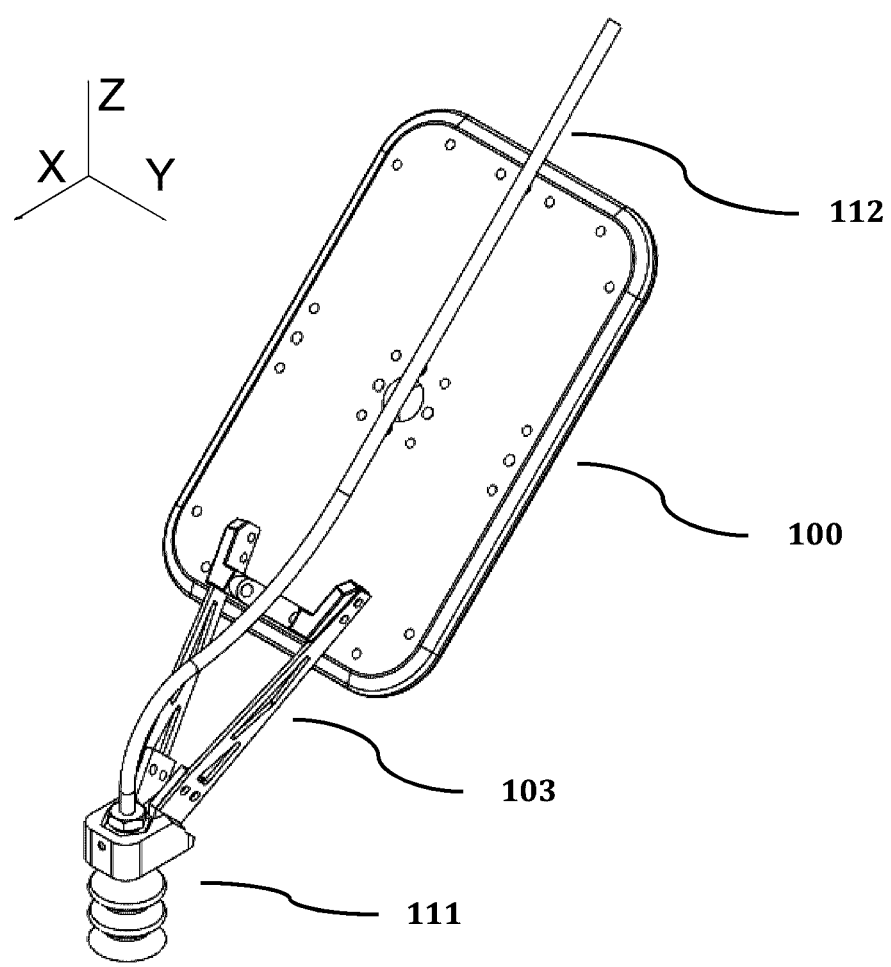
FIG. 52 is a perspective view of an inclined product securing tool on a planar robot.

FIGS. 51 and 52 shows an inclined part picking mover comprising a mover 100, end effector 111 (vacuum cup connected to external vacuum source by vacuum line 112 with a solenoid actuated valve), and cantilevered structure 101. The end effector's 111 gripping plane is oriented to be parallel to a workpiece's 102A gripping surface. The inclined part picker's cantilevered structure 101, end effector 111 and carried workpiece 102A must avoid contact with the stator 200 and end stop 201 at all Xs positions to avoid unwanted contact during a picking operation or traversal (Ys motion). The inclined part picking mover also utilizes designed compliance via the end effector 111 (ie. rubber expansion bellows integrated in vacuum cup) or cantilevered structure 101 (ie. flexural elements) to reduce shear on the workpiece during picking motion and reduce severity of picking motion constraints (overshoot consequences not severe).

In some embodiments where the end effector's actuator is sufficiently light it may be carried by the mover and powered via an external connection. In other embodiments the actuator may be mounted externally and connected to the end effector via an external connection 112 (ie. vacuum line).

Figure 53:
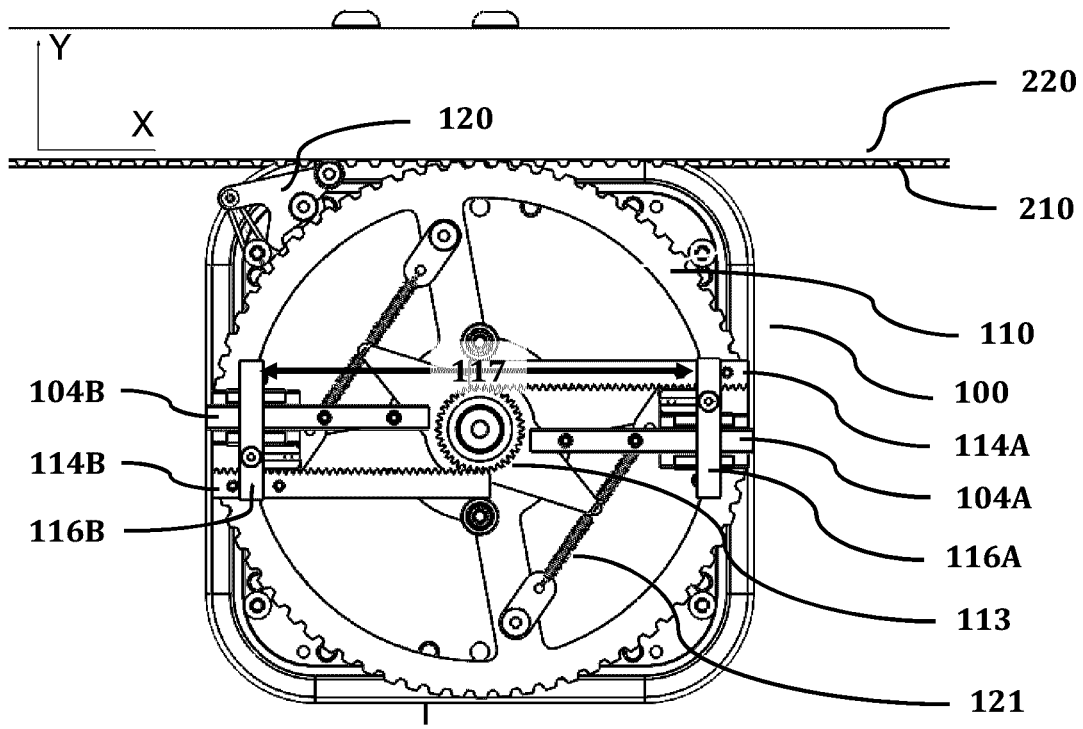
FIG. 53 is a plan view of a X-oriented mover carried product gripping embodiment in an open position
Figure 54:
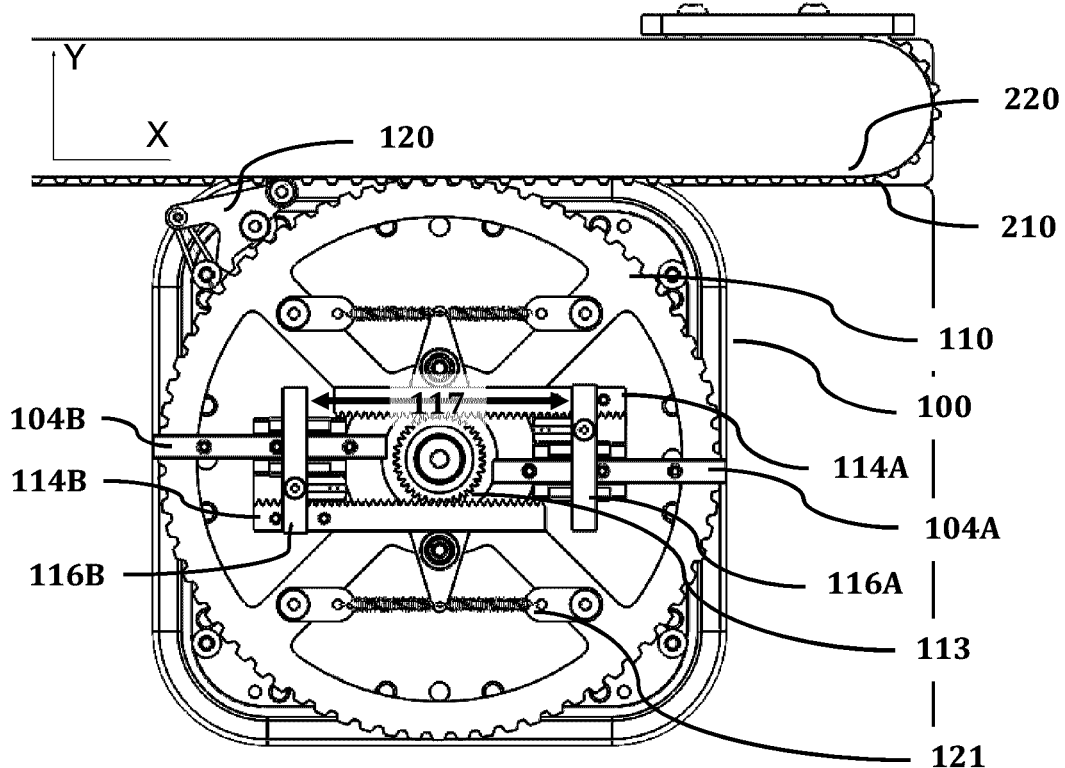
FIG. 54 is a plan view of a X-oriented mover carried product gripping embodiment in a closed option

FIG. 53 and FIG. 54 show top views at two different positions for a particular embodiment of the invention comprising a mover 100, a first actuator body 110(a rotary gear with teeth 112 on its cylindrical circumference, and the gear is installed on the mover 100 with suitable bearings so that it can rotate around a rotation axis 101 fixed with the mover), two auxiliary actuator body 114A/114B(with clamping sides 116A/116B fixed to the rack 114A/114B which is guided and supported with a linear guide 104A/104B, while the rack is engaged with a inner gear 113 that is connected to the first actuator body 110 with springs 116 arranged to apply torsion if misalignment occurs), a second actuator body 210 (a rack or timing belt with teeth 212 installed on the stator), a first latch body 120 (a rotary arm rotatable around a rotation axis 125 fixed with the first mover 100, preloaded with a restoration spring 121, a contact roller 123 rotating around an axis 124 fixed with 120), and a second latch body 220 (with a flat or curved surface) fixed on the stator.

This particular embodiment utilizes a +Y unlocking movement to contact the first latch body with a second latch body (engaging), thereby separating the first latch body from the first actuator body to achieve an unlock state. During a locking motion the mover will move in a −Y movement to separate the first latch body from the second latch body (disengaging), thereby inducing the first latch body's restoration spring 121 to regain contact between the first latch body and the first actuator body. During an engaging motion the first actuator body is moved with a +Y movement to initiate the first actuator bodies contact with a second actuator body to achieve engagement. During a disengaging motion the first actuator body is moved with a −Y movement to separate the first actuator body from the second actuator body. While maintaining an unlocked state and engagement between the first and second actuator body, the mover may move in an opening movement along the X direction (−X movement) (clamping surfaces 116A/116B moving apart along clamping directions). While maintaining an unlocked state and engagement between the first and second actuator body, the mover may move in a closing movement along the X direction (+X movement) (clamping surfaces 116A/116B moving together along the clamping directions). In this embodiment the actuation of the first actuator body 110 can generate rotation in two directions +Rz and −Rz. When the first actuator body is actuated in the +Rz direction the motion will move an inner gear through a resilient deformable element 121, and the inner gear 113 is engaged with two racks 114A/114B with clamping sides 116A/116B mounted on them. The movement of the two racks 114A/114B towards center will cause the clamping sides 116A/116B to move together (clamping side 116A moves +X and clamping side 116B moves −X), and if a workpiece is between the two clamping sides 116A/116B they along with the racks 114A/114B and the inner gear 113 will be obstructed from further movement, but the first actuator body 110 will still be capable of further +Rz movement since the resilient deformable element 121 will allow misalignment between the first actuator body 110 and the inner gear 113, thereby generating a variable gripping force at the clamping surfaces 116A/116B dependent on the misalignment between the first actuator body 110 and the inner gear 113. During initial movement in −Rz of the first actuator body 110 if a workpiece is being held by the two clamping side 116A/116B the initial movement will reduce misalignment between the first actuator body and the second actuator body until there is no misalignment before further −Rz movement induces separation of the two clamping side 116A/116B (clamping side 125A moves −X and clamping side 116B moves +X) through a transfer of motion through the resilient deformable element 121, inner gear 113 and auxiliary actuator body to the clamping surfaces 116A/116B. In this particular embodiment, the locking state may be used to secure the product with a sustained variable clamping force.

Figure 55:
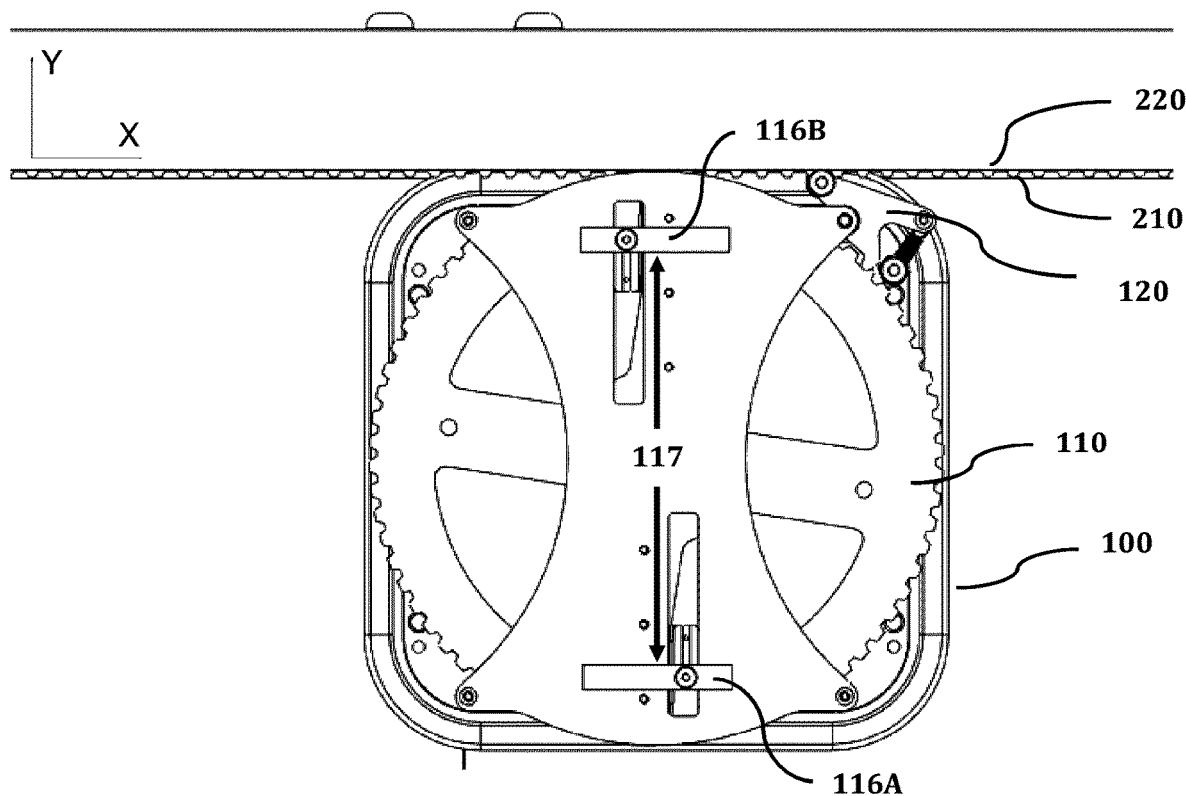
FIG. 55 is a plan view of a Y-oriented mover carried product gripping embodiment

FIG. 55 shows a variation of the embodiment shown in FIG. 12A/12B with the clamping sides reoriented to achieve clamping in +Y and −Y directions, this embodiments opening/closing motion, locking/unlocking process and engaging/disengaging process is the same as the embodiment described in FIGS. 53 and 54. Additionally, further between angles of clamping directions are possible in other embodiments.

Figure 56:
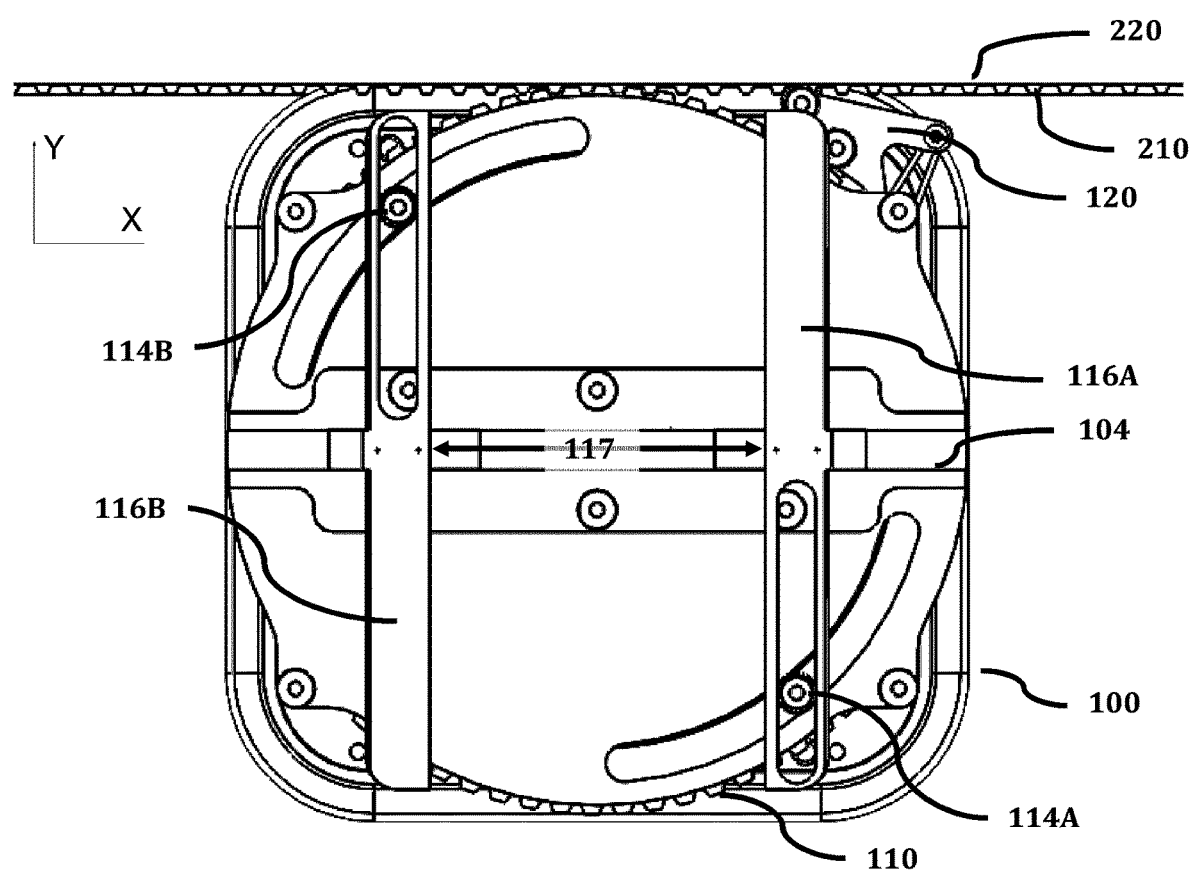
FIG. 56 is a plan view of a mover carried product gripping embodiment

FIG. 56 shows a top view of a particular embodiment which comprises a mover 100, a first actuator body 110 (a rotary gear with teeth 112 on its cylindrical circumference, and the gear is installed on the mover 100 with suitable bearings so that it can rotate around a rotation axis 101 fixed with the mover), clamping sides 116A/116B (the clamping motion is constrained by a v-slot 104 limiting the motion to a single degree of freedom and the clamping sides 116A/116B includes a slot orthogonal to the constrained motion in this case aligned with Y axis), auxiliary actuator body 114A/114B (a wheel mounted on the first actuator body 110 and positioned within the slot of the clamping sides 116A/116B to allow the wheel to roll along the slot as the first actuator body 110 rotates, thereby transferring the motion to the clamping sides 116A/116B, additionally surrounded along its circumference is a resilient deformable element 121), a second actuator body 210 (a rack or timing belt with teeth 212 installed on the stator), a first latch body 120 (a rotary arm rotatable around a rotation axis 125 fixed with the first mover 100, preloaded with a restoration spring 121, a contact roller 123 rotating around an axis 124 fixed with 120), and a second latch body 220 (with a flat or curved surface) fixed on the stator.

This embodiment has similar unlocking/locking and engaging/disengaging motions as the embodiment shown in FIG. 2. During an actuating motion of the mover 100 in +X direction the first actuator body will be rotated in the −Rz direction, which will move the auxiliary actuator body 114B in a −Rz motion relative to the mover 100 driving the clamping side 116B with a −X direction component which is aligned with the V-Slot 104 constraining the clamping surface 116B motion. The second auxiliary actuator body 114A is also rotated with a −Rz motion relative to the mover body (magnetic components) 100 driving the clamping side 116A with a +X direction component which is aligned to the V-Slot 104 constraining the clamping side 116A motion. The combined clamping motion will cause the clamping sides 116A/116B to move together and allow gripping of a workpiece to occur. During an actuating motion of the mover 100 in the −X direction the first actuator body will be rotated in the +Rz direction, which will cause the clamping sides 116A/116B to move apart from each other through a transfer of motion from the first actuator body 110 through the auxiliary actuator bodies 114A/114B to the clamping sides 116A/116B.

FIG. 57 shows a top view and FIG. 58 shows an isometric view for a particular embodiment comprising a mover 100, a fixed clamping side 116B (fixed relative to mover body), a first actuator body 110 (a rack 110 constrained with suitable bearings for linear motion along the X direction, with a clamping side 116A and a restorative resilient deformable element 121 pushing the rack 110 in a +X direction), a first latch body 120 (constrained to motion along the Y direction with a restorative compression spring 121 to generate holding force for teeth 122 which engage with the rack teeth 112 during locking), a second latch body 220 (with a flat for curved surface) fixed on the stator, second actuator body 210 (with a flat for curved surface) fixed on the stator, and a stator 200 (not shown) with a working surface with normal direction in Z.

A locking motion is that the first mover 100 moves in +Y and the first latch body 120 loses contact with the second latch body 220 so that the first latch body is pushed back by the restoration spring the locking teeth 122 is latched into two teeth of 112 preventing motion of the rack. As a result, the first latch body is in a locked position.

A disengaging motion is that the first mover 100 moves in −X so that the first actuator body 110 are disengaged from a contact surface 210.

In the embodiment in 57/58, the locking motion and the disengaging motion happen independently to allow the first actuator body 110 and the attached clamping side 116A to be easily opened for unloading a workpiece at a fixed point with minimal unlocked movement. The first actuator body can be preloaded in an open position and released by disengaging the first latch body to initiate clamping with the object. Or alternatively the first actuator can be preloaded while in a closed position to achieve rapid clamp separation when unlocking occurs.

An unlocking motion is a motion opposite to the locking motion: initially the first latch body has no contact with the second latch body 220, and the first latch body is in the locked position; when the mover 100 gradually moves toward the 220 in −Y direction, the surface of the first latch body 110 touches the surface of 220 and thus compresses the restoration spring 121 to slide the latch body 120 in a +Y direction so that the locking teeth 122 are pulled out of the rack teeth 112 and the first latch body is brought into the unlocked position shown in FIGS. 57 and 58. While in an unlocked state the mover may engage with a stationary object 201 (at the +X edge) and while engaged vary the mover's relative position (X position) to adjust the clamping distance 117 to achieve an open or closed position.

Generally, a latch mechanism may be utilized to fix the clamping distance or clamping force of the two or more clamping surface(s) 116. Furthermore while engaged the relative position of the mover to the stationary object may be changed to change the clamping distance of the clamping surfaces in a continuous manner (ie. smooth continuous function). Typically the change in position of the mover may occur along a specific direction to change the clamping distance. The clamping distance may be adjusted within a range of values, typically with the upper or lower value being the open position. The closed position is typically product dependent.

Figure 59:
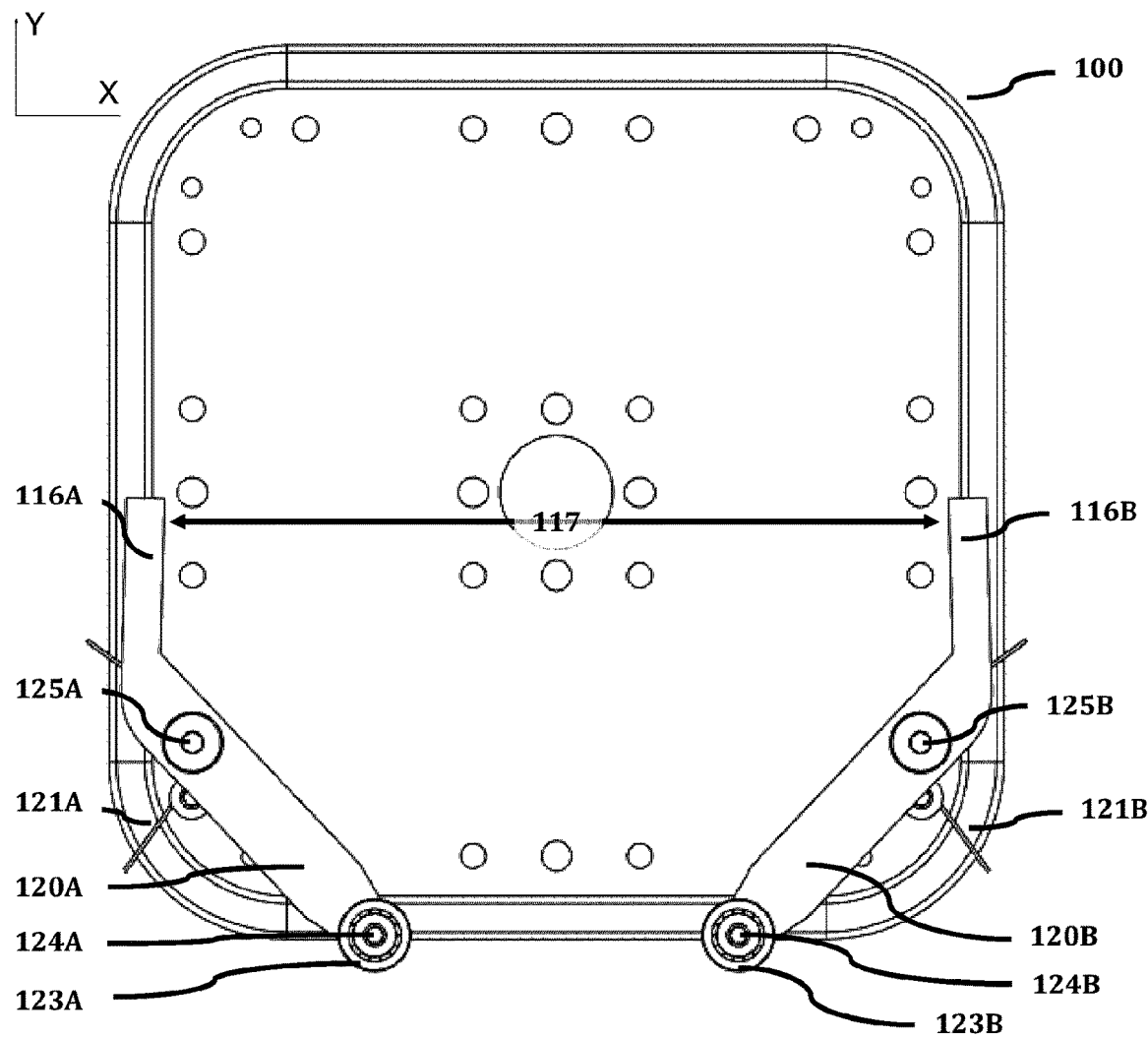
FIG. 59 is a plan view of a mover carried product gripping embodiment
Figure 60:
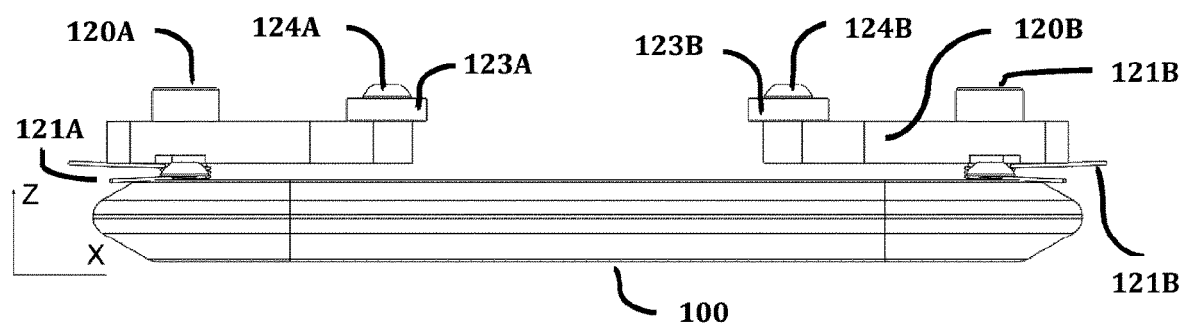
FIG. 60 is a front view of a mover carried product gripping embodiment
Figure 61:
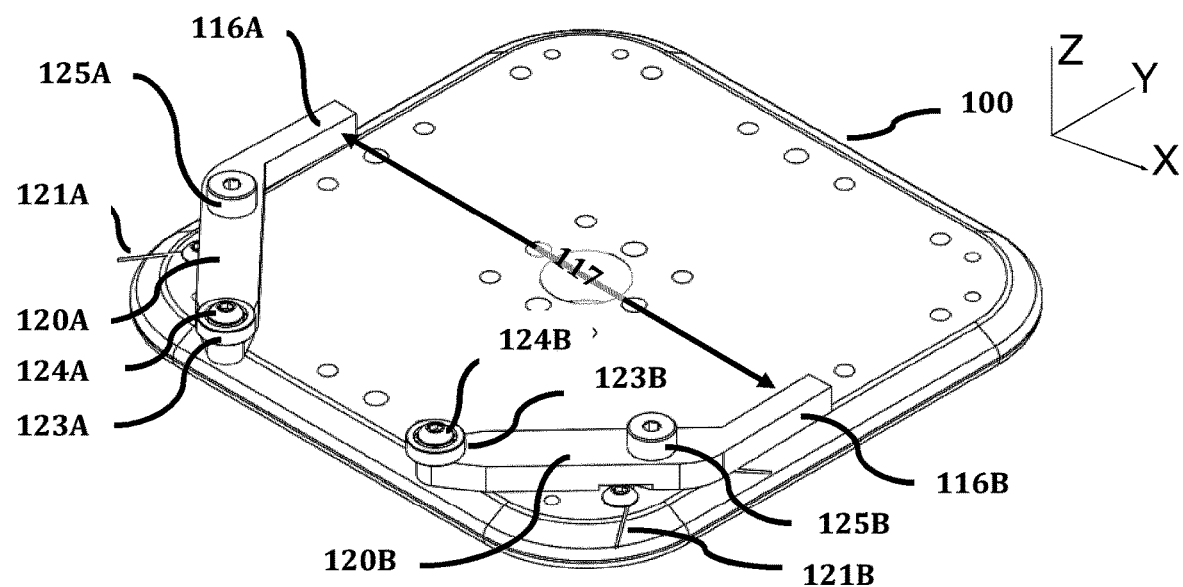
FIG. 61 is a perspective view of a mover carried product gripping embodiment

FIGS. 59, 60 and 61 all show a particular mover clamping mechanism embodiment comprising two rotating elements 120A/120B(rotating about a rotation axis 125A/125B with a clamping side 116A/116B and a contact side with associated contact surface 123A/123B optionally rotating around a rotation point 124A/124B). To perform an opening motion the contact surfaces 123A/123B are moved in a −Y motion towards a second latch body, thereby contacting and engaging the latch body and adjusting the rotation position of each first latch body 120A/120B (as a function of relative Y position between mover and second latch body) to generate a separating movement of the clamping surfaces 116A/116B. To perform a closing motion the contact surfaces 123A/123B are moved in a +Y motion thereby changing the rotation position of each first latch body 120A/120B as the restoration spring's 121A/121B torsional force acts on the rotating body inducing movement of the clamping sides 116A/116B together. In this particular embodiment the resilient deformable elements (restoration springs) may be utilized to create a normally closed operation with a clamping force related to the clamping distance of the clamping surfaces 116A/116B for the held product 102.

In various embodiments, a receiving body is described as a package. However, this is not necessary, in some embodiments, a receiving body for a product can be one component or subassembly to be assembled with the product.

While a number of exemplary aspects and embodiments have been discussed above, those of skill in the art will recognize certain modifications, permutations, additions and sub-combinations thereof. It is therefore intended that the following appended clauses and clauses hereafter introduced are interpreted to include all such modifications, permutations, additions and sub-combinations as are within their true spirit and scope.

Certain Inventive Aspects may be Described by the Following Numbered Clauses:

1. A robotic handling system comprising:
    a plurality of magnetically actuated movers, each comprising magnetic components, wherein the plurality of movers comprise a first group comprising one or more first movers each having a first tooling and a second group comprising one or more second movers having a second tooling, different from the first tooling;
    a stator defining a working surface and comprising a plurality of actuation coils arranged to interact with the mover's magnetic components to controllably move the mover over the working surface when driven by one or more stator driving circuits;
    one or more sensors to detect a position of the mover on the stator; and
    a controller connected to the driving circuits and programmed to:
        circulate the first movers within a first region of the working surface to transfer one or more first products from a first receiving location for receiving the first products to a first unloading location for unloading at least one of the first products; and
        circulate the second movers within a second region of the working surface, different from the first region, to receive at a second receiving location one or more of the first products that are unloaded from first movers and transfer first products to a second unloading location for unloading one or more of the first products.

2. The system of clause 1, wherein the first unloading location and the second receiving locations are the same.
3. The system of clause 1 or 2, further comprising a first transfer device arranged to unload first products from the first movers onto the second movers.
4. The system of clause 1 or 3, further comprising a second transfer device for transferring a second product to the second movers, preferably wherein the second product is a receiving body package for one or more the first products.
5. The system of anyone of clause 1 to 4, wherein the first movers are of different size from the second movers.
6. A method of transferring products comprising:
    controlling actuation coils of a stator to displace a plurality of magnetically actuated movers over a working surface of the stator in order to:
        circulate a first group of movers within a first region of the working surface between a first receiving location for receiving the first products and a first unloading location for unloading the first products and
        circulate a second group of movers within a second region of the working surface between a second receiving location and a second unloading location for unloading the first products;
    transferring the first products from the first movers at the first unloading location to the second movers at the second receiving location.
7. The method of clause 6, further comprising loading second products onto the second movers and then unloading the first and second products together at the second unloading location.
8. The method of clause 6, wherein the first unloading location and the second receiving locations are the same.
9. The method of clause 7, wherein the second product is a receiving body for the first products.
10. A system comprising:
    a conveyor having a first working surface for conveying a plurality of products comprising a first product in a first direction;
    one or more magnetically actuated movers, each comprising one or more magnetic components;
    a stator having a second working surface and comprising a plurality of actuation coils arranged to interact with each mover's magnetic components to controllably move each mover over the second working surface in at least in two in-plane non-parallel directions parallel to the working surface when driving the stator coils with commanded currents by one or more driving circuits; and
    a controller connected to the driving circuits and programmed to control a first of the one or more movers to move with a motion component in a second direction, orthogonal to the first direction, and parallel with the first working surface, to align that first mover with a first of the plurality of products in the second direction and transfer that first product between the conveyor and that first mover.
11. The system of clause 10, wherein the second direction is parallel with the first working surface.
12. The system of clause 10, wherein the stator and conveyor are arranged with their working surfaces substantially parallel.
13. The system of clause 10 or 12, wherein the first and second working surfaces have no overlapping region in the normal direction of the first working surface.
14. The system of anyone of clauses 10 to 13, wherein the stator and conveyor are arranged with their working surfaces inclined with respect to each other.

15. The system of clause 24, wherein the first and second workings surface are inclined between 20° and 70°.
16. The system of clause 24 or 25, wherein the first and second working surfaces are in an overlapping arrangement in the normal direction of the first working surface.
17. The system of anyone of clauses 21 to 26, wherein the controller is further programmed to control a second mover of the one or more movers to move with a motion component in the second direction to align with a second of the plurality of products in the second direction another of the plurality of products and transfer that product between the conveyor and the second mover.
18. The system of anyone of clauses 10 to 17, wherein the controller is further programmed to control the first and second plurality of movers to move as a group to respectively align each mover with the first and second products in the second direction.at least one of the products.
19. The system of anyone of clauses 10 to 18, wherein the first and second products have different positions in the second direction.
20. The system of anyone of clauses 10 to 19, wherein the controller is programmed to control the first and second movers to move simultaneously with motion components in the second direction to respectively align with the first and second products in the second direction.
21. The system of anyone of clauses 10 to 20, wherein the controller is programmed to control the first and second movers to move with opposing motion components in the second direction to respectively align with the first and second products in the second direction.
22. The system of anyone of clauses 10 to 21, wherein the controller is further programmed to move the first mover with first-direction motion component substantially matching the non-zero speed of the products being conveyed.
30. The system of anyone of clauses 10 to 29, wherein surface normals of the working surfaces are relatively rotated about an axis perpendicular to the first direction.
31. The system of anyone of clauses 21 to 30, wherein the first mover comprises a compliant mechanism allowing for relative motion in the normal direction of the conveyor between the conveyed product and the mover.
32. The system of anyone of clauses 21 to 31, wherein the first mover comprises an active end effector to remove the product from a transfer region of the conveyor, preferably wherein the end effector is pneumatically or electrically actuated, and more preferably a vacuum suction cup.
33. The system of clause 32, wherein the end effector extends beyond the second working surface and into the transfer region.
34. The system of anyone of clauses 26 to 33, wherein the controller is programmed to move the mover at a velocity having a component in the first direction substantially matching a velocity of the conveyor.
35. A method of transferring a product between a conveyor and a mover comprising:
    operating the conveyor having a first working surface for conveying the product in a first direction;
    controlling actuation coils of a stator providing a second working surface to move a magnetically actuated mover in at least two in-plane degrees of freedom in on a second working surface of the stator with motion component in a second direction orthogonal to the first direction and parallel to the first working surface;
    positioning the stator and conveyor with their first and second working surfaces inclined with respect to each other to define a product transfer region at the intersection of the first and second directions;
    moving the mover to a first location to position an end effector extending from the mover to align with the products on either the conveyor or mover to the product in the first and second directions and pick the product up from transfer region; and then transferring the product to the other of the conveyor toor the mover.
36. The method of clause 35, further comprising moving the mover with motion component in the first direction substantially matching the conveyor speed third direction on the stator to a second transfer region and loading or unloading the product.
37. The method of clause 35 or 36, further comprising moving the mover to move with motion component in the second direction to a second location to to position an end effector extending from the mover within the transfer region and then operating the end effector to load or unload the product therefrom.
38. The method of anyone of clause 35 to 37, further comprising moving the mover at a velocity having a component in the first direction substantially matching a velocity of the conveyor.
39. The method of anyone of clauses 35 to 38, wherein the stator's working surface and conveyor are inclined with respect to each other in order to merge products between the conveyor and the mover in the transfer region.
40. An assembly system comprising:
    an infeed transfer subsystem for carrying products thereon;
    sensor subsystem adapted to determine product locations of said products on the infeed transfer subsystem;
    a group of magnetically actuated movers, each having a securing mechanism adapted to securely engage the product;
    a stator having a working surface and an electromagnetic driving means to move each mover independently on the working surface;
    an outgoing transfer subsystem adapted for receiving the products from the group of movers; and
    a control system for controlling the electromagnetic driving means to move individual members of the group of movers from the determined product locations to a disposing location of the outgoing transfer subsystem.
41. The system of clause 40, wherein the sensor subsystem is arranged to detect multiple products on the infeed simultaneously and predict each product's location for when the securing mechanism is actuated.
42. The system of anyone of clauses 40 or 41, wherein the securing means comprises a picking tool, preferably an activatable suction cup, and preferably means of lowering and raising the securing means to the product.
43. The system of anyone of clauses 40 to 42, wherein the controller is arranged to actuate each mover in the group and move them as a group between respective individual product locations and the disposing locations.
44. The system of anyone of clauses 40 to 43, further comprising a second group of movers and a second outfeed transfer subsystem spaced-apart from the first outfeed transfer subsystem, wherein the second group of movers shares a region of the working surface proximate the infeed transfer subsystem with the first group of movers.
45. The system of clause 40, wherein the outgoing transfer system comprises a second group of movers and further comprising a second outgoing transfer system arranged to receive products from the second group of movers.

46. The system of clause 45, further comprising a third outgoing transfer system arranged to receive products from the second outgoing transfer system.
47. The system of clause 46, wherein the second or third outgoing transfer system comprises a vertical actuator connected to another product securing mechanism and arranged to move products from a first height to a variable height in a package.
48. The system of clause 46, wherein the second or third outgoing transfer system comprises a packaging securing mechanism.
49. The system of anyone of clauses 40 to 45, wherein the products are disposed at the disposing locations in a predetermined pattern for packaging.
50. The system of clause 40, wherein the securing mechanism comprises one or more retaining bays on each mover, each bay shaped to receive product at an opening and constrain the product in at least two dimensions.
51. The system of clause 40, wherein an outlet of the infeed transfer system is positioned above the working surface, separated by a gap large enough to pass the movers therethrough.
52. The system of clause 40, further comprising a second infeed transfer subsystem for loading bays of the movers with the products, concurrent with the first infeed transfer subsystem.
53. The system of clause 40, further comprising a two-axis gantry for transferring product from the movers to the outfeed transfer subsystem.
54. A method of assembly comprising:
    transferring products on an infeed transfer system in a first direction;
    determining locations of a plurality of the product on the infeed transfer system;
    individually actuating electromagnetic driving elements of a stator to move a group of movers on a working surface of the stator to the determined locations;
    securing the products using a securing mechanism of the movers at the loading location; and
    moving the movers to dispose the products at an outfeed transfer subsystem.
55. The method of clause 54, moving the movers as a group to dispose the product at an outfeed transfer subsystem.
56. The method of clause 54, further predicting second locations of each product in the selected products and controlling individual movers to respective second locations to pick the products.
57. The method of clause 54, further comprising speed matching each mover to their respective products on the infeed transfer system.
58. The method of clause 54, wherein the group of movers follow substantially the same path between picking and disposing locations.
59. The method of clause 54, further comprising loading the movers with the products from a second infeed transfer subsystem concurrent with loading the first infeed transfer subsystem.
60. The method of clause 54, further comprising controlling movers to move independently from outlets of infeed transfer subsystems to the disposing location, while avoiding collisions.
61. The method of clause 54, further comprising transferring the product, using a two-axis gantry, from the movers to the outfeed transfer subsystem.
62. The method of clause 54, wherein the movers dispose the products in a pre-determined pattern on the outfeed transfer subsystem.

The invention claimed is:

1. A robotic handling system comprising:
    a plurality of magnetically actuated movers, each mover comprising magnetic components, wherein the plurality of movers comprise:
        a first group comprising one or more first movers each having a first tooling; and
        a second group comprising one or more second movers each having a second tooling different from the first tooling;
    a stator defining a working surface and comprising a plurality of actuation coils arranged to interact with the magnetic components of the movers to controllably move the movers over the working surface when the actuation coils are driven by one or more stator driving circuits;
    one or more sensors to detect a position of each mover on the stator; and
    a controller connected to the one or more stator driving circuits and programmed to:
    move the one or more first movers within a first region of the working surface to transfer one or more first products from a first receiving location for receiving the one or more first products to a first unloading location for unloading the one or more first products;
    move the one or more second movers within a second region of the working surface, different from the first region, to receive at a second receiving location the one or more first products; and
    move the one or more second movers within the second region of the working surface to transfer the one or more first products from the second receiving location to a second unloading location for unloading the one or more first products.

2. The system of claim 1, wherein the first unloading location and the second receiving location are the same location.

3. The system of claim 1, further comprising a first transfer device arranged to unload, at the first unloading location, the one or more first products from the one or more first movers, and load, at the second receiving location, the one or more first products onto the one or more second movers.

4. The system of claim 3, wherein the first transfer device is arranged to move at least partially in a z-axis direction perpendicular to an xy-plane defined by the working surface.

5. The system of claim 3, wherein the first transfer device comprises a pneumatically or electrically actuated end effector for unloading the one or more first products from the one or more first movers.

6. The system of claim 5, wherein the end effector comprises a vacuum suction cup.

7. The system of claim 1, further comprising a second transfer device for transferring one or more second products to the one or more second movers.

8. The system of claim 1, wherein the first movers are of a different size to the second movers.

9. The system of claim 1, wherein the one or more first movers comprise one or more end effectors for receiving, at the first receiving location, the one or more first products, and for unloading, at the first unloading location, the one or more first products.

10. The system of claim 1, wherein the plurality of movers further comprise a third group of movers comprising one or more third movers each having a third tooling, and wherein the controller is further programmed to:

move the one or more third movers within a third region of the working surface, different from the first and second regions, to receive at a third receiving location the one or more first products; and move the one or more third movers within the third region to transfer the one or more first products from the third receiving location to a third unloading location for unloading the one or more first products.

11. The system of claim 7, wherein the one or more second products comprise packaging for receiving therein the one or more first products.

12. The system of claim 7, wherein the controller is further programmed to move the one or more second movers within the second region of the working surface to transfer the one or more first products and the one or more second products from the second receiving location to the second unloading location for unloading the one or more first products and the one or more second products.

13. The system of claim 9, wherein the controller is further configured to control the one or more end effectors such that, at the first unloading location, the one or more first products are released onto the one or more second movers.

14. The system of claim 10, wherein the second unloading location and the third receiving location are the same location.

15. The system of claim 10, further comprising a transfer device arranged to unload, at the second unloading location, the one or more first products from the one or more second movers, and load, at the third receiving location, the one or more first products onto the one or more third movers.

16. The system of claim 15, wherein the transfer device is arranged to move at least partially in a z-axis direction perpendicular to an xy-plane defined by the working surface.

17. The system of claim 15, wherein the transfer device comprises a pneumatically or electrically actuated end effector for unloading the one or more first products from the one or more second movers.

18. The system of claim 10, wherein the plurality of movers further comprise a fourth group of movers comprising one or more fourth movers each having a fourth tooling, and wherein the controller is further configured to:

move the one or more first movers within the first region to transfer at least one of the one or more first products from the first receiving location to the first unloading location; and simultaneously, move the one or more fourth movers within a fourth region of the working surface, different from the first region, from a fourth unloading location to a fourth receiving location for receiving at least another one of the one or more first products.

19. The system of claim 18, wherein the fourth tooling is the same as the first tooling.

20. The system of claim 18, wherein the fourth receiving location is the same as the first receiving location.

21. A method of transferring products, comprising:
controlling actuation coils of a stator to displace a plurality of magnetically actuated movers over a working surface of the stator, wherein the movers comprise: a first group comprising one or more first movers each having a first tooling; and a second group comprising one or more second movers each having a second tooling different from the first tooling, and wherein the actuation coils are controlled in order to:
move the one or more first movers within a first region of the working surface to transfer one or more first products from a first receiving location for receiving the one or more first products to a first unloading location for unloading the one or more first products;

move the one or more second movers within a second region of the working surface, different from the first region, to receive at a second receiving location the one or more first products; and move the one or more second movers within the second region of the working surface to transfer the one or more first products from the second receiving location to a second unloading location for unloading the one or more first products.

22. The method of claim 21, further comprising unloading, at the first unloading location, the one or more first products from the one or more first movers, and loading, at the second receiving location, the one or more first products onto the one or more second movers.

23. The method of claim 21, further comprising transferring one or more second products to the one or more second movers.

24. The method of claim 21, wherein the movers further comprise a third group of movers comprising one or more third movers each having a third tooling, and wherein the method further comprises:

moving the one or more third movers within a third region of the working surface, different from the first and second regions, to receive at third receiving location the one or more first products; and moving the one or more third movers within the third region to transfer the one or more first products from the third receiving location to a third unloading location for unloading the one or more first products.

25. The method of claim 21, wherein the plurality of movers further comprise a fourth group of movers comprising one or more fourth movers each having a fourth tooling, and wherein the method further comprises:

moving the one or more first movers within the first region to transfer at least one of the one or more first products from the first receiving location to the first unloading location; and simultaneously, moving the one or more fourth movers within a fourth region of the working surface, different from the first region, from a fourth unloading location to a fourth receiving location for receiving at least another one of the one or more first products.

26. The method of claim 22, wherein unloading the one or more first products from the one or more first movers, and loading the one or more first products onto the one or more second movers, comprises moving a transfer device at least partially in a z-axis direction perpendicular to an xy-plane defined by the working surface.

27. The method of claim 24, further comprising, at the first unloading location, releasing the one or more first products onto the one or more second movers.

28. The method of claim 24, further comprising, at the third receiving location, releasing the one or more first products onto the one or more third movers.

29. A system comprising:
a conveyor having a first working surface for conveying in a first direction a plurality of products comprising a first product;
one or more magnetically actuated movers, each mover comprising one or more magnetic components;
a stator having a second working surface and comprising a plurality of actuation coils arranged to interact with the one or more magnetic components of each mover to controllably move each mover over the second working surface in at least two in-plane non-parallel directions parallel to the second working surface when driving the actuation coils with currents controlled by one or more driving circuits; and a controller connected to the one or more driving circuits and programmed to control a first mover of one or more movers to move with a motion component in a second direction, orthogonal to the first direction, and parallel to the first working surface, to align the first mover with a first product of a plurality of products in the second direction and transfer the first product between the conveyor and the first mover, and wherein the controller is further programmed to control the first mover to move with a motion component in the first direction.

30. The system of claim 29, wherein the second direction is parallel to the first working surface.

31. The system of claim 29, wherein the first working surface and the second working surface are parallel.

32. The system of claim 29, wherein, in a direction normal to the first working surface, the first and second working surfaces do not overlap one another.

33. The system of claim 29, wherein the first working surface is inclined relative to the second working surface.

34. The system of claim 29, wherein, in a direction normal to the first working surface, the first and second working surfaces overlap one another.

35. The system of claim 29, wherein the controller is further programmed to control a second mover of the one or more movers to move with a motion component in the second direction to align a second product of the products with another one of the products in the second direction, and transfer the second product between the conveyor and the second mover.

36. The system of claim 29, wherein the controller is further programmed to move the first mover with a first-direction motion component substantially matching a non-zero speed of the products when conveyed by the conveyor.

37. The system of claim 29, wherein a surface normal of the first working surface is rotated relative to a surface normal of the second working surface about an axis perpendicular to the first direction.

38. The system of claim 29, wherein the first mover comprises a compliant mechanism allowing for relative motion, in a direction normal to the first working surface, between the products and the first mover.

39. The system of claim 29, wherein the first mover comprises an end effector for removing the first product from a transfer region of the conveyor.

40. The system of claim 29, wherein the controller is further programmed to move the first mover at a velocity having a component in the first direction substantially matching a velocity of the conveyor.

41. A method of transferring a product between a conveyor and a magnetically actuated mover, comprising:

operating the conveyor having a first working surface for conveying the product in a first direction;

controlling actuation coils of a stator providing a second working surface to move the mover in at least two in-plane degrees of freedom with a motion component in a second direction orthogonal to the first direction and parallel to the first working surface, and with a motion component in the first direction;

moving the mover to a first location to align, in the second direction, the mover with a product; and transferring the product between the conveyor and the mover.

* * * * *